United States Patent
Ueno et al.

(10) Patent No.: US 10,400,076 B2
(45) Date of Patent: Sep. 3, 2019

(54) EPOXY RESIN COMPOSITION, PREPREG, AND CARBON FIBER-REINFORCED COMPOSITE MATERIAL

(71) Applicant: TORAY INDUSTRIES, INC., Tokyo (JP)

(72) Inventors: Shizue Ueno, Iyo-gun (JP); Nobuyuki Arai, Iyo-gun (JP); Jun Misumi, Iyo-gun (JP); Hiroshi Taiko, Otsu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 342 days.

(21) Appl. No.: 14/896,865

(22) PCT Filed: Jul. 10, 2014

(86) PCT No.: PCT/JP2014/068387
§ 371 (c)(1),
(2) Date: Dec. 8, 2015

(87) PCT Pub. No.: WO2015/005411
PCT Pub. Date: Jan. 15, 2015

(65) Prior Publication Data
US 2016/0152785 A1 Jun. 2, 2016

(30) Foreign Application Priority Data

Jul. 11, 2013 (JP) .................................. 2013-145275
Apr. 10, 2014 (JP) .................................. 2014-080800

(51) Int. Cl.
| | |
|---|---|
| B32B 27/38 | (2006.01) |
| B32B 27/26 | (2006.01) |
| C08J 5/24 | (2006.01) |
| C08G 59/32 | (2006.01) |
| C08G 59/38 | (2006.01) |
| C08G 59/50 | (2006.01) |
| C08L 63/00 | (2006.01) |
| C08K 7/06 | (2006.01) |

(Continued)

(52) U.S. Cl.
CPC ............... C08J 5/24 (2013.01); B32B 27/26 (2013.01); B32B 27/38 (2013.01); C08G 59/3227 (2013.01); C08G 59/38 (2013.01); C08G 59/4223 (2013.01); C08G 59/44 (2013.01); C08G 59/504 (2013.01); C08G 59/5033 (2013.01); C08K 7/06 (2013.01); C08J 2363/00 (2013.01); C08J 2363/02 (2013.01); C08K 3/04 (2013.01)

(58) Field of Classification Search
None
See application file for complete search history.

(56) References Cited

U.S. PATENT DOCUMENTS

| | | | |
|---|---|---|---|
| 4,517,321 A | 5/1985 | Gardner et al. | |
| 4,607,069 A | 8/1986 | Tesch et al. | |

(Continued)

FOREIGN PATENT DOCUMENTS

| | | |
|---|---|---|
| JP | 59-215314 A | 12/1984 |
| JP | 61-34021 A | 2/1986 |

(Continued)

OTHER PUBLICATIONS

Machine translation of JP 02-135217 A (no date).*

(Continued)

*Primary Examiner* — Michael J Feely

(74) *Attorney, Agent, or Firm* — Birch, Stewart, Kolasch & Birch LLP

(57) ABSTRACT

An epoxy resin composition including [A1] a hardener represented by Formula (1), and [B] an aromatic epoxy resin having tri- or higher functionality, wherein a carbon nuclear relaxation time $T_1^C$ corresponding to a benzene ring carbon atom in the main backbone of Formula (1) assigned to 130 ppm in a solid-state $^{13}$C-NMR spectrum is 42 seconds or longer, and a prepreg and a carbon fiber-reinforced composite material obtained using the epoxy resin composition:

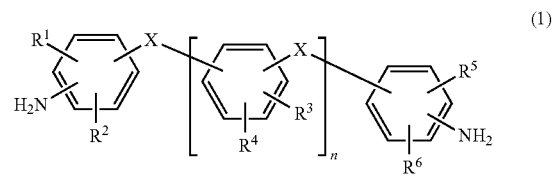

(1)

wherein X represents any one selected from —$CH_2$—, —O—, —CO—, —C(=O)O—, —S—, —$SO_2$—, and —NHC(=O)—; n represents 1 to 5; and $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein when X is —C(=O)O— or —NHC(=O)—, X may be in either direction.

Provided are an epoxy resin composition that provides a carbon fiber-reinforced composite material excellent in tensile strength and compression strength and suitable as a structural material, a prepreg, and a carbon fiber-reinforced composite material.

16 Claims, No Drawings

(51) Int. Cl.
*C08G 59/44* (2006.01)
*C08G 59/42* (2006.01)
*C08K 3/04* (2006.01)

(56) References Cited

U.S. PATENT DOCUMENTS

| | | | |
|---|---|---|---|
| 10,040,897 B2* | 8/2018 | Mason | C08G 59/5033 |
| 2012/0035299 A1* | 2/2012 | Arai | C08G 59/28 |
| | | | 523/427 |
| 2013/0005855 A1 | 1/2013 | Arai et al. | |
| 2013/0330478 A1* | 12/2013 | Ushiyama | B29C 70/443 |
| | | | 427/386 |
| 2016/0369043 A1* | 12/2016 | Mason | C08G 59/5033 |

FOREIGN PATENT DOCUMENTS

| | | | | |
|---|---|---|---|---|
| JP | 2-133422 A | | 5/1990 | |
| JP | 02-135217 A | * | 5/1990 | ............ C08G 59/54 |
| JP | 8-325394 A | | 12/1996 | |
| JP | 2004-35702 A | | 2/2004 | |
| JP | 2011-79983 A | | 9/2011 | |
| JP | 2012-46634 A | | 3/2012 | |
| JP | 2013-18928 A | | 1/2013 | |
| WO | WO 2011/118106 A1 | | 9/2011 | |

OTHER PUBLICATIONS

Machine translation of JP 02-133422 A (no date).*
International Search Report, issued in PCT/JP2014/068387, dated Sep. 22, 2014.

* cited by examiner

EPOXY RESIN COMPOSITION, PREPREG, AND CARBON FIBER-REINFORCED COMPOSITE MATERIAL

TECHNICAL FIELD

The present invention relates to an epoxy resin composition, a prepreg, and a carbon fiber-reinforced composite material. More particularly, the invention relates to an epoxy resin composition that provides a carbon fiber-reinforced composite material having an excellent tensile strength and an excellent compression strength and suitable as a structural material, a prepreg, and a carbon fiber-reinforced composite material.

BACKGROUND ART

In recent years, carbon fiber-reinforced composite materials including carbon fibers as reinforcing fibers, because of having high specific strength and high specific modulus, have been used in applications including structural materials of aircraft, automobiles, and the like, sports goods such as tennis rackets, golf shafts, and fishing rods, and general industrial uses.

Methods of producing the carbon fiber-reinforced composite material include a method in which a prepreg, a seat type intermediate material obtained by impregnating reinforcing fibers with an uncured matrix resin, is cured, and resin transfer molding in which a liquid resin is injected into reinforced fibers placed in a mold to prepare an intermediate, and the intermediate is cured. Of these production methods, in the method using prepreg, a carbon fiber-reinforced composite material is produced typically by laminating several sheets of prepreg and then applying heat and pressure to the laminate. As the matrix resin in the prepreg, thermosetting resins, in particular, epoxy resins are often used in terms of productivity, e.g., processability.

Particularly in applications of structural materials of aircraft, automobiles, and the like, properties required for the carbon fiber-reinforced composite material have recently been becoming stricter with its increasing use, and a high tensile strength and a high compression strength have been required. However, there is often a trade-off between the tensile strength and the compression strength of the carbon fiber-reinforced composite material, and it has been very difficult to achieve the tensile strength and the compression strength both at a high level.

PRIOR ART DOCUMENTS

Patent Documents

In improving the tensile strength of a carbon fiber-reinforced composite material, enhancing the strength of reinforcing fibers and increasing the fiber volume fraction (Vf) are effective. In the past, a method of producing a reinforcing fiber having high strength has been proposed (see Patent Document 1).

It has been demonstrated that a high tensile strength translation rate is achieved when the tensile fracture strain and the fracture toughness (KIC) of a matrix resin satisfy a specific relationship (see Patent Document 2).

When a carbon fiber-reinforced composite material is used as a structural material, compression strength is also an important physical property. As a resin composition that provides a carbon fiber-reinforced composite material having excellent compression strength, there are disclosed an epoxy resin composition including tetraglycidyldiaminodiphenylmethane, a bifunctional epoxy resin such as bisphenol A type epoxy resin or diglycidyl resorcinol, and 3,3'-diaminodiphenyl sulfone (see Patent Document 3), an epoxy resin composition including a polyfunctional epoxy resin, a diglycidyl aniline derivative, and 4,4'-diaminodiphenyl sulfone (see Patent Document 4), and an epoxy resin composition including a polyfunctional epoxy resin, an epoxy resin having a special backbone, and 3,3'-diaminodiphenyl sulfone (see Patent Document 5).

Patent Document 1: JP 11-241230 A
Patent Document 2: JP 09-235397 A
Patent Document 3: WO 96/17006
Patent Document 4: JP 2003-26768 A
Patent Document 5: JP 2002-363253 A

SUMMARY OF THE INVENTION

Problems to be Solved by the Invention

In general, the higher the strength of reinforcing fibers, the more difficult it becomes to utilize the original strength of the fibers. The proposal of Patent Document 1, however, is silent about the strength exhibited when the reinforcing fibers are formed into a carbon fiber-reinforced composite material. Furthermore, it is known that the tensile strength translation rates of reinforcing fibers having the same strength greatly vary depending on the matrix resin used in combination and the molding conditions. In particular, when the curing temperature is 180° C. or higher, there is a problem in that high strength is unlikely to be exhibited due to a thermal stress strain remaining in the fiber-reinforced composite material after the curing, and, therefore, even if a carbon fiber having such high strength can be obtained, it is necessary to clear up further technical problems in order for a carbon fiber-reinforced composite material to exhibit strength.

According to the proposal of Patent Document 2, introducing a large amount of thermoplastic resin or rubber components into a matrix resin for the purpose of improving the fracture toughness (KIC) typically increases the viscosity, which can reduce the processability and handling property in producing a prepreg.

According to the proposals of Patent Documents 3 to 5, although the compression strength can be improved, it is difficult to achieve the tensile strength and the compression strength both at a high level.

Thus, it is an object of the present invention to provide an epoxy resin composition that provides a carbon fiber-reinforced composite material excellent in tensile strength and compression strength and suitable as a structural material, a prepreg, and a carbon fiber-reinforced composite material.

Means for Solving the Problems

To achieve the above object, the epoxy resin composition of the present invention has any of the following structure (i) to (iii):

(i) An epoxy resin composition comprising components [A1] and [B], wherein a carbon nuclear relaxation time $T_1^C$ corresponding to a benzene ring carbon atom in the main backbone of Formula (1) assigned to a peak at 130 ppm in a solid-state $^{13}$C-NMR spectrum is 42 seconds or longer:

[A1] a hardener represented by Formula (1)

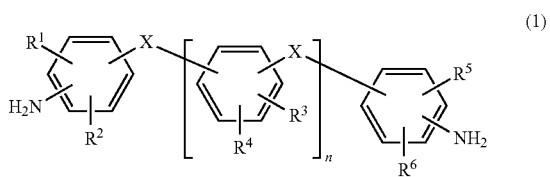

wherein X represents any one selected from —CH$_2$—, —O—, —CO—, —C(=O)O—, —S—, —SO$_2$—, and —NHC(=O)—; n represents 1 to 5; and R$^1$ to R$^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein when X is —C(=O)O— or —NHC(=O)—, X may be in either direction; and

[B] an aromatic epoxy resin having tri- or higher functionality, or (ii) An epoxy resin composition, comprising components [A2] and [B]:

[A2] a hardener particle of an aromatic diamine compound having a structure represented by Formula (4), the particles having an average particle size of less than 20 μm:

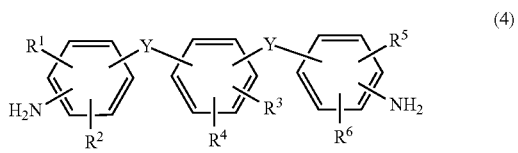

wherein Y represents —NHC(=O)—, and R$^1$ to R$^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein Y may be in either direction; and

[B] an aromatic epoxy resin having tri- or higher functionality, or (iii) An epoxy resin composition comprising components [A3] and [B], wherein a carbon nuclear relaxation time $T_1^C$ corresponding to a benzene ring carbon atom in the main backbone of Formula (7) assigned to a peak at 130 ppm in a solid-state $^{13}$C-NMR spectrum is 40 seconds or longer:

[A3] a hardener represented by Formula (7)

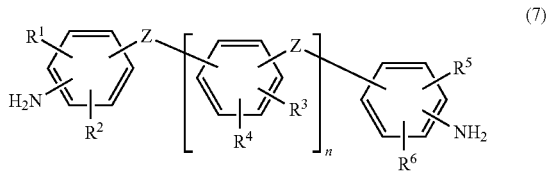

wherein Z represents —C(=O)O—; n represents 0 to 5; and R$^1$ to R$^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein Z may be in either direction; and

[B] an aromatic epoxy resin having tri- or higher functionality.

The prepreg of the present invention has the following structure:

A prepreg obtained by impregnating carbon fibers with the epoxy resin composition described above.

The carbon fiber-reinforced composite material of the present invention has the following structure:

A carbon fiber-reinforced composite material, comprising a cured epoxy resin obtained by curing an epoxy resin composition, and a carbon fiber.

In the epoxy resin composition (i) of the present invention, the component [A1] preferably comprises particles having an average particle size of less than 20 μm.

In the epoxy resin composition (i) of the present invention, the carbon nuclear relaxation time $T_1^C$ corresponding to a benzene ring carbon atom in the main backbone of Formula (1) assigned to 130 ppm in a solid-state $^{13}$C-NMR spectrum is preferably 48 seconds or longer.

In the epoxy resin composition (i) of the present invention, X in Formula (1) of the component [A1] is preferably —NHC(=O)—.

In the epoxy resin composition (i) of the present invention, the component [A1] is preferably a hardener having a structure represented by Formula (2) or Formula (3):

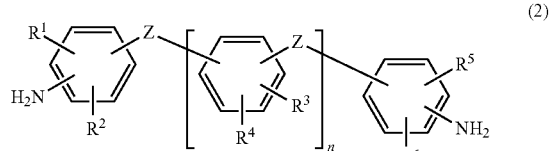

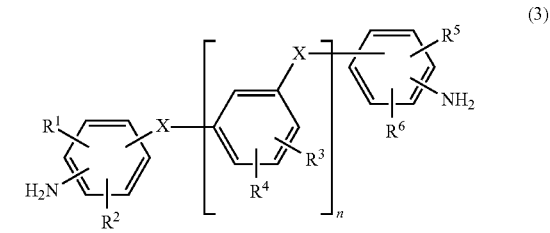

wherein X represents any one selected from —CH$_2$—, —O—, —CO—, —C(=O)O—, —S—, —SO$_2$—, and —NHC(=O)—; n represents 1 to 5; and R to R each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein when X is —C(=O)O— or —NHC(=O)—, X may be in either direction.

In the epoxy resin composition (i) of the present invention, n in Formula (2) or Formula (3) of the component [A1] is preferably 1 to 3.

In the epoxy resin composition (ii) of the present invention, the component [A2] is preferably a hardener having a structure represented by Formula (5) or Formula (6):

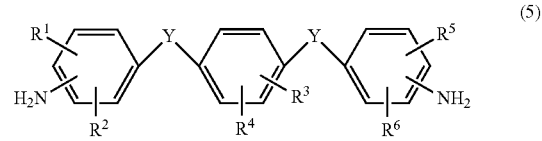

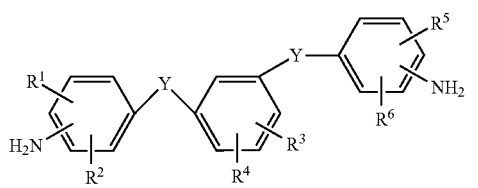

(6)

wherein Y represents —NHC(=O)—, and $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein Y may be in either direction.

The epoxy resin composition (i) or (ii) of the present invention preferably has a curing calorific value, as determined by differential scanning calorimetry (DSC) at a temperature ramp rate of 5° C./min, of less than 450 J/g.

In the epoxy resin composition (iii) of the present invention, n in Formula (7) of the component [A3] is preferably 0.

In the epoxy resin composition (i), (ii), or (iii) of the present invention, the component [B] is preferably an epoxy resin represented by Formula (8):

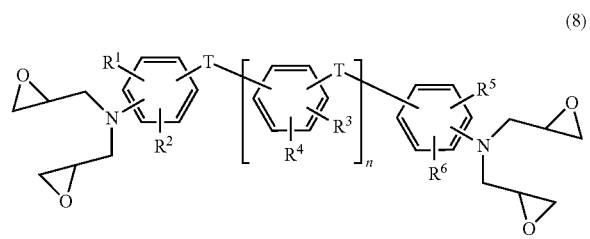

(8)

wherein T represents any one selected from —CH$_2$—, —O—, —CO—, —C(=O)O—, —S—, —SO$_2$—, and —NHC(=O)—; n represents 0 to 5; and $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein when T in Formula (8) is —C(=O)O— or —NHC(=O)—, T may be in either direction.

In the epoxy resin composition (i), (ii), or (iii) of the present invention, T in Formula (8) of the component [B] is preferably —SO$_2$— or —NHC(=O)—.

In the epoxy resin composition (i), (ii), or (iii) of the present invention, the amount of the component [B] is preferably 40 to 90% by mass based on the total amount of epoxy resin in the epoxy resin composition.

In the epoxy resin composition (i), (ii), or (iii) of the present invention, the equivalent ratio of all active hydrogens of amino groups in the component [A1], [A2], or [A3] to all epoxy groups in the epoxy resin composition is preferably 0.5 to 0.9.

The epoxy resin composition (i), (ii), or (iii) of the present invention preferably further comprises a component [C] below:

[C] an epoxy resin having at least one ring structure having a 4- or more membered ring and one or two amine type glycidyl groups or ether type glycidyl groups directly connected to the ring structure.

In the epoxy resin composition (i), (ii), or (iii) of the present invention, the component [C] preferably comprises an epoxy resin having a structure represented by Formula (9):

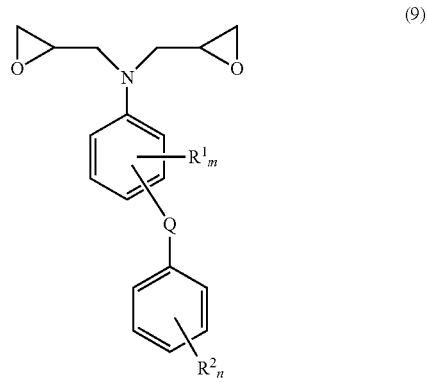

(9)

wherein $R^1$ and $R^2$ each represent at least one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group; n is an integer of 0 to 4; m is an integer of 0 to 5; when a plurality of $R^1$ and a plurality of $R^2$ are present, the plurality of $R^1$ and the plurality of $R^2$ each may be the same or different; and Q represents any one selected from —CH$_2$—, —O—, —CO—, —C(=O)O—, —S—, —SO$_2$—, and —NHC(=O)—, wherein when Q in Formula (9) is —C(=O)O— or —NHC(=O)—, Q may be in either direction.

In the epoxy resin composition (i), (ii), or (iii) of the present invention, the amount of the component [B] is preferably 40 to 90% by mass, and the amount of the component [C] is preferably 10 to 60% by mass, the percentages being based on the total amount of epoxy resin in the epoxy resin composition.

The epoxy resin composition (i), (ii), or (iii) of the present invention preferably comprises diaminodiphenyl sulfone as a hardener.

In the epoxy resin composition (i), (ii), or (iii) of the present invention, a cured epoxy resin obtained by curing at 180° C. for 2 hours preferably has a rubbery state elastic modulus of 15 MPa or less.

In the epoxy resin composition (i), (ii), or (iii) of the present invention, a cured epoxy resin obtained by curing at 180° C. for 2 hours preferably has a flexural modulus of 4.5 GPa or more.

In the epoxy resin composition (i), (ii), or (iii) of the present invention, a cured epoxy resin obtained by curing at 180° C. for 2 hours preferably has a rubbery state elastic modulus of 15 MPa or less and a flexural modulus of 4.5 GPa or more.

The epoxy resin composition (i), (ii), or (iii) of the present invention preferably further comprises a thermoplastic resin [D] soluble in the epoxy resin composition.

The epoxy resin composition (i), (ii), or (iii) of the present invention preferably comprises the component [D] in an amount of 1 to 40 parts by mass based on 100 parts by mass of the total amount of epoxy resin.

The epoxy resin composition (i), (ii), or (iii) of the present invention preferably comprises the component [D] in an amount of 1 to 40 parts by mass based on 100 parts by mass of the total amount of epoxy resin.

The epoxy resin composition (i), (ii), or (iii) of the present invention preferably further comprises a thermoplastic resin particle [E].

The carbon fiber-reinforced composite material of the present invention preferably comprises a cured epoxy resin obtained by curing the epoxy resin composition described above, and a carbon fiber.

Effects of the Invention

According to the present invention, an epoxy resin composition having a low curing calorific value and excellent in flexural modulus and toughness can be obtained. Combining the epoxy resin composition with a carbon fiber provides a prepreg, and curing the prepreg provides a carbon fiber-reinforced composite material excellent in tensile strength and compression strength.

DESCRIPTION OF EMBODIMENTS

The epoxy resin composition, the prepreg, and the carbon fiber-reinforced composite material according to the present invention will now be described in detail.

The present inventors intensively studied the mechanism by which a carbon fiber-reinforced composite material exhibits a tensile strength and a compression strength to discover that an epoxy resin composition including a hardener [A1], wherein a carbon nuclear relaxation time $T_1^C$ corresponding to a benzene ring carbon atom in the main backbone of Formula (1) assigned to 130 ppm in a solid-state $^{13}$C-NMR spectrum is 42 seconds or longer, and an aromatic epoxy resin [B] having tri- or higher functionality provides a structure best suited to achieve the tensile strength and the compression strength, between which there used to be a trade-off, both at a high level. The benzene ring carbon atom in the main backbone of Formula (1) assigned to a peak at 130 ppm in a solid-state $^{13}$C-NMR spectrum is any carbon atom on a benzene ring in the hardener [A1] incorporated into the epoxy resin composition. The solid-state NMR measurement of the epoxy resin composition of the present invention is carried out as follows: a cured product or a carbon fiber-reinforced composite material of the epoxy resin composition of the present invention is loaded at the center of a solid-state NMR sample tube and supplied to a solid-state NMR measurement apparatus (e.g., CMX-300 Infinity manufactured by Chemagnetics), and the carbon nuclear relaxation time $T_1^C$ is measured by the Torchia method at room temperature under the following conditions: observation nucleus: $^{13}$C, observation frequency: 75.2 MHz, pulse width: 4.2 μs.

In the solid-state NMR measurement of the epoxy resin composition of the present invention, the carbon nuclear relaxation time $T_1^C$ corresponding to a benzene ring carbon atom in the main backbone of Formula (1) assigned to a peak at 130 ppm in a solid-state $^{13}$C-NMR spectrum is determined. In the solid-state $^{13}$C-NMR spectrum of the epoxy resin composition of the present invention, the peak derived from the benzene ring carbon atom in the main backbone of Formula (1) is observed near 110 to 160 ppm regardless of the type of the hardener [A1], and the carbon nuclear relaxation time $T_1^C$ corresponding to a carbon atom assigned to a peak observed particularly at 130 ppm has a good correlation with the molecular mobility of the epoxy resin backbone.

The carbon nuclear relaxation time $T_1^C$ as determined by solid-state NMR measurement is a value reflecting the molecular mobility specific to each carbon, and a longer relaxation time $T_1^C$ indicates lower molecular mobility. In the epoxy resin composition of the present invention, by reducing the molecular mobility through a long carbon nuclear relaxation time $T_1^C$, the excellent tensile strength and the excellent compression strength, the effects of the present invention, can be achieved both at a high level.

The epoxy resin composition of the present invention, as compared to epoxy resin compositions of the prior art, easily forms a hydrogen bond with surrounding functional groups having a hydrogen-bonding property and can have a stable conjugated structure, which leads to a rigid molecular chain and a long carbon nuclear relaxation time $T_1^C$ corresponding to a benzene ring carbon atom in the main backbone of Formula (1) assigned to a peak at 130 ppm in a solid-state $^{13}$C-NMR spectrum, thereby causing a phenomenon where the molecular mobility of the epoxy resin backbone decreases.

The epoxy resin composition (i) of the present invention is characterized in that the carbon nuclear relaxation time $T_1^C$ corresponding to a benzene ring carbon atom in the main backbone of Formula (1) assigned to a peak at 130 ppm in a solid-state $^{13}$C-NMR spectrum is 42 seconds or longer, preferably 45 seconds or longer, more preferably 48 seconds or longer. When the carbon nuclear relaxation time $T_1^C$ corresponding to a benzene ring carbon atom in the main backbone of Formula (1) assigned to a peak at 130 ppm in a solid-state $^{13}$C-NMR spectrum is shorter than 42 seconds, the molecular mobility of the epoxy resin backbone is increased, which may impair the rigidity of the molecular chain or significantly reduce the tensile strength and the compression strength of the resulting carbon fiber-reinforced composite material.

The epoxy resin composition (iii) of the present invention, by including a hardener [A3], wherein the carbon nuclear relaxation time $T_1^C$ corresponding to a benzene ring carbon atom in the main backbone of Formula (7) assigned to 130 ppm in a solid-state $^{13}$C-NMR spectrum is 40 seconds or longer, and an aromatic epoxy resin [B] having tri- or higher functionality, provides a structure best suited to achieve the tensile strength and the compression strength, between which there used to be a trade-off, both at a high level. The benzene ring carbon atom in the main backbone of Formula (7) assigned to a peak at 130 ppm in a solid-state $^{13}$C-NMR spectrum is any carbon atom on a benzene ring in the hardener [A3] incorporated into the epoxy resin composition.

In the solid-state NMR measurement of the epoxy resin composition of the present invention, the carbon nuclear relaxation time $T_1^C$ corresponding to a benzene ring carbon atom in the main backbone of Formula (7) assigned to a peak at 130 ppm in a solid-state $^{13}$C-NMR spectrum is determined. In the solid-state $^{13}$C-NMR spectrum of the epoxy resin composition of the present invention, the peak derived from the benzene ring carbon atom in the main backbone of Formula (7) is observed near 110 to 160 ppm regardless of the type of the hardener [A3], and the carbon nuclear relaxation time $T_1^C$ corresponding to a carbon atom assigned to a peak observed particularly at 130 ppm has a good correlation with the molecular mobility of the epoxy resin backbone.

The epoxy resin composition of the present invention (iii), as compared to epoxy resin compositions of the prior art, easily forms a hydrogen bond with surrounding functional groups having a hydrogen-bonding property, which leads to a rigid molecular chain and a long carbon nuclear relaxation time $T_1^C$ corresponding to a benzene ring carbon atom in the main backbone of Formula (7) assigned to a peak at 130 ppm in a solid-state $^{13}$C-NMR spectrum, thereby causing a phenomenon where the molecular mobility of the epoxy resin backbone decreases.

The epoxy resin composition of the present invention (iii) is characterized in that the carbon nuclear relaxation time $T_1^C$ corresponding to a benzene ring carbon atom in the main backbone of Formula (7) assigned to a peak at 130 ppm in a solid-state $^{13}$C-NMR spectrum is 40 seconds or longer, preferably 41 seconds or longer. When the carbon nuclear relaxation time $T_1^C$ corresponding to a benzene ring carbon atom in the main backbone of Formula (7) assigned to a peak at 130 ppm in a solid-state $^{13}$C-NMR spectrum is shorter than 40 seconds, the molecular mobility of the epoxy resin backbone is increased, which may impair the rigidity of the molecular chain or significantly reduce the tensile strength and the compression strength of the resulting carbon fiber-reinforced composite material.

The present inventors intensively studied the mechanism by which a carbon fiber-reinforced composite material exhibits a tensile strength and a compression strength to discover that an epoxy resin composition (ii) including a hardener particle [A2] of an aromatic diamine compound having a structure represented by Formula (4), the particles having an average particle size of less than 20 μm, and the aromatic epoxy resin [B] having tri- or higher functionality provides a structure best suited to achieve the tensile strength and the compression strength, between which there used to be a trade-off, both at a high level.

The hardener particle [A2] of an aromatic diamine compound having a structure represented by Formula (4) contained in the epoxy resin composition (ii) according to another aspect of the present invention is characterized by having an average particle size of less than 20 μm. When the average particle size of [A2] is not less than 20 μm, the solubility in the epoxy resin may decrease, or the curing reaction may not proceed sufficiently, which can reduce the mechanical characteristics and heat resistance of the resulting cured epoxy resin and carbon fiber-reinforced composite material. Y in Formula (4) of [A2] is —NHC(=O)— and may be in either direction. $R^1$ to $R^6$ each represent a hydrogen atom, an aliphatic hydrocarbon group having 1 to 4 carbon atoms, or an alicyclic hydrocarbon group having 4 or less carbon atoms, and $R^1$ to $R^6$ may be the same or different. When $R^1$ to $R^6$ have too large structures, the compatibility with other components in the epoxy resin composition may be reduced, and the effect of improving the strength of the cured epoxy resin may not be produced.

Also for the hardener [A1] having a structure represented by Formula (1) contained in the epoxy resin composition (i), the particles preferably have an average particle size of less than 20 μm. When the average particle size of [A1] is not less than 20 μm, the solubility in the epoxy resin may decrease, or the curing reaction may not proceed sufficiently, which can significantly reduce the mechanical characteristics and heat resistance of the resulting cured epoxy resin and carbon fiber-reinforced composite material. X in Formula (1) of [A1] represents any one selected from —CH$_2$—, —O—, —CO—, —C(=O)O—, —S—, —SO$_2$—, and —NHC(=O)—, and n represents 1 to 5. When X in Formula (1) of [A1] is —C(=O)O— or —NHC(=O)—, X may be in either direction. $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and a halogen atom, and $R^1$ to $R^6$ may be the same or different. When $R^1$ to $R^6$ have too large structures, the compatibility with other components in the epoxy resin composition may be reduced, and the effect of improving the strength of the cured epoxy resin may not be produced. The epoxy resin composition of the present invention is characterized by including the hardener [A1], the hardener particle [A2], or the hardener [A3] in order to provide the resulting carbon fiber-reinforced composite material with a tensile strength and a compression strength both at a high level. When the hardener [A1] having a structure represented by Formula (1) is used in the epoxy resin composition, in particular, the hardener [A1] wherein X in Formula (1) is —NHC(=O)— is preferably used because the resulting carbon fiber-reinforced composite material can be provided with a high tensile strength and a high compression strength. —NHC(=O)—, in the molecule, easily forms a hydrogen bond with surrounding functional groups having a hydrogen-bonding property, and a bond via —NHC(=O)— between benzene rings, if present, enables a stable conjugated structure. Thus, when X in Formula (1) of the hardener [A1] is —NHC(=O)—, the epoxy resin backbone may have a rigid molecular chain, and the carbon nuclear relaxation time $T_1^C$ as determined by solid-state NMR measurement may be long. As a result of this, the carbon fiber-reinforced composite material can be provided with a high tensile strength and a high compression strength.

Examples of the hardener [A1] include 4-amino-N-[4-[(4-aminobenzoyl)amino]phenyl]benzamide, 4-amino-N-[3-[(4-aminobenzoyl)amino]phenyl]benzamide, 4-amino-N-[2-[(4-aminobenzoyl)amino]phenyl]benzamide, 3-amino-N-[4-[(3-aminobenzoyl)amino]phenyl]benzamide, 3-amino-N-[3-[(3-aminobenzoyl)amino]phenyl]benzamide, 3-amino-N-[2-[(3-aminobenzoyl)amino]phenyl]benzamide, 2-amino-N-[4-[(2-aminobenzoyl)amino]phenyl]benzamide, 2-amino-N-[3-[(2-aminobenzoyl)amino]phenyl]benzamide, 2-amino-N-[2-[(2-aminobenzoyl)amino]phenyl]benzamide, 3-amino-N-[4-[(4-aminobenzoyl)amino]phenyl]benzamide, 2-amino-N-[4-[(4-aminobenzoyl)amino]phenyl]benzamide, 2-amino-N-[4-[(3-aminobenzoyl)amino]phenyl]benzamide, 3-amino-N-[3-[(4-aminobenzoyl)amino]phenyl]benzamide, 2-amino-N-[3-[(4-aminobenzoyl)amino]phenyl]benzamide, 2-amino-N-[3-[(3-aminobenzoyl)amino]phenyl]benzamide, 3-amino-N-[2-[(4-aminobenzoyl)amino]phenyl]benzamide, 2-amino-N-[2-[(4-aminobenzoyl)amino]phenyl]benzamide, 2-amino-N-[2-[(3-aminobenzoyl)amino]phenyl]benzamide, 4-amino-N-[4-[(4-aminobenzoyl)amino]-2-methylphenyl]benzamide, 4-amino-N-[4-[(4-amino-3-methylbenzoyl)amino]phenyl]-3-methylbenzamide, 4-amino-N-[3-[(4-aminobenzoyl)amino]-2-methylphenyl]benzamide, 4-amino-N-[3-[(4-amino-3-methylbenzoyl)amino]phenyl]-3-methylbenzamide, 3-amino-N-[4-[(3-aminobenzoyl)amino]-2-methylphenyl]benzamide, 3-amino-N-[4-[(3-amino-3-methylbenzoyl)amino]phenyl]-3-methylbenzamide, 1-N,4-N-bis(4-aminophenyl)phenylene-1,4-dicarboxyamide, 1-N,3-N-bis(4-aminophenyl)phenylene-1,3-dicarboxyamide, 1-N,2-N-bis(4-aminophenyl)phenylene-1,2-dicarboxyamide, 1-N,4-N-bis(3-aminophenyl)phenylene-1,4-dicarboxyamide, 1-N,3-N-bis(3-aminophenyl)phenylene-1,3-dicarboxyamide, 1-N,2-N-bis(3-aminophenyl)phenylene-1,2-dicarboxyamide, 1-N,4-N-bis(2-aminophenyl)phenylene-1,4-dicarboxyamide, 1-N,3-N-bis(2-aminophenyl)phenylene-1,3-dicarboxyamide, 1-N,2-N-bis(2-aminophenyl)phenylene-1,2-dicarboxyamide, 1-N,4-N-bis(4-aminophenyl)-2-methylphenylene-1,4-dicarboxyamide, 1-N,4-N-bis(4-amino-3-methylphenyl)phenylene-1,4-dicarboxyamide, 1-N,3-N-bis (4-aminophenyl)-4-methylphenylene-1,3-dicarboxyamide, 1-N,3-N-bis(4-amino-3-methylphenyl)phenylene-1,3-dicarboxyamide, 1-N,4-N-bis(3-aminophenyl)-2-methylphenylene-1,4-dicarboxyamide, 1-N,4-N-bis(3-amino-4-methylphenyl)phenylene-1,4-dicarboxyamide, 4,4'-(1,4-phenylenebis(methylene)dianiline, 3,4'-(1,4-phenylenebis(methylene)dianiline, 3,3'-(1,4-phenylenebis(methylene)dianiline, 2,4'-(1,4-phenylenebis(methylene)dianiline, 2,3'-(1,4-phenylenebis(methylene)dianiline, 2,2'-(1,4-phenylenebis(methylene)dianiline, 4,4'-(1,3-phenylenebis(methylene)dianiline, 3,4'-(1,3-phenylenebis(methylene)dianiline, 3,3'-(1,3-phenylenebis(methylene)dianiline, 2,4'-(1,3-phenylenebis(methylene)dianiline, 2,3'-(1,3-phenylenebis(methylene)dianiline, 2,2'-(1,3-phenylenebis(methylene)dianiline, 4,4'-(1,2-phenylenebis(methylene)dianiline, 3,4'-(1,2-phenylenebis(methylene)dianiline, 3,3'-(1,2-phenylenebis(methylene)dianiline, 2,4'-(1,2-phenylenebis(methylene)dianiline, 2,3'-(1,2-phenylenebis(methylene)dianiline, 2,2'-(1,2-phenylenebis(methylene)dianiline, 4,4'-(1,4-phenylenebis(oxy)dianiline, 3,4'-(1,4-phenylenebis(oxy)dianiline, 3,3'-(1,4-phenylenebis(oxy)dianiline, 2,4'-(1,4-phenylenebis(oxy)dianiline, 2,3'-(1,4-phenylenebis(oxy)dianiline, 2,2'-(1,4-phenylenebis(oxy)dianiline, 4,4'-(1,3-phenylenebis(oxy)dianiline, 3,4'-(1,3-phenylenebis(oxy)dianiline, 3,3'-(1,3-phenylenebis(oxy)dianiline, 2,4'-(1,3-phenylenebis(oxy)dianiline, 2,3'-(1,3-phenylenebis(oxy)dianiline, 2,2'-(1,3-phenylenebis(oxy)dianiline, 4,4'-(1,2-phenylenebis(oxy)dianiline, 3,4'-(1,2-phenylenebis(oxy)dianiline, 3,3'-(1,2-phenylenebis(oxy)dianiline, 2,4'-(1,2-phenylenebis(oxy)dianiline, 2,3'-(1,2-phenylenebis(oxy)dianiline, 2,2'-(1,2-phenylenebis(oxy)dianiline, 1,4-phenylenebis((4-aminophenyl)methanone), (4-(3-aminobenzoyl)phenyl)(4-aminophenyl)methanone, (4-(2-aminobenzoyl)phenyl)(4-aminophenyl)methanone, 1,4-phenylenebis((3-aminophenyl)methanone), (4-(2-aminobenzoyl)phenyl)(3-aminophenyl)methanone, 1,4-phenylenebis((2-aminophenyl)methanone), 1,3-phenylenebis((4-aminophenyl)methanone), (3-(3-aminobenzoyl)phenyl)(4-aminophenyl)methanone, (3-(2-aminobenzoyl)phenyl)(4-aminophenyl)methanone, 1,3-phenylenebis((3-aminophenyl)methanone), (3-(2-aminobenzoyl)phenyl)(3-aminophenyl)methanone, 1,3-phenylenebis((2-aminophenyl)methanone), 1,2-phenylenebis((4-aminophenyl)methanone), (2-(3-aminobenzoyl)phenyl)(4-aminophenyl)methanone, (2-(2-aminobenzoyl)phenyl)(4-aminophenyl)methanone, 1,2-phenylenebis((3-aminophenyl)methanone), (2-(2-aminobenzoyl)phenyl)(3-aminophenyl)methanone, 1,2-phenylenebis((2-aminophenyl)methanone), bis(4-aminophenyl) terephthalate, 3-aminophenyl-4-aminophenyl terephthalate, 2-aminophenyl-4-aminophenyl terephthalate, bis(3-aminophenyl)terephthalate, 2-aminophenyl-3-aminophenyl terephthalate, bis(3-aminophenyl)terephthalate, bis(4-aminophenyl)isophthalate, 3-aminophenyl-4-aminophenyl isophthalate, 2-aminophenyl-4-aminophenyl isophthalate, bis(3-aminophenyl)isophthalate, 2-aminophenyl-3-aminophenyl isophthalate, bis(3-aminophenyl)isophthalate, bis(4-aminophenyl)phthalate, 3-aminophenyl-4-aminophenyl phthalate, 2-aminophenyl-4-aminophenyl phthalate, bis(3-aminophenyl)phthalate, 2-aminophenyl-3-aminophenyl phthalate, bis(3-aminophenyl)phthalate, 1,4-phenylene-bis(4-aminobenzoate), 4-(4-aminobenzoyloxy)phenyl-3-aminobenzoate, 4-(4-aminobenzoyloxy)phenyl-2-aminobenzoate, 1,4-phenylene-bis(3-aminobenzoate), 4-(3-aminobenzoyloxy)phenyl-2-aminobenzoate, 1,4-phenylene-bis(2-aminobenzoate), 1,3-phenylene-bis(4-aminobenzoate), 3-(4-aminobenzoyloxy)phenyl-3-aminobenzoate, 3-(4-aminobenzoyloxy)phenyl-2-aminobenzoate, 1,3-phenylene-bis(3-aminobenzoate), 3-(3-aminobenzoyloxy)phenyl-2-aminobenzoate, 1,3-phenylene-bis(2-aminobenzoate), 1,2-phenylene-bis(4-aminobenzoate), 2-(4-aminobenzoyloxy)phenyl-3-aminobenzoate, 2-(4-aminobenzoyloxy)phenyl-2-aminobenzoate, 1,2-phenylene-bis(3-aminobenzoate), 2-(3-aminobenzoyloxy)phenyl-2-aminobenzoate, 1,2-phenylene-bis(2-aminobenzoate), 4,4'-(1,4-phenylenebis(sulfanediyl)dianiline, 3,4'-(1,4-phenylenebis(sulfanediyl)dianiline, 3,3'-(1,4-phenylenebis(sulfanediyl)dianiline, 2,4'-(1,4-phenylenebis(sulfanediyl)dianiline, 2,3'-(1,4-phenylenebis(sulfanediyl)dianiline, 2,2'-(1,4-phenylenebis(sulfanediyl)dianiline, 4,4'-(1,3-phenylenebis(sulfanediyl)dianiline, 3,4'-(1,3-phenylenebis(sulfanediyl)dianiline, 3,3'-(1,3-phenylenebis(sulfanediyl)dianiline, 2,4'-(1,3-phenylenebis(sulfanediyl)dianiline, 2,3'-(1,3-phenylenebis(sulfanediyl)dianiline, 2,2'-(1,3-phenylenebis(sulfanediyl)dianiline, 4,4'-(1,2-phenylenebis(sulfanediyl)dianiline, 3,4'-(1,2-phenylenebis(sulfanediyl)dianiline, 3,3'-(1,2-phenylenebis(sulfanediyl)dianiline, 2,4'-(1,2-phenylenebis(sulfanediyl)dianiline, 2,3'-(1,2-phenylenebis(sulfanediyl)dianiline, 2,2'-(1,2-phenylenebis(sulfanediyl)dianiline, 4,4'-(1,4-phenylenebis(sulfonyl)dianiline, 3,4'-(1,4-phenylenebis(sulfonyl)dianiline, 3,3'-(1,4-phenylenebis(sulfonyl)dianiline, 2,4'-(1,4-phenylenebis(sulfonyl)dianiline, 2,3'-(1,4-phenylenebis(sulfonyl)dianiline, 2,2'-(1,4-phenylenebis(sulfonyl)dianiline, 4,4'-(1,3-phenylenebis(sulfonyl)dianiline, 3,4'-(1,3-phenylenebis(sulfonyl)dianiline, 3,3'-(1,3-phenylenebis(sulfonyl)dianiline, 2,4'-(1,3-phenylenebis(sulfonyl)dianiline, 2,3'-(1,3-phenylenebis(sulfonyl)dianiline, 2,2'-(1,3-phenylenebis(sulfonyl)dianiline, 4,4'-(1,2-phenylenebis(sulfonyl)dianiline, 3,4'-(1,2-phenylenebis(sulfonyl)dianiline, 3,3'-(1,2-phenylenebis(sulfonyl)dianiline, 2,4'-(1,2-phenylenebis(sulfonyl)dianiline, 2,3'-(1,2-phenylenebis(sulfonyl)dianiline, and 2,2'-(1,2-phenylenebis(sulfonyl)dianiline.

Examples of the hardener particle [A2] include 4-amino-N-[4-[(4-aminobenzoyl)amino]phenyl]benzamide, 4-amino-N-[3-[(4-aminobenzoyl)amino]phenyl]benzamide, 4-amino-N-[2-[(4-aminobenzoyl)amino]phenyl]benzamide, 3-amino-N-[4-[(3-aminobenzoyl)amino]phenyl]benzamide, 3-amino-N-[3-[(3-aminobenzoyl)amino]phenyl]benzamide, 3-amino-N-[2-[(3-aminobenzoyl)amino]phenyl]benzamide, 2-amino-N-[4-[(2-aminobenzoyl)amino]phenyl]benzamide, 2-amino-N-[3-[(2-aminobenzoyl)amino]phenyl]benzamide, 2-amino-N-[2-[(2-aminobenzoyl)amino]phenyl]benzamide, 3-amino-N-[4-[(4-aminobenzoyl)amino]phenyl]benzamide, 2-amino-N-[4-[(4-aminobenzoyl)amino]phenyl]benzamide, 2-amino-N-[4-[(3-aminobenzoyl)amino]phenyl]benzamide, 3-amino-N-[3-[(4-aminobenzoyl)amino]phenyl]benzamide, 2-amino-N-[3-[(4-aminobenzoyl)amino]phenyl]benzamide, 2-amino-N-[3-[(3-aminobenzoyl)amino]phenyl]benzamide, 3-amino-N-[2-[(4-aminobenzoyl)amino]phenyl]benzamide, 2-amino-N-[2-[(4-aminobenzoyl)amino]phenyl]benzamide, 2-amino-N-[2-[(3-aminobenzoyl)amino]phenyl]benzamide, 4-amino-N-[4-[(4-aminobenzoyl)amino]-2-methylphenyl]benzamide, 4-amino-N-[4-[(4-amino-3-methylbenzoyl)amino]phenyl]-3-methylbenzamide, 4-amino-N-[3-[(4-aminobenzoyl)amino]-2-methylphenyl]benzamide, 4-amino-N-[3-[(4-amino-3-methylbenzoyl)amino]phenyl]-3-methylbenzamide, 3-amino-N-[4-[(3-aminobenzoyl)amino]-2-methylphenyl]benzamide, 3-amino-N-[4-[(3-amino-3-methylbenzoyl)amino]phenyl]-3-methylbenzamide, 1-N,4-N-bis(4-aminophenyl)phenylene-1,4-dicarboxyamide, 1-N,3-N-bis(4-aminophenyl)phenylene-1,3-dicarboxyamide, 1-N,2-N-bis(4- aminophenyl)phenylene-1,2-dicarboxyamide, 1-N,4-N-bis(3-aminophenyl)phenylene-1,4-dicarboxyamide, 1-N,3-N-bis(3-aminophenyl)phenylene-1,3-dicarboxyamide, 1-N,2-N-bis(3-aminophenyl)phenylene-1,2-dicarboxyamide, 1-N,4-N-bis(2-aminophenyl)phenylene-1,4-dicarboxyamide, 1-N,3-N-bis(2-aminophenyl)phenylene-1,3-dicarboxyamide, 1-N,2-N-bis(2-aminophenyl)phenylene-1,2-dicarboxyamide, 1-N,4-N-bis(4-aminophenyl)-2-methylphenylene-1,4-dicarboxyamide, 1-N,4-N-bis(4-amino-3-methylphenyl)phenylene-1,4-dicarboxyamide, 1-N,3-N-bis(4-aminophenyl)-4-methylphenylene-1,3-dicarboxyamide, 1-N,3-N-bis(4-amino-3-methylphenyl)phenylene-1,3-dicarboxyamide, 1-N,4-N-bis(3-aminophenyl)-2-methylphenylene-1,4-dicarboxyamide, and 1-N,4-N-bis(3-amino-4-methylphenyl)phenylene-1,4-dicarboxyamide.

Examples of the hardener [A3] include 4-aminophenyl-4-aminobenzoate, 4-aminophenyl-3-aminobenzoate, 4-aminophenyl-2-aminobenzoate, 3-aminophenyl-4-aminobenzoate, 3-aminophenyl-3-aminobenzoate, 3-aminophenyl-2-aminobenzoate, 2-aminophenyl-4-aminobenzoate, 2-aminophenyl-3-aminobenzoate, aminophenyl-2-aminobenzoate, bis(4-aminophenyl)terephthalate, 3-aminophenyl-4-aminophenyl terephthalate, 2-aminophenyl-4-aminophenyl terephthalate, bis(3-aminophenyl)terephthalate, 2-aminophenyl-3-aminophenyl terephthalate, bis(3-aminophenyl)terephthalate, bis(4-aminophenyl)isophthalate, 3-aminophenyl-4-aminophenyl isophthalate, 2-aminophenyl-4-aminophenyl isophthalate, bis(3-aminophenyl)isophthalate, 2-aminophenyl-3-aminophenyl isophthalate, bis(3-aminophenyl)isophthalate, bis(4-aminophenyl)phthalate, 3-aminophenyl-4-aminophenyl phthalate, 2-aminophenyl-4-aminophenyl phthalate, bis(3-aminophenyl)phthalate, 2-aminophenyl-3-aminophenyl phthalate, bis(3-aminophenyl)phthalate, 1,4-phenylene-bis(4-aminobenzoate), 4-(4-aminobenzoyloxy)phenyl-3-aminobenzoate, 4-(4-aminobenzoyloxy)phenyl-2-aminobenzoate, 1,4-phenylene-bis(3-aminobenzoate), 4-(3-aminobenzoyloxy)phenyl-2-aminobenzoate, 1,4-phenylene-bis(2-aminobenzoate), 1,3-phenylene-bis(4-aminobenzoate), 3-(4-aminobenzoyloxy)phenyl-3-aminobenzoate, 3-(4-aminobenzoyloxy)phenyl-2-aminobenzoate, 1,3-phenylene-bis(3-aminobenzoate), 3-(3-aminobenzoyloxy)phenyl-2-aminobenzoate, 1,3-phenylene-bis(2-aminobenzoate), 1,2-phenylene-bis(4-aminobenzoate), 2-(4-aminobenzoyloxy)phenyl-3-aminobenzoate, 2-(4-aminobenzoyloxy)phenyl-2-aminobenzoate, 1,2-phenylene-bis(3-aminobenzoate), 2-(3-aminobenzoyloxy)phenyl-2-aminobenzoate, and 1,2-phenylene-bis(2-aminobenzoate). In particular, each of $R^1$ to $R^6$ is preferably a hydrogen atom in terms of compatibility with other epoxy resins. In terms of flame retardancy, $R^1$ to $R^6$ may also be partially substituted with a halogen atom such as Cl or Br.

Furthermore, to provide the resulting cured epoxy resin with a high flexural modulus and high toughness and provide the resulting carbon fiber-reinforced composite material with a high tensile strength and a high compression strength, the hardener [A1] is preferably an aromatic diamine compound having a structure represented by Formula (2) or Formula (3) below:

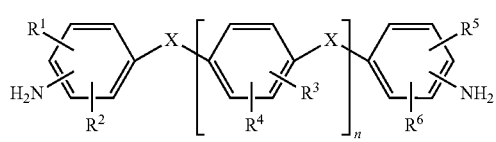

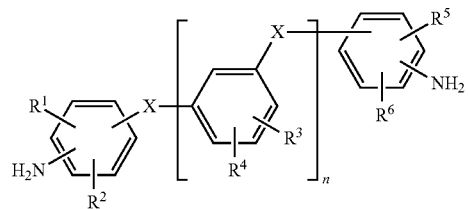

wherein X represents any one selected from —CH$_2$—, —O—, —CO—, —C(=O)O—, —S—, —SO$_2$—, and —NHC(=O)—; n represents 1 to 5; and $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein when X is —C(=O)O— or —NHC(=O)—, X may be in either direction.

Examples of such aromatic diamine compounds include 4,4'-(1,4-phenylenebis(methylene)dianiline, 3,4'-(1,4-phenylenebis(methylene)dianiline, 4,4'-(1,3-phenylenebis(methylene)dianiline, 4,4'-(1,4-phenylenebis(oxy)dianiline, 3,4'-(1,4-phenylenebis(oxy)dianiline, 4,4'-(1,3-phenylenebis(oxy)dianiline, 1,4-phenylenebis((4-aminophenyl)methanone), (4-(3-aminobenzoyl)phenyl)(4-aminophenyl)methanone, 1,3-phenylenebis((4-aminophenyl)methanone), bis(4-aminophenyl)terephthalate, 3-aminophenyl-4-aminophenyl terephthalate, bis(4-aminophenyl)isophthalate, 1,4-phenylene-bis(4-aminobenzoate), 4-(4-aminobenzoyloxy)phenyl-3-aminobenzoate, 1,3-phenylene-bis(4-aminobenzoate), 4,4'-(1,4-phenylenebis(sulfanediyl)dianiline, 3,4'-(1,4-phenylenebis(sulfanediyl)dianiline, 4,4'-(1,3-phenylenebis(sulfanediyl)dianiline, 4,4'-(1,4-phenylenebis(sulfonyl)dianiline, 3,4'-(1,4-phenylenebis(sulfonyl)dianiline, 4,4'-(1,3-phenylenebis(sulfonyl)dianiline, 4-amino-N-[4-[(4-aminobenzoyl)amino]phenyl]benzamide, 4-amino-N-[3-[(4-aminobenzoyl)amino]phenyl]benzamide, 3-amino-N-[4-[(3-aminobenzoyl)amino]phenyl]benzamide, 1-N,4-N-bis(4-aminophenyl)phenylene-1,4-dicarboxyamide, 1-N,3-N-bis(4-aminophenyl)phenylene-1,3-dicarboxyamide, and 1-N,4-N-bis(3-aminophenyl)phenylene-1,4-dicarboxyamide.

To provide the resulting cured epoxy resin with a flexural modulus and toughness and provide the resulting carbon fiber-reinforced composite material with a high tensile strength and a high compression strength, the hardener [A1] is characterized in that n=1 to 5 in Formula (2) or Formula (3), and more preferably, n=1 to 3. If n=0, the carbon nuclear relaxation time $T_1^C$ corresponding to a benzene ring carbon atom in the main backbone of Formula (1) assigned to a peak at 130 ppm in a solid-state $^{13}$C-NMR spectrum will be shorter than 42 seconds, reducing the tensile strength and the compression strength of the carbon fiber-reinforced composite material. In addition, the curing calorific value as determined by differential scanning calorimetry (DSC) at a temperature ramp rate of 5° C./min will be 450 J/g or more, and heat generated during the curing reaction of the epoxy resin composition is accumulated inside, whereby not only the components are overheated during molding of the carbon fiber-reinforced composite material, affecting mechanical characteristics of the cured epoxy resin, such as flexural modulus and toughness, but also the abnormal heat generation can compromise safety during molding. If n is 6 or more, the compatibility of the hardener [A1] with epoxy resin will be reduced, and the effect of improving the strength of the cured epoxy resin may not be produced; and the epoxy resin composition will have a significantly increased viscosity, which may reduce the processability and handling property in producing a prepreg.

The hardener particle [A2] is preferably an aromatic diamine compound having a structure represented by Formula (5) or Formula (6) below.

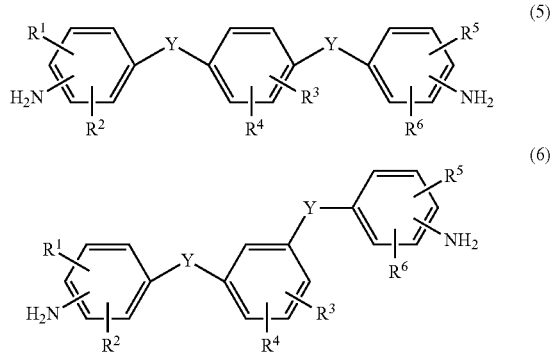

wherein Y represents —NHC(=O)—, and $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein Y may be in either direction.

Examples of such aromatic diamine compounds include 4-amino-N-[4-[(4-aminobenzoyl)amino]phenyl]benzamide, 4-amino-N-[3-[(4-aminobenzoyl)amino]phenyl]benzamide, 3-amino-N-[4-[(3-aminobenzoyl)amino]phenyl]benzamide, 1-N,4-N-bis(4-aminophenyl)phenylene-1,4-dicarboxyamide, 1-N,3-N-bis(4-aminophenyl)phenylene-1,3-dicarboxyamide, and 1-N,4-N-bis(3-aminophenyl)phenylene-1,4-dicarboxyamide.

Examples of commercially available products of 1-N,4-N-bis(4-aminophenyl)phenylene-1,4-dicarboxyamide include 4-APTP (Nipponjunryo Chemicals K.K.). Examples of commercially available products of 4-amino-N-[4-[(4-aminobenzoyl)amino]phenyl]benzamide include 4-ABPA (Nipponjunryo Chemicals K.K.).

To provide the resulting cured epoxy resin with a flexural modulus and toughness and provide the resulting carbon fiber-reinforced composite material with a high tensile strength and a high compression strength, the hardener [A3] is characterized in that n=0 to 5 in Formula (7), and more preferably, n=0. When n=0, the hardener [A3] has a small molecular weight between crosslinking points, which enables a configuration that easily forms a hydrogen bond with surrounding functional groups having a hydrogen-bonding property compared to the cases where n=1 to 5, as a result of which the epoxy resin backbone has a rigid molecular chain, and the carbon nuclear relaxation time $T_1^C$ as determined by solid-state NMR measurement may be long.

Examples of such aromatic diamine compounds include 4-aminophenyl-4-aminobenzoate, 4-aminophenyl-3-aminobenzoate, 4-aminophenyl-2-aminobenzoate, 3-aminophenyl-4-aminobenzoate, 3-aminophenyl-3-aminobenzoate, 3-aminophenyl-2-aminobenzoate, 2-aminophenyl-4-aminobenzoate, 2-aminophenyl-3-aminobenzoate, and 2-aminophenyl-2-aminobenzoate.

Examples of commercially available products of 4-aminophenyl-4-aminobenzoate include 4-BAAB (Nipponjunryo Chemicals K.K.).

If n is 6 or more in Formula (7), the hardener [A3] will have too large a molecular weight between crosslinking points, which may make it difficult to form a hydrogen bond with surrounding functional groups having a hydrogen-bonding property and may reduce the compatibility of the hardener [A3] with epoxy resin, and the effect of improving the strength of the cured epoxy resin may not be produced. In addition, the epoxy resin composition will have a significantly increased viscosity, which may reduce the processability and handling property in producing a prepreg.

For the amount of addition of the hardener [A1], the hardener particle [A2], or the hardener [A3], the equivalent ratio of all active hydrogens of amino groups in all the hardener components to all epoxy groups in the epoxy resin composition is preferably 0.5 to 0.9, more preferably 0.5 to 0.8. When the amount of the hardener [A1], the hardener particle [A2], or the hardener [A3] in the epoxy resin is in this preferred range, the flexural modulus and the toughness of the cured epoxy resin and the tensile strength and the compression strength of the resulting carbon fiber-reinforced composite material are greatly improved, and the strength of the cured epoxy resin can be sufficiently improved without reducing the compatibility between the hardener [A1], the hardener particle [A2], or the hardener [A3] and the epoxy resin composition.

In the present invention, a hardener other than the hardener [A1], the hardener particle [A2], or the hardener [A3] may be used in combination. Examples of hardeners other than the hardener [A1], the hardener particle [A2], or the hardener [A3] include dicyandiamide, aromatic amine hardeners, amino benzoic acid esters, various acid anhydrides, phenol novolac resins, cresol novolac resins, polyphenols, imidazole derivatives, aliphatic amines, tetramethylguanidine, thiourea added amine, carboxylic acid anhydrides such as methyl hexahydrophthalic acid anhydride, carboxylic acid hydrazides, carboxylic acid amides, polymercaptans, and lewis complexes such as boron trifluoride ethylamine complexes. Of these, aromatic amine hardeners, which provide a cured epoxy resin excellent in heat resistance and mechanical characteristics, are preferably used. In particular, using diaminodiphenyl sulfone as an aromatic diamine hardener in combination with the hardener [A1], the hardener particle [A2], or the hardener [A3] is preferred because the compatibility of the hardener [A1], the hardener particle [A2], or the hardener [A3] with epoxy resin is improved, as a result of which the heat resistance of the resulting cured epoxy resin can be improved, and the resulting carbon fiber-reinforced composite material can exhibit a high tensile strength and a high compression strength.

Examples of commercially available products of aromatic amine hardeners include 4,4'-DABAN 3,4'-DABAN (Nipponjunryo Chemicals K.K.), SEIKSCURE-S (Wakayama Seika Kogyo Co., Ltd.), MDA-220 (Mitsui Chemicals, Inc.), "jERCURE" (registered trademark) W (Mitsubishi Chemical Corporation), 3,3'-DAS (Mitsui Chemicals, Inc.), "Lonzacure" (registered trademark) M-DEA, "Lonzacure" (registered trademark) M-DIPA, "Lonzacure" (registered trademark) M-MIPA, and "Lonzacure" (registered trademark) DETDA 80 (Lonza).

Furthermore, these epoxy resins and hardeners, or preliminarily partially reacted products thereof can also be added to the composition. This method can be effective for adjusting the viscosity and improving the preservation stability.

The aromatic epoxy resin [B] having tri- or higher functionality contained in the epoxy resin composition of the present invention is an essential component because it provides excellent heat resistance and mechanical characteristics. The amount of the aromatic epoxy resin [B] having tri- or higher functionality is preferably 40 to 90% by mass based on 100% by mass of the total amount of epoxy resin contained in the epoxy resin composition of the present invention, more preferably 50 to 90% by mass, and still more preferably 50 to 80% by mass. When the amount of the aromatic epoxy resin [B] having tri- or higher functionality is in this preferred range, the cured epoxy resin is provided with sufficiently high toughness, and at the same time, the strength of the cured epoxy resin can be sufficiently improved.

Examples of the type of the aromatic epoxy resin [B] having tri- or higher functionality include diaminodiphenylmethane type, aminophenol type, metaxylenediamine type, phenol novolac type, orthocresol novolac type, tris hydroxyphenylmethane type, tetra phenylol ethane type, naphthalene type, biphenyl type, and isocyanurate type, and a glycidyl amine type epoxy resin having a structural formula represented by Formula (8) below is preferably used because the resulting carbon fiber-reinforced composite material can be provided with a high tensile strength and a high compression strength:

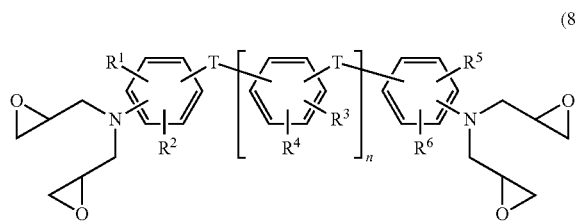

(8)

wherein T represents any one selected from —CH$_2$—, —O—, —CO—, —C(=O)O—, —S—, —SO$_2$—, and —NHC(=O)—; n represents 0 to 5; and R$^1$ to R$^6$ each represent at least one selected from the group consisting of a hydrogen atom, an aliphatic hydrocarbon group having 1 to 4 carbon atoms, an alicyclic hydrocarbon group having 4 or less carbon atoms, and a halogen atom, wherein when T in Formula (8) is —C(=O)O— or —NHC(=O)—, T may be in either direction.

Examples of such glycidyl amine type epoxy resins include N,N,N',N'-tetraglycidyl-4,4'-diaminodiphenylmethane, N,N,N',N'-tetraglycidyl-3,4-diaminodiphenylmethane, N,N,N',N'-tetraglycidyl-2,4-diaminodiphenylmethane, N,N,N',N'-tetraglycidyl-3,3'-diaminodiphenylmethane, N,N,N',N'-tetraglycidyl-2,3-diaminodiphenylmethane, N,N,N',N'-tetraglycidyl-2,2'-diaminodiphenylmethane, N,N,N',N'-tetraglycidyl-4,4'-diaminodiphenyl ether, N,N,N',N'-tetraglycidyl-3,4-diaminodiphenyl ether, N,N,N',N'-tetraglycidyl-2,4-diaminodiphenyl ether, N,N,N',N'-tetraglycidyl-3,3'-diaminodiphenyl ether, N,N,N',N'-tetraglycidyl-2,3-diaminodiphenyl ether, N,N,N',N'-tetraglycidyl-2,2'-diaminodiphenyl ether, N,N,N',N'-tetraglycidyl-4,4'-diaminobenzophenone, N,N,N',N'-tetraglycidyl-3,4-diaminobenzophenone, N,N,N',N'-tetraglycidyl-2,4-diaminobenzophenone, N,N,N',N'-tetraglycidyl-3,3'-diaminobenzophenone, N,N,N',N'-tetraglycidyl-2,3-diaminobenzophenone, N,N,N',N'-tetraglycidyl-2,2'-diaminobenzophenone, N,N,N',N'-tetraglycidyl-4-aminophenyl-4-aminobenzoate, N,N,N',N'-tetraglycidyl-3-aminophenyl-4-aminobenzoate, N,N,N',N'-tetraglycidyl-2-aminophenyl-4-aminobenzoate, N,N,N',N'-tetraglycidyl-3-aminophenyl-3-aminobenzoate, N,N,N',N'-tetraglycidyl-2-aminophenyl-3-aminobenzoate, N,N,N',N'-tetraglycidyl-2-aminophenyl-2-aminobenzoate, N,N,N',N'-tetraglycidyl-4-aminophenyl-3-aminobenzoate, N,N,N',N'-tetraglycidyl-4-aminophenyl-2-aminobenzoate, N,N,N',N'-tetraglycidyl-3-aminophenyl-2-aminobenzoate, N,N,N',N'-tetraglycidyl-4,4'-diaminodiphenylthio ether, N,N,N',N'-tetraglycidyl-3,4-diaminodiphenylthio ether, N,N,N',N'-tetraglycidyl-2,4-diaminodiphenylthio ether, N,N,N',N'-tetraglycidyl-3,3'-diaminodiphenylthio ether, N,N,N',N'-tetraglycidyl-2,3-diaminodiphenylthio ether, N,N,N',N'-tetraglycidyl-2,2'-diaminodiphenylthio ether, N,N,N',N'-tetraglycidyl-4,4'-diaminodiphenyl sulfone, N,N,N',N'-tetraglycidyl-3,4-diaminodiphenyl sulfone, N,N',N'-tetraglycidyl-2,4-diaminodiphenyl sulfone, N,N,N',N'-tetraglycidyl-3,3'-diaminodiphenyl sulfone, N,N,N',N'-tetraglycidyl-2,3-diaminodiphenyl sulfone, N,N,N',N'-tetraglycidyl-2,2'-diaminodiphenyl sulfone, N,N,N',N'-tetraglycidyl-4,4'-diaminobenzanilide, N,N,N',N'-tetraglycidyl-3,4-diaminobenzanilide, N,N,N',N'-tetraglycidyl-2,4-diaminobenzanilide, N,N,N',N'-tetraglycidyl-3,3'-diaminobenzanilide, N,N,N',N'-tetraglycidyl-2,3-diaminobenzanilide, N,N,N',N'-tetraglycidyl-2,2'-diaminobenzanilide, N,N,N',N'-tetraglycidyl-4,3-diaminobenzanilide, N,N,N',N'-tetraglycidyl-4,2-diaminobenzanilide, and N,N,N',N'-tetraglycidyl-3,2-diaminobenzanilide.

Of these, glycidyl amine type epoxy resins wherein T in Formula (8) is —SO$_2$— or —NHC(=O)— are particularly preferred. When T in Formula (8) is —SO$_2$—, the hardener [A1], the hardener particle [A2], or the hardener 1[A3] in the epoxy resin composition and a thermoplastic resin [D] soluble in epoxy resin described hereinbelow may have improved compatibility with epoxy resin, and the resulting carbon fiber-reinforced composite material can exhibit a high tensile strength and a high compression strength. When T in Formula (8) is —NHC(=O)—, —NHC(=O)— in the aromatic epoxy resin [B] having tri- or higher functionality easily forms a hydrogen bond with surrounding functional groups having a hydrogen-bonding property in the molecule, and having such a structure enables a stable conjugated structure, as a result of which the epoxy resin backbone has a rigid molecular chain, and the carbon nuclear relaxation time $T_1^C$ as determined by solid-state NMR measurement may be long. As a result of this, the carbon fiber-reinforced composite material can be provided with a high tensile strength and a high compression strength.

The aromatic epoxy resin [B] having tri- or higher functionality for use in the present invention can be prepared by reacting an aromatic amine compound represented by Formula (8-2) below with epichlorohydrin:

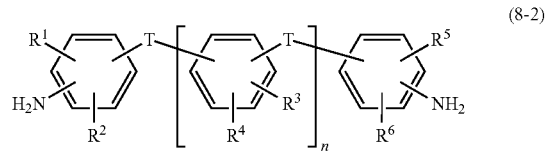

(8-2)

wherein T represents any one selected from —CH$_2$—, —O—, —CO—, —C(=O)O—, —S—, —SO$_2$—, and —NHC(=O)—; n represents 0 to 5; and R$^1$ to R$^6$ each represent at least one selected from the group consisting of a hydrogen atom, an aliphatic hydrocarbon group having 1 to 4 carbon atoms, an alicyclic hydrocarbon group having 4 or less carbon atoms, and an a halogen atom, wherein when T in Formula (8-2) is —C(=O)O— or —NHC(=O)—, T may be in either direction.

In the epoxy resin composition of the present invention, a preferred combination of the hardener [A1], the hardener particle [A2], or the hardener [A3] and the aromatic epoxy resin [B] having tri- or higher functionality is a combination of the hardener [A1], the hardener particle [A2], or the hardener [A3], which is able to reduce molecular mobility, and a glycidyl amine type epoxy resin [B] having a structure represented by Formula (8), because the resulting cured epoxy resin has a long carbon nuclear relaxation time $T_1^C$. In particular, the combination of the hardener [A1] wherein X in Formula (1) is —NHC(=O)— or the hardener particle [A2] and the glycidyl amine type epoxy resin [B] wherein T in Formula (8) is —NHC(=O)— is preferred because —NHC(=O)— in the both components more easily form a hydrogen bond in the molecule than when each component is used alone, and the range of a stable conjugated structure extends, as a result of which the resulting cured epoxy resin has a long carbon nuclear relaxation time $T_1^C$, and the carbon fiber-reinforced composite material can be provided with a particularly excellent tensile strength and compression strength.

Examples of commercially available products of the aromatic epoxy resin [B] having tri- or higher functionality include the following.

Examples of commercially available products of diaminodiphenylmethane type epoxy resin include "ELM" (registered trademark) 434 (Sumitomo Chemical Co., Ltd.), "Araldite" (registered trademark) MY720, "Araldite" (registered trademark) MY721, "Araldite" (registered trademark) MY9512, "Araldite" (registered trademark) MY9663 (Huntsman Advanced Materials), and "Epotohto" (registered trademark) YH-434 (Nippon Steel & Sumikin Chemical Co., Ltd.). Examples of commercially available products of aminophenol type epoxy resin include "ELM" (registered trademark) 120, "ELM" (registered trademark) 100 (Suimitomo Chemical Co., Ltd.), "jER" (registered trademark) 630 (Mitsubishi Chemical Corporation), and "Araldite" (registered trademark) MY0510, "Araldite" (registered trademark) MY0600 (Huntsman Advanced Materials). Examples of commercially available products of metaxylenediamine type epoxy resin include "TETRAD" (registered trademark) X (Mitsubishi Gas Chemical Company, Inc.). Examples of commercially available products of phenol novolac type epoxy resin include "D.E.N." (registered trademark) 431, "D.E.N." (registered trademark) 438 (Dow Chemical Company), and "jER" (registered trademark) 152, "jER" (registered trademark) 154 (Mitsubishi Chemical Corporation). Examples of commercially available products of orthocresol novolac type epoxy resin include "EOCN" (registered trademark) 1020 (Nippon Kayaku Co., Ltd.) and "EPICLON" (registered trademark) N-660 (DIC Corporation). Examples of commercially available products tris hydroxyphenylmethane type epoxy resin include "Tactix" (registered trademark) 742 (Huntsman Advanced Materials). Examples of commercially available products of tetra phenylol ethane type epoxy resin include "jER" (registered trademark) 1031S (Mitsubishi Chemical Corporation). Examples of commercially available products of biphenyl type epoxy resin include NC-3000 (Nippon Kayaku Co., Ltd.). Examples of commercially available products of dicyclopentadiene type epoxy resin include "EPICLON" (registered trademark) HP7200 (DIC Corporation). Examples of commercially available products of isocyanurate type epoxy resin include "TEPIC" (registered trademark) P (Nissan Chemical Industries, Ltd.).

In the present invention, epoxy resins other than [B], copolymers of epoxy resin and thermosetting resin, and other components may be added. Examples of the thermosetting resin used copolymerized with epoxy resin include unsaturated polyester resins, vinyl ester resins, epoxy resins, benzoxazine resins, phenol resins, urea resins, melamine formaldehyde resins, and polyimide resins. These resin compositions and compounds may be used alone or may be used in combination as required.

Examples of epoxy resins other than [B] include bisphenol A type epoxy resins, bisphenol F type epoxy resins, bisphenol S type epoxy resins, resorcinol type epoxy resins, 1,3-bisaminomethylcyclohexane type epoxy resins, urethane-modified epoxy resins, and hydantoin type epoxy resins.

Examples of commercially available products of bisphenol A type epoxy resin include "jER" (registered trademark) 825, "jER" (registered trademark) 828, "jER" (registered trademark) 1001, "jER" (registered trademark) 1004, "jER" (registered trademark) 1007 (Mitsubishi Chemical Corporation), "EPICLON" (registered trademark) 850 (DIC Corporation), and "Epotohto" (registered trademark) YD-128 (Nippon Steel & Sumikin Chemical Co., Ltd.).

Examples of commercially available products of bisphenol F type epoxy resin include "jER" (registered trademark) 806, "jER" (registered trademark) 807, jER" (registered trademark) 4005P, "jER" (registered trademark) 4007P (Mitsubishi Chemical Corporation), "EPICLON" (registered trademark) 830 (DIC Corporation), and "Epotohto" (registered trademark) YD-170, "Epotohto" (registered trademark) YDF-2001 (Nippon Steel & Sumikin Chemical Co., Ltd.).

Examples of commercially available products of resorcinol type epoxy resin include "Denacol" (registered trademark) EX-201 (Nagase ChemteX Corporation). Examples of commercially available products of 1,3-bisaminomethylcyclohexane type epoxy resin include "TETRAD" (registered trademark) C (Mitsubishi Gas Chemical Company, Inc.). Examples of commercially available products of urethane-modified epoxy resin include AER4152 (Asahi Kasei Epoxy Co., Ltd.). Examples of commercially available products of hydantoin type epoxy resin include AY238 (Huntsman Advanced Materials).

The epoxy resin compositions (i) to (iii) of the present invention may also include an epoxy resin [C] having at least one ring structure having a 4- or more membered ring and one or two amine type glycidyl groups or ether type glycidyl groups directly connected to the ring structure. When the epoxy resin [C] in contained the epoxy resin composition has at least one ring structure having a 4- or more membered ring, it means that the epoxy resin [C] has at least one 4- or more membered single ring structure, such as cyclohexane, benzene, or pyridine, or has at least one condensed ring structure composed of a plurality of 4- or more membered rings, such as phthalimide, naphthalene, or carbazole.

The amine type glycidyl group or ether type glycidyl group directly connected to the ring structure of the epoxy resin [C] means having a structure in which N (in the case of amine type) or O (in the case of ether type) is bonded to the ring structure such as benzene or phthalimide. The epoxy resin [C] has one or two epoxy groups in the case of amine type, and one epoxy group in the case of ether type (hereinafter, the epoxy resin [C] having one epoxy group is also referred to as [C1], and the epoxy resin [C] having two epoxy groups as [C2]). The amount of the epoxy resin [C] is preferably 10 to 60% by mass based on 100% by mass of the total amount of epoxy resin. When the amount of the epoxy resin [C] is in this preferred range, the tensile strength and the compression strength of the carbon fiber-reinforced composite material are sufficiently improved, while the heat resistance is not reduced. For the epoxy resin [C], the epoxy resin [C1] having one epoxy group is superior in exhibiting mechanical characteristics, and the epoxy resin [C2] having two epoxy groups is superior in heat resistance. Thus, the amount of the epoxy resin [C], when the epoxy resin [C1] is used, is preferably 10 to 40% by mass based on the total amount of epoxy resin, more preferably 15 to 30% by mass. When the epoxy resin [C2] is used, the amount of the epoxy resin [C] is preferably 25 to 60% by mass based on the total amount of epoxy resin, more preferably 30 to 50% by mass.

Examples of the epoxy resin [C1] include glycidyl phthalimide, glycidyl-1,8-naphthalimide, glycidyl carbazole, glycidyl-3,6-dibromocarbazole, glycidylindole, glycidyl-4-acetoxyindole, glycidyl-3-methylindole, glycidyl-3-acetylindole, glycidyl-5-methoxy-2-methylindole, o-phenyl phenyl glycidyl ether, p-phenyl phenyl glycidyl ether, p-(3-methylphenyl)phenyl glycidyl ether, 2,6-dibenzyl phenyl glycidyl ether, 2-benzyl phenyl glycidyl ether, 2,6-diphenyl phenyl glycidyl ether, 4-α-cumylphenyl glycidyl ether, o-phenoxy phenyl glycidyl ether, and p-phenoxy phenyl glycidyl ether.

The epoxy resin [C2] having two epoxy groups preferably has N,N-diglycidyl aniline, N,N-diglycidyl toluidine, or a structure represented by Formula (9) below:

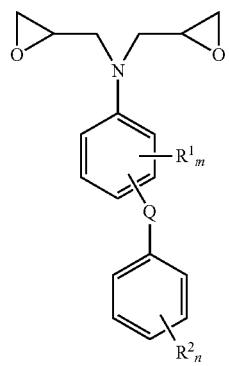

(9)

wherein $R^1$ and $R^2$ each represent at least one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group; n is an integer of 0 to 4; m is an integer of 0 to 5; when a plurality of $R^1$ and a plurality of $R^2$ are present, the plurality of $R^1$ and the plurality of $R^2$ each may be the same or different; and Q represents any one selected from —$CH_2$—, —O—, —CO—, —C(=O)O—, —S—, —$SO_2$—, and —NHC(=O)—, wherein when Q in Formula (9) is —C(=O)O— or —NHC(=O)—, Q may be in either direction. The epoxy resin composition preferably includes the epoxy resin [C2] in an amount of 25 to 60% by mass based on 100% by mass of the total amount of epoxy resin.

Examples of the epoxy resin [C2] having one ring structure having a 4- or more membered ring for use in the present invention include N,N-diglycidyl aniline and N,N-diglycidyl toluidine, and examples of the epoxy resin [C2] having two or more ring structures each having a 4- or more membered ring include N,N-diglycidyl-4-phenoxyaniline. N,N-diglycidyl-4-(4-methylphenoxy)aniline, N,N-diglycidyl-4-(4-tert-butylphenoxy)aniline, and N,N-diglycidyl-4-(4-phenoxyphenoxy)aniline. The epoxy resin [C2] having two or more ring structures each having a 4- or more membered ring is produced, in most cases, by addition of epichlorohydrin to a phenoxyaniline derivative, followed by cyclization with an alkali compound. As the viscosity increases with increasing molecular weight, N,N-diglycidyl-4-phenoxyaniline, which is the epoxy resin [C2] wherein $R^1$ and $R^2$ are both hydrogen, is particularly preferred from the standpoint of handling property.

Specific examples of phenoxyaniline derivatives include 4-phenoxyaniline, 4-(4-methylphenoxy)aniline, 4-(3-methylphenoxy)aniline, 4-(2-methylphenoxy)aniline, 4-(4-ethylphenoxy)aniline, 4-(3-ethylphenoxy)aniline, 4-(2-ethylphenoxy)aniline, 4-(4-propylphenoxy)aniline, 4-(4-tert-butylphenoxy)aniline, 4-(4-cyclohexylphenoxy)aniline, 4-(3-cyclohexylphenoxy)aniline, 4-(2-cyclohexylphenoxy)aniline, 4-(4-methoxyphenoxy)aniline, 4-(3-methoxyphenoxy)aniline, 4-(2-methoxyphenoxy)aniline, 4-(3-phenoxyphenoxy)aniline, 4-(4-phenoxyphenoxy)aniline, 4-[4-(trifluoromethyl)phenoxy]aniline, 4-[3-(trifluoromethyl)phenoxy]aniline, 4-[2-(trifluoromethyl)phenoxy]aniline 4-(2-naphthyloxyphenoxy)aniline, 4-(1-naphthyloxyphenoxy)aniline, 4-[(1,1'-biphenyl-4-yl)oxy] aniline, 4-(4-nitrophenoxy)aniline, 4-(3-nitrophenoxy)aniline, 4-(2-nitrophenoxy)aniline, 3-nitro-4-aminophenyl phenyl ether, 2-nitro-4-(4-nitrophenoxy)aniline, 4-(2,4-dinitrophenoxy)aniline, 3-nitro-4-phenoxyaniline, 4-(2-chlorophenoxy)aniline, 4-(3-chlorophenoxy)aniline, 4-(4-chlorophenoxy)aniline, 4-(2,4-dichlorophenoxy)aniline, 3-chloro-4-(4-chlorophenoxy)aniline, and 4-(4-chloro-3-tolyloxy)aniline.

A method of preparing the epoxy resin [C2] for use in the present invention will now be described.

The epoxy resin [C2] for use in the present invention can be prepared by reacting a phenoxyaniline derivative represented by Formula (10) with epichlorohydrin:

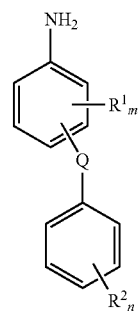

(10)

wherein $R^1$ and $R^2$ each represent at least one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group; n is an integer of 0 to 4; m is an integer of 0 to 5; when a plurality of $R^1$ and a plurality of $R^2$ are present, the plurality of $R^1$ and the plurality of $R^2$ each may be the same or different; and Q represents any one selected from —$CH_2$—, —O—, —CO—, —C(=O)O—, —S—, —SO—, and —NHC (=O)—, wherein when Q in Formula (10) is —C(=O)O— or —NHC(=O)—, Q may be in either direction.

In other words, the method of preparing the epoxy resin [C2], similarly to the common method of preparing an epoxy resin, includes an addition step of adding two molecules of epichlorohydrin to one molecule of a phenoxyaniline derivative to form a dichlorohydrin compound represented by Formula (11) below:

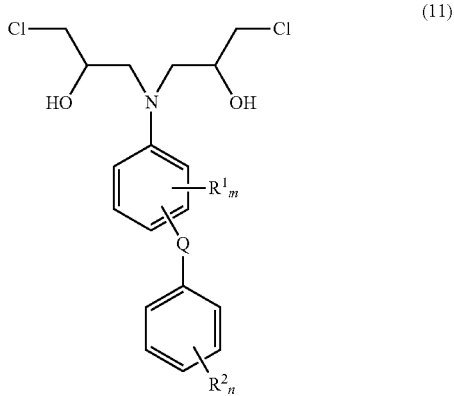

wherein $R^1$ and $R^2$ each represent at least one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group; n is an integer of 0 to 4; m is an integer of 0 to 5; when a plurality of $R^1$ and a plurality of $R^2$ are present, the plurality of $R^1$ and the plurality of $R^2$ each may be the same or different; and Q represents any one selected from —CH$_2$—, —O—, —CO—, —C(=O)O—, —S—, —SO$_2$—, and —NHC(=O)—, wherein when Q in Formula (11) is —C(=O)O— or —NHC(=O)—, Q may be in either direction; and a subsequent cyclization step of dehydrochlorinating the dichlorohydrin compound with an alkali compound to form an epoxy compound having two epoxy groups represented by Formula (9) below:

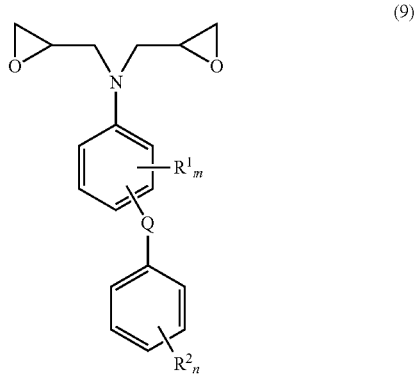

wherein $R^1$ and $R^2$ each represent at least one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group; n is an integer of 0 to 4; m is an integer of 0 to 5; when a plurality of $R^1$ and a plurality of $R^2$ are present, the plurality of $R^1$ and the plurality of $R^2$ each may be the same or different; and Q represents any one selected from —CH$_2$—, —O—, —CO—, —C(=O)O—, —S—, —SO$_2$—, and —NHC(=O)—, wherein when Q in Formula (9) is —C(=O)O— or —NHC(=O)—, Q may be in either direction.

Examples of commercially available products of the epoxy resin [C1] include "Denacol" (registered trademark) Ex-731 (glycidyl phthalimide, Nagase ChemteX Corporation) and OPP-G (o-phenyl phenyl glycidyl ether, Sanko Co., Ltd.), and examples of commercially available products of the epoxy resin [C2] include GAN (N,N-diglycidyl aniline), GOT (N,N-diglycidyl toluidine) (Nippon Kayaku Co., Ltd.), and TORAY EPOXY PG-01 (diglycidyl-p-phenoxyaniline, Toray Fine Chemicals Co., Ltd.).

When the epoxy resin composition of the present invention contains the aromatic epoxy resin [B] having tri- or higher functionality and the epoxy resin [C], preferably, the amount of [B] is 40 to 90% by mass, and the amount of [C] is 10 to 60% by mass; more preferably, the amount of [B] is 50 to 90% by mass, and the amount of [C] is 10 to 50% by mass; and still more preferably, the amount of [B] is 50 to 80% by mass, and the amount of [C] is 20 to 50% by mass, the percentages being based on 100% by mass of the total amount of epoxy resin. When the amounts of the aromatic epoxy resin [B] having tri- or higher functionality and the epoxy resin [C] are in such a preferred range, the flexural modulus and the heat resistance are not reduced, and furthermore, the toughness is not reduced because the cross-linking density is not too high. In addition, when the amount of the epoxy resin [C] is in such a preferred range, the mechanical characteristics of the resulting carbon fiber-reinforced composite material, such as tensile strength and compression strength, are greatly improved, while the heat resistance is not reduced.

In the epoxy resin composition of the present invention, the combination of the hardener [A1], the hardener particle [A2], or the hardener [A3], the aromatic epoxy resin [B] having tri- or higher functionality, and the epoxy resin [C] that exhibits excellent mechanical characteristics is preferably used because the resulting cured epoxy resin exhibits a long carbon nuclear relaxation time $T_1^C$ and a low rubbery state elastic modulus. In particular, the combination of the hardener [A1] wherein X in Formula (1) is —NHC(=O)—, the hardener particle [A2], or the hardener [A3] and the epoxy resin [C2] having two epoxy groups is preferred because it can reduce the increase in cross-linking density of the cured epoxy resin while reducing the molecular mobility of the epoxy resin backbone, and the resulting cured epoxy resin exhibits a long carbon nuclear relaxation time $T_1^C$, as determined by solid-state NMR measurement, and a low rubbery state elastic modulus. As a result of this, the resulting carbon fiber-reinforced composite material can be provided with a tensile strength and a compression strength, between which there is a trade-off, both at a high level. When this combination is used, preferably, the carbon nuclear relaxation time $T_1^C$ corresponding to a benzene ring carbon atom in the main backbone of Formula (1) assigned to a peak at 130 ppm in a solid-state $^{13}$C-NMR spectrum is 42 seconds or longer, and the rubbery state elastic modulus is 15 MPa or less; more preferably, the carbon nuclear relaxation time $T_1^C$ corresponding to a benzene ring carbon atom in the main backbone of Formula (1) assigned to a peak at 130 ppm in a solid-state $^{13}$C-NMR spectrum is 45 seconds or longer, and the rubbery state elastic modulus is 13 MPa or less; and still more preferably, the carbon nuclear relaxation time $T_1^C$ corresponding to a benzene ring carbon atom in the main backbone of Formula (1) assigned to a peak at 130 ppm in a solid-state $^{13}$C-NMR spectrum is 48 seconds or longer, and the rubbery state elastic modulus is 10 MPa or less.

The epoxy resin composition of the present invention may also include a thermoplastic resin [D] soluble in an epoxy resin composition. Dissolving the thermoplastic resin [D] in an epoxy resin composition often gives better results than using each of them alone. The high toughness of the thermoplastic resin [D] offsets the brittleness of the epoxy resin composition, and the epoxy resin composition offsets the molding difficulty of the thermoplastic resin [D], resulting in a well-balanced base resin. As used herein, "soluble in an epoxy resin composition" refers to there being a temperature range where a mixture of the thermoplastic resin [D] with an epoxy resin composition consisting of the aromatic epoxy resin [B] having tri- or higher functionality and other epoxy resins is heated or heated under stirring to form a homogeneous phase. As used herein, "forming a homogeneous phase" refers to creating a state where there is at least no visible separation. If a homogeneous phase is formed in a certain temperature range, it doesn't matter if separation occurs outside the temperature range, for example, at room temperature. The solubility of the thermoplastic resin [D] in an epoxy resin composition consisting of the aromatic epoxy resin [B] having tri- or higher functionality and other epoxy resins can be evaluated also by the following method. Specifically, powder of the thermoplastic resin [D] is mixed with an epoxy resin composition consisting of the aromatic epoxy resin [B] having tri- or higher functionality and other epoxy resins, and the resulting mixture is isothermally held at a temperature lower than the melting point of the thermoplastic resin [D] for several hours, for example, two hours. The viscosity change during the two hours is observed, and when a substantial viscosity change is seen, t the thermoplastic resin [D] can be considered to be soluble in the epoxy resin composition consisting of the aromatic epoxy resin [B] having tri- or higher functionality and other epoxy resins. The thermoplastic resin [D] may undergo phase separation during the process of curing the resin if the thermoplastic resin [D] has solubility in the epoxy resin composition consisting of the aromatic epoxy resin [B] having tri- or higher functionality and other epoxy resins as described above, but to improve the solvent resistance of the cured epoxy resin and carbon fiber-reinforced composite material obtained by curing, more preferably, the thermoplastic resin [D] does not undergo phase separation during the curing process. To improve the mechanical characteristics, solvent resistance, and other properties of the resulting carbon fiber-reinforced composite material, more preferably, the thermoplastic resin [D] is preliminarily dissolved in the epoxy resin composition consisting of the aromatic epoxy resin [B] having tri- or higher functionality and other epoxy resins before mixing. The dissolution before mixing facilitates uniform dispersion in the epoxy resin composition.

The thermoplastic resin [D], in general, is preferably a thermoplastic resin [D] having in its main chain a bond selected from the group consisting of carbon-carbon bond, amide bond, imide bond, ester bond, ether bond, carbonate bond, urethane bond, thioether bond, sulfone bond, and carbonyl bond. The thermoplastic resin [D] may have a partially cross-linked structure and may be crystalline or noncrystalline. In particular, at least one resin selected from the group consisting of polyamide, polycarbonate, polyacetal, polyphenyleneoxide, polyphenylenesulfide, polyarylate, polyester, polyamideimide, polyimide, polyetherimide, polyimide having a phenyltrimethylindane structure, polysulfone, polyethersulfone, polyetherketone, polyetheretherketone, polyaramide, polyethernitrile, and polybenzimidazole is preferably mixed with or dissolved in any of the epoxy resins contained in the epoxy resin composition described above.

In particular, to provide good heat resistance, the thermoplastic resin [D] has a glass transition temperature (Tg) of at least 150° C. or higher, preferably 170° C. or higher. When the glass transition temperature of the thermoplastic resin [D] is in this preferred range, the resulting molding is less prone to thermal deformation. Furthermore, the thermoplastic resin [D] preferably has a terminal functional group such as hydroxyl, carboxyl, thiol, or acid anhydride because the resin can react with a cation-polymerizable compound. Specifically, commercially available products of polyethersulfone, such as "Sumika Excel" (registered trademark) PES3600P, "Sumika Excel" (registered trademark) PES5003P, "Sumika Excel" (registered trademark) PES5200P, "Sumika Excel" (registered trademark) PES7600P (Sumitomo Chemical Co., Ltd.), and "VIRANTAGE" (registered trademark) VW-10700RFP (Solvay Advanced Polymers), can be used, and other examples include the copolymer oligomer of polyethersulfone and polyether ether sulfone described in JP 2004-506789 W, and commercially available products of polyetherimide such as "Ultem" (registered trademark) 1000, "Ultem" (registered trademark) 1010, and "Ultem" (registered trademark) 1040 (SABIC Innovative Plastics). "Oligomer" refers to a polymer having a relatively low molecular weight in which monomers are bonded in a finite number of roughly 10 to 100.

The thermoplastic resin [D] for use in the present invention is preferably a polyethersulfone, more preferably a polyethersulfone having an average molecular weight of 10,000 to 60,000 g/mol, still more preferably a polyethersulfone having an average molecular weight of 12,000 to 50,000 g/mol, and particularly preferably a polyethersulfone having an average molecular weight of 15,000 to 30,000 g/mol. A polyethersulfone having an average molecular weight in this preferred range provides a prepreg having appropriate tackiness and a good handling property, does not reduce the toughness of the cured epoxy resin, and, when dissolved in epoxy resin, forms an epoxy resin composition having an appropriate viscosity suitable for prepregging. In particular, when a polyethersulfone with high heat resistance having an average molecular weight of 15,000 to 30,000 g/mol is dissolved in epoxy resin, a large amount of thermoplastic resin can be dissolved in the epoxy resin without adversely affecting the process of prepregging; the cured epoxy resin can be provided with high toughness while maintaining the flexural modulus; and the resulting carbon fiber-reinforced composite material can be provided with a high tensile strength and a high compression strength.

For the amount (parts by mass) of epoxy resin and the thermoplastic resin [D] used in the present invention, the amount of the thermoplastic resin [D] is preferably, in terms of balance, in the range of 1 to 40 parts by mass based on 100 parts by mass of the total amount of epoxy resin, more preferably in the range of 3 to 30 parts by mass. When the amount of the thermoplastic resin [D] is in this preferred range, the epoxy resin composition has an appropriate viscosity and good processability; in addition, the cured epoxy resin has sufficiently high toughness, and the resulting carbon fiber-reinforced composite material is surely provided with a sufficient tensile strength.

In the present invention, the epoxy resin composition of the present invention may also include a thermoplastic resin particle [E]. The thermoplastic resin particle [E] improves the toughness of the epoxy resin to provide a carbon fiber-reinforced composite material with improved impact resistance.

As the thermoplastic resin particle [E], thermoplastic resins that are the same as the various examples of the thermoplastic resin [D] listed above and can be used as a mixture with the epoxy resin composition can be used. In particular, polyamides are most preferred, and among polyamides, nylon 12, nylon 6, nylon 11, nylon 66, nylon 6/12 copolymer, and nylon modified to have a semi-IPN (interpenetrating polymer network) structure with an epoxy compound (semi-IPN nylon) described in Example 1 of JP 01-104624 A provide particularly good adhesive strength to epoxy resin. The shape of the thermoplastic resin particle [E] may be spherical, nonspherical, or porous, but spherical particles are preferred because they provide excellent viscoelasticity due to a stable resin flow property, and also provide high impact resistance due to a lack of starting points of stress concentration. Examples of commercially available products of polyamide particles that can be used include SP-500, SP-10, TR-1, TR-2, 842P-48, 842P-80 (Toray Industries, Inc.), "Toraypearl" (registered trademark) TN (Toray Indus tries, Inc.), and "Orgasol" (registered trademark) 1002D, 2001UD, 2001EXD, 2002D, 3202D, 3501D, 3502D (Arkema).

The epoxy resin composition of the present invention may include additives such as coupling agents, thermosetting resin particles, and inorganic fillers such as silica gel, carbon black, clay, carbon nanotube, carbon particles, and metal powder without adversely affecting the effects of the present invention. Examples of carbon blacks include channel black, thermal black, furnace black, and ketjen black.

In the present invention, the amount of the thermoplastic resin particle [E] is preferably 0.1 to 30 parts by mass based on 100 parts by mass of the total amount of epoxy resin, more preferably 1 to 20 parts by mass, and still more preferably 5 to 15 parts by mass. The thermoplastic resin particle [E] in an amount in this preferred range easily mixes with the epoxy resin composition, a base resin, provides a prepreg with sufficiently high tackiness and draping properties, and provides a carbon fiber-reinforced composite material with high impact resistance.

The prepreg of the present invention preferably has a structure in which a layer rich in the thermoplastic resin particle [E], that is, a layer including the thermoplastic resin particle [E] in a locally distributed manner which can be clearly confirmed by cross-sectional observation, is formed at or near the surface of the prepreg.

Through such a structure, when a carbon fiber-reinforced composite material is produced by laminating the prepregs and curing epoxy resin, a resin layer is easily formed between the prepreg layers, that is, carbon fiber-reinforced composite material layers, whereby the adhesiveness and the coherence between the carbon fiber-reinforced composite material layers are improved, and the resulting carbon fiber-reinforced composite material will exhibit high impact resistance.

Furthermore, the hardener [A1] or the hardener particle [A2], in which the mass of terminal amino groups relative to the molecular weight is small, and the active hydrogen equivalent of an amino group per molecule is large, may serve to reduce the curing calorific value during the curing reaction of the epoxy resin composition. Consequently, degradation of mechanical characteristics due to overheating during molding of a carbon fiber-reinforced composite material and the problem of safety due to abnormal heat generation can be prevented.

For the epoxy resin composition (i) or (ii) of the present invention, the curing calorific value as determined by differential scanning calorimetry (DSC) at a temperature ramp rate of 5° C./min is preferably less than 450 J/g, more preferably less than 420 J/g, and still more preferably less than 400 J/g. When the curing calorific value as determined by differential scanning calorimetry (DSC) at a temperature ramp rate of 5° C./min is in this preferred range, heat generated during the curing reaction of the epoxy resin composition is not accumulated inside excessively; therefore, mechanical characteristics of the cured epoxy resin, such as flexural modulus and toughness, are not affected by overheating of the components during molding of a carbon fiber-reinforced composite material, and safety during molding is not compromised by abnormal heat generation.

There is a negative correlation between the rubbery state elastic modulus and the toughness of the cured epoxy resin, and for exhibiting excellent tensile strength, improving the toughness of the cured epoxy resin is effective. To exhibit the tensile strength and the compression strength of the carbon fiber-reinforced composite material, a cured epoxy resin obtained by curing the epoxy resin composition obtained by the present invention at 180° C. for 2 hours preferably has a rubbery state elastic modulus of 15 MPa or less, more preferably 13 MPa or less, and still more preferably 10 MPa or less. A rubbery state elastic modulus of 15 MPa or less provides a cured epoxy resin having a sufficiently low cross-linking density and excellent toughness.

To achieve both of the tensile strength and the compression strength of the carbon fiber-reinforced composite material of the present invention, the cured epoxy resin obtained by curing the epoxy resin composition obtained by the present invention at 180° C. for 2 hours preferably has a flexural modulus of 4.5 GPa or more, more preferably 4.7 GPa or more.

Furthermore, the cured epoxy resin obtained by curing the epoxy resin composition obtained by the present invention at 180° C. for 2 hours preferably has a flexural modulus of 4.5 GPa or more and a rubbery state elastic modulus of 15 MPa or less, and more preferably, the cured epoxy resin obtained by curing at 180° C. for 2 hours has a flexural modulus of 4.7 GPa or more and a rubbery state elastic modulus of 13 MPa or less. When the flexural modulus is 4.5 GPa or more and the rubbery state elastic modulus is 15 MPa or less, the flexural modulus may be improved while reducing the increase in cross-linking density of the cured epoxy resin, and the resulting carbon fiber-reinforced composite material can be provided with a tensile strength and a compression strength both at a high level.

The carbon fiber for use in the present invention may be any type of carbon fiber according to the intended use and is preferably a carbon fiber having a tensile modulus of at least 200 GPa or more from the standpoint of impact resistance. From the viewpoint of strength, a carbon fiber having a tensile strength of 4.0 GPa or more is preferred because a carbon fiber-reinforced composite material having high stiffness and mechanical characteristics can be obtained. Tensile strain is also an important factor, and a highly elastic carbon fiber having a tensile strain of 1.5% or more is preferred. Thus, a carbon fiber having combined properties of a tensile modulus of at least 200 GPa or more, a tensile strength of at least 4.0 GPa or more, and a tensile strain of at least 1.5% or more is most preferred.

Examples of commercially available products of carbon fiber include "Torayca" (registered trademark) T800G-24K, "Torayca" (registered trademark) T800S-24K, "Torayca" (registered trademark) T810G-24K, "Torayca" (registered trademark) T700G-24K, "Torayca" (registered trademark) T300-3K, and "Torayca" (registered trademark) T700S-12K (Toray Industries, Inc.).

For the shape and alignment of the carbon fiber, long fibers that have been unidirectionally arranged, woven fabric, or other fibers may be selected as appropriate, and to provide a carbon fiber-reinforced composite material that is lightweight and durable at a higher level, the carbon fiber is preferably in the form of continuous fibers such as long fibers that have been unidirectionally arranged (fiber bundle) or woven fabric.

For the carbon fiber bundle for use in the present invention, the number of filaments in one fiber bundle is preferably in the range of 2,500 to 50,000. If the number of filaments is less than 2,500, the fiber alignment tends to vary, causing a reduction in strength. If the number of filaments exceeds 50,000, it may be difficult to impregnate the fiber bundle with resin during prepreg production or during molding. The number of filaments is more preferably in the range of 2,800 to 36,000.

The prepreg according to the present invention is produced by impregnating carbon fibers with the epoxy resin composition of the present invention. The carbon fiber mass fraction in the prepreg is preferably 40 to 90% by mass, more preferably 50 to 80% by mass. When the carbon fiber mass fraction is in this preferred range, the resulting carbon fiber-reinforced composite material has an appropriate weight, and the advantages of the carbon fiber-reinforced composite material, high specific strength and high specific modulus, can be fully provided; at the same time, defective impregnation of the resin composition is less likely to occur, which can reduce voids in the resulting carbon fiber-reinforced composite material and increase the mechanical characteristics thereof.

The prepreg of the present invention can be suitably produced, for example, by the wet method in which the epoxy resin composition of the present invention is dissolved in a solvent such as methyl ethyl ketone or methanol to reduce its viscosity and impregnated into reinforcing fibers, or by the hot melt method in which the epoxy resin composition is heated to reduce its viscosity and impregnated into reinforcing fibers.

The wet method is a method in which reinforcing fibers are immersed in a solution of an epoxy resin composition and then pulled up, and the solvent is evaporated using an oven or the like to produce a prepreg.

The hot melt method is a method in which an epoxy resin composition whose viscosity has been reduced by heating is directly impregnated into reinforcing fibers, alternatively a method in which an epoxy resin composition is applied to release paper or the like to prepare a resin film, after which the resin film is superimposed on one or both sides of reinforcing fibers, and the epoxy resin composition was transferred and impregnated by hot pressing to produce a prepreg. The hot melt method is preferred because substantially no solvent remains in the prepreg.

The carbon fiber-reinforced composite material of the present invention can be produced, for example, by a method in which prepregs produced by the method as described above are laminated, and then the epoxy resin composition is heated and cured while applying heat and pressure to the resulting laminate.

Example the method for apply heat and pressure include press forming, autoclave molding, bag molding, wrapping tape molding, and internal pressure molding. In particular, for forming sports goods, wrapping tape molding and internal pressure molding are preferred.

The wrapping tape molding, in which a prepreg is wrapped around a cored bar such as a mandrel to form a tubular body of fiber-reinforced composite material, is a method suitable for producing rod-shaped products such as golf shafts and fishing rods. More specifically, a prepreg is wrapped around a mandrel; wrapping tape made of a thermoplastic resin film is wrapped on the prepreg for the purpose of securing the prepreg and applying pressure; the epoxy resin composition is heated and cured in an oven; and then the cored bar is removed to produce a tubular body.

The internal pressure molding is a method in which a preform formed by wrapping a prepreg around an internal pressure applicator such as a thermoplastic resin tube is placed in a mold, and then high-pressure gas is introduced into the internal pressure applicator to apply pressure while heating the mold, thereby forming a tubular body. The internal pressure molding is advantageously used particularly for forming complex-shaped products such as golf shafts, bats, and rackets of tennis, badminton, and the like.

The carbon fiber-reinforced composite material of the present invention can be produced, for example, by a method including laminating the prepreg of the present invention described above in a predetermined form, and then applying pressure and heat to cure the epoxy resin.

The carbon fiber-reinforced composite material of the present invention can also be produced by a method in which the epoxy resin composition described above is used but the prepreg is bypassed.

Examples of such methods include methods in which the epoxy resin composition of the present invention is directly impregnated into reinforcing fibers and then heated and cured, i.e., hand lay-up, filament winding, pultrusion, resin injection molding, resin transfer molding, and the like. In these methods, a method is preferably employed in which at least one base resin composed of epoxy resin and at least one hardener are mixed immediately before use to prepare an epoxy resin composition.

The carbon fiber-reinforced composite material of the present invention is suitable for use in aircraft structural members, windmill blades, external automobile plates, computer applications such as IC trays and notebook computer housings, and sports applications such as golf shafts and tennis rackets.

EXAMPLES

The epoxy resin composition of the present invention, and the prepreg and the carbon fiber-reinforced composite material obtained using the epoxy resin composition will now be described in more detail with reference to examples. Described below are carbon fibers and resin materials used in the examples, methods of producing a cured epoxy resin, a prepreg, and a carbon fiber-reinforced composite material, a method of measuring the average particle size of the component [A1], [A2], or [A3], a method of calculating the equivalent ratio, methods of evaluating the flexural modulus, rubbery state elastic modulus, carbon nuclear relaxation time, and curing calorific value of a cured epoxy resin, and methods of evaluating the 0° tensile strength and 0° compression strength of a carbon fiber-reinforced composite material. Unless otherwise specified, prepregs in the examples were prepared and evaluated in an atmosphere at a temperature of 25° C.±2° C. and a relative humidity of 50%.

Carbon Fiber

"Torayca" (registered trademark) T800G-24K-31E (carbon fiber with 24,000 filaments, a tensile strength of 5.9 GPa, a tensile modulus of 294 GPa, and a tensile strain of 2.0%, available from Toray Industries, Inc.)

Component [A1], [A2], or [A3]

4-APTP (1-N,4-N-bis(4-aminophenyl)phenylene-1,4-dicarboxyamide (available from Nipponiunryo Chemicals K.K.), active hydrogen equivalent of amino groups: 87 (g/eq.) (corresponding to both the component [A1] and the component [A2])

4-ABPA (4-amino-N-[4-[(4-aminobenzoyl)amino]phenyl]benzamide (available from Nipponjunryo Chemicals K.K.), active hydrogen equivalent of amino groups: 87 (g/eq.) (corresponding to both the component [A1] and the component [A2])

4-BAAB (4-aminophenyl-4-aminobenzoate (available from Nipponjunryo Chemicals K.K.), active hydrogen equivalent of amino groups: 57 (g/eq.) (corresponding to the component [A3])

Component [B]

"Araldite" (registered trademark) MY721 (tetraglycidyl-diaminodiphenylmethane, available from Huntsman Advanced Materials), epoxy equivalent: 113 (g/eq.)

"Araldite" (registered trademark) MY0600 (triglycidyl-m-aminophenol, available from Huntsman Advanced Materials), epoxy equivalent: 106 (g/eq.)

"Araldite" (registered trademark) MY0510 (triglycidyl-p-aminophenol, available from Huntsman Advanced Materials), epoxy equivalent: 106 (g/eq.)

N,N,N',N'-tetraglycidyl-4,4'-diaminobenzanilide synthesized by the following method At room temperature, 136.4 g (0.60 mol) of 4,4'-diaminobenzanilide, 666.1 g (7.20 mol) of epichlorohydrin, and 27.2 g (1.5 mol) of water were loaded into a 2-L four-necked flask equipped with a stirrer, a thermometer, and a condenser, and allowed to react at 70° C. for 2 hours while purging with nitrogen. Thereafter, the temperature was raised to 80° C. to continue the reaction for further 24 hours. After completion of the reaction, the temperature was lowered to 30° C. Tetrabutylammoniumn hydrogen sulfate in an amount of 6.1 g (0.02 mol) was added, and 300.0 g (3.60 mol) of 48% aqueous sodium hydroxide solution was added dropwise over 30 minutes such that the temperature was maintained at 30±5° C., at which temperature the reaction was carried out for 2 hours. To the reaction solution, 341 g (18.9 mol) of water and 341 g (4.73 mol) of tetrahydrofuran were added and stirred for 5 minutes, and the solution was separated (the oil phase was at the upper layer). To the oil phase obtained, 341 g (18.9 mol) of water was added, and the solution was again washed and separated (the oil phase was at the lower layer). The oil phase was filtered, and then concentrated under reduced-pressure conditions to remove tetrahydrofuran and epichlorohydrin. To the organic matter obtained, 150 g (1.63 mol) of toluene was added, and the solution was again concentrated under reduced-pressure conditions to remove toluene, thereby yielding 290 g of a brown viscous solid including N,N,N',N'-tetraglycidyl-4,4'-diaminobenzanilide of interest.

Epoxy equivalent: 140 (g/eq.).

Other Epoxy Resins

"jER" (registered trademark) 825 (bisphenol A type epoxy resin, available from Mitsubishi Chemical Corporation), epoxy equivalent: 175 (g/eq.)

"jER" (registered trademark) 828 (bisphenol A type epoxy resin, available from Mitsubishi Chemical Corporation), epoxy equivalent: 190 (g/eq.)

"EPICLON" (registered trademark) 830 (bisphenol F type epoxy resin, available from DIC Corporation), epoxy equivalent: 172 (g/eq.)

Component [C]

GAN (N-diglycidyl aniline, available from Nippon Kayaku Co., Ltd.), epoxy equivalent: 125 (g/eq.)

TORAY EPOXY PG-01 (diglycidyl-p-phenoxyaniline, available from Toray Fine Chemicals Co., Ltd.), epoxy equivalent: 164 (g/eq.)

Component [D]

"VIRANTAGE" (registered trademark) VW-10700RFP (polyethersulfone, available from Solvay Advanced Polymers)

Other Hardeners

SEIKSCURE-S (4,4'-diaminodiphenyl sulfone, available from Wakayama Seika Kogyo Co., Ltd.), active hydrogen equivalent of amino groups: 62 (g/eq.)

3,3'-DAS (3,3'-diaminodiphenyl sulfone, available from Mitsui Fine Chemicals, Inc.), active hydrogen equivalent of amino groups: 62 (g/eq)

4,4'-DABAN (4,4'-diaminobenzanilide, available from Nipponjunryo Chemicals K.K.), active hydrogen equivalent of amino groups: 57 (g/eq.)

(1) Measuring Average Particle Size of Component [A1], [A2], or [A3]

Using a scanning electromicroscope, particles were micrographed at a magnification of 1,000×, and the particles were randomly selected. The average value (n=50) of particle sizes, diameters of circumcircles of the particles, was used as the average particle size of [A1], [A2], or [A3].

(2) Method of Preparing Epoxy Resin Composition

Using a kneading machine, epoxy resin and thermoplastic resin at a composition and proportion shown in Tables 1 to 12 were kneaded at 160° C. for 2 hours. After visual confirmation that the thermoplastic resin dissolved, the mixture was cooled to 70° C. and kneaded with a hardener to prepare an epoxy resin composition.

(3) Calculating Equivalent Ratio

The equivalent ratio of all active hydrogens of amino groups in all the hardener components to all epoxy groups in the epoxy resin composition and the equivalent ratio of all active hydrogens of amino groups in the component [A1], [A2], [A3], or other hardener components to all epoxy groups in the epoxy resin composition were determined from the following equations. In Tables 1 to 12, the equivalent of the component [A1], [A2], [A3], or other hardeners is expressed by the equivalent ratio determined from the following calculations.

Equivalent ratio of all hardener components=(parts by mass of component [A1], [A2], or [A3]/active hydrogen equivalent of amino groups in component [A1], [A2], or [A3]+parts by mass of other hardeners/active hydrogen equivalent of amino groups in other hardeners)/(parts by mass of epoxy resin component 1/epoxy equivalent of epoxy resin component 1+parts by mass of epoxy resin component 2/epoxy equivalent of epoxy resin component 2)

Equivalent ratio of component [A1], [A2], or [A3]=
(parts by mass of component [A1], [A2], or
[A3]/active hydrogen equivalent of amino
groups in component [A1], [A2], or [A3])/(parts
by mass of epoxy resin component 1/epoxy
equivalent of epoxy resin component 1+parts by
mass of epoxy resin component 2/epoxy
equivalent of epoxy resin component 2)

Equivalent ratio of other hardeners=(parts by mass
of other hardeners/active hydrogen equivalent
of amino groups in other hardeners)/(parts by
mass of epoxy resin component 1/epoxy
equivalent of epoxy resin component 1+parts by
mass of epoxy resin component 2/epoxy
equivalent of epoxy resin component 2)

(4) Measuring Curing Calorific Value of Epoxy Resin Composition

The curing calorific value was evaluated using a differential scanning calorimeter DSC (model: DSC-Q2000, manufactured by TA Instruments). The cured epoxy resin obtained by the method of (2) above was loaded in an amount of 5 to 10 mg into a closed aluminum sample pan with a capacity of 50 µL and heated from 0° C. to 300° C. at a temperature ramp rate of 5° C./min, and the integral value (i.e., curing calorific value) of a DSC curve between about 100° C. and 300° C. was determined. When more than one exothermic peak is observed, for example, in the case of a mixture, the sum of the peaks was employed as a curing calorific value of the composition.

(5) Producing Cured Product of Epoxy Resin Composition (Cured Epoxy Resin)

The epoxy resin composition obtained by the method of (2) above was injected into a 2-mm-thick mold having a plate-like cavity and cured by heating in an oven under the following conditions to produce a cured resin plate.

(I) Heat from 30° C. to 180° C. at a rate of 1.5° C./min.
(II) Maintain at 180° C. for 2 hours.
(III) Cool from 180° C. to 30° C. at a rate of 2.5° C./min.

(6) Measuring Carbon Nuclear Relaxation Time of Cured Epoxy Resin

The cured epoxy resin obtained by the method of (5) above was loaded at the center of a solid-state NMR sample tube and supplied to a solid-state NMR measurement apparatus (CMX-300 Infinity manufactured by Chemagnetics), and the carbon nuclear relaxation time $T_1^C$ was measured by the Torchia method using $^{13}C$ as an observation nucleus. Detail measurement conditions are described below. From among the carbon nuclear relaxation times $T_1^C$ measured, the carbon nuclear relaxation time $T_1^C$ corresponding to a peak at 130 ppm derived from the benzene ring carbon atom in the main backbone of the hardener [A1], [A2], or [A3] was determined.

Measurement atmosphere: dry air
Temperature: room temperature
Chemical shift reference: silicone rubber (internal standard: 1.56 ppm)
Observation frequency: $^{13}C$: 75.2 MHz
Observation width: 30 kHz
Pulse width: 90° pulse: 4.2 µs
Contact time: 1.5 ms
Sample rotation speed: 10.5 kHz (7) Measuring Flexural Modulus of Cured Epoxy Resin From the 2-mm-thick cured resin plate obtained by the method of (5) above, a test piece of 60 mm in length and 10 mm in width was cut out. Using a universal material testing machine ("Instron" (registered trademark) model 5565 P8564 manufactured by Instron Japan Company, Ltd.), a three-point bending test was performed at a testing speed of 2.5 mm/min and a support span of 32 mm, and the flexural modulus was determined in accordance with JIS K 7171: 1994. The measuring temperature was 25° C.

(8) Measuring Rubbery State Elastic Modulus of Cured Epoxy Resin

From the 2-mm-thick cured resin plate obtained by the method of (5) above, a test piece of 55 mm in length and 12.7 mm in width was cut out. In accordance with JIS K 7244-7: 2007, dynamic torsion measurement (DMA measurement) was carried out using a dynamic viscoelasticity measuring apparatus (ARES-2KFRTN1-FCO-STD manufactured by TA Instruments) in a temperature range of −40 to 300° C. under the conditions of a torsional vibration frequency of 1.0 Hz, a produced torque of $3.0 \times 10^{-4}$ to $2.0 \times 10^{-2}$-N·m, and a temperature ramp rate of 5.0° C./min, and the storage elastic modulus in a temperature range of −30 to 290° C. was determined. In the temperature-storage elastic modulus curve obtained, the temperature at the intersection of a baseline on the lower-temperature side and a tangent drawn at a point where the gradient of the curve where the storage elastic modulus changed rapidly was steepest was defined as a glass transition temperature, and the storage elastic modulus at a temperature 50° C. higher than the glass transition temperature was used as the rubbery state elastic modulus.

(9) Producing Prepreg

The epoxy resin composition obtained by the method of (2) above was applied to release paper at a resin weight of 50 g/m² using a knife coater to produce a resin film. The resin film was laminated on both sides of unidirectionally arranged carbon fibers (weight: 200 g/m²), and heat and pressure was applied at 100° C. and 1 atm using heated rolls to impregnate the carbon fibers with the epoxy resin composition, thereby producing a prepreg.

(10) Definition of 0° of Carbon Fiber-Reinforced Composite Material

As described in JIS K 7017: 1999, when the fiber direction of a unidirectional fiber-reinforced composite material is defined as an axial direction, and the axial direction as 0° axis, the direction perpendicular to the axis is defined as 90°.

(11) Measuring 0° Tensile Strength of Carbon Fiber-Reinforced Composite Material A unidirectional prepreg was cut to a predetermined size, and six sheets of the prepreg were laminated unidirectionally, after which the laminate was vacuum bagged and cured using an autoclave at a temperature of 180° C. and a pressure of 6 kg/cm² for 2 hours to provide a unidirectional reinforced material (carbon fiber-reinforced composite material). To the unidirectional reinforced material, a tab was bonded in accordance with ASTM D3039-00, and then a rectangular test piece 254 mm in length and 12.7 mm in width was cut out, the 0° direction being the longitudinal direction of the test piece. The 0° direction tensile test piece obtained was placed in an environment at 23° C., and a tensile test was performed in accordance with ASTM D3039-00 using a universal material testing machine ("Instron" (registered trademark) model 5565 P8564 manufactured by Instron Japan Company, Ltd.) at a testing speed of 1.27 mm/min.

(12) Measuring 0° Compression Strength of Carbon Fiber-Reinforced Composite Material A unidirectional prepreg was cut to a predetermined size, and six sheets of the prepreg were laminated unidirectionally, after which the laminate was vacuum bagged and cured using an autoclave at a temperature of 180° C. and a pressure of 6 kg/cm² for 2 hours to provide a unidirectional reinforced material (carbon fiber-reinforced composite material). To the unidirectional reinforced material, a tab was bonded in accordance with SACMA-SRM 1R-94, and then a rectangular test piece 80 mm in length and 15.0 mm in width was cut out, the 0° direction being the longitudinal direction of the test piece. The 0° direction compression test piece obtained was placed in an environment at 23° C., and a compression test was performed in accordance with SACMA-SRM 1R-94 using a universal material testing machine ("Instron" (registered trademark) model 5565 P8564 manufactured by Instron Japan Company, Ltd.) at a testing speed of 1.0 mm/min.

Example 1

Using a kneading machine, 70 parts by mass of tetraglycidyldiaminodiphenylmethane, 30 parts by mass of bisphenol A type epoxy resin, and 15 parts by mass of polyethersulfone were kneaded at 160° C. for 2 hours, and after visual confirmation that polyethersulfone dissolved, the mixture was cooled to 70° C. and kneaded with 69 parts by mass of 1-N,4-N-bis(4-aminophenyl)phenylene-1,4-dicarboxyamide (average particle size: 3 μm) to prepare an epoxy resin composition. Table 1 shows the composition and proportion (in Table 1, numbers indicate parts by mass of components).

From the epoxy resin composition prepared, a cured epoxy resin was produced by the method described in (5) Producing Cured Product of Epoxy Resin Composition. Using the cured epoxy resin produced, the flexural modulus and the rubbery state elastic modulus were measured by the methods described in (7) Measuring Flexural Modulus of Cured Epoxy Resin and (8) Measuring Rubbery State Elastic Modulus of Cured Epoxy Resin.

Furthermore, from the epoxy resin composition prepared, a prepreg was produced by the method described in (9) Producing Prepreg. Using the prepreg produced, the 0° tensile strength and the 0° compression strength were measured by the methods described in 11 Measuring 0° Tensile Strength of Carbon Fiber-Reinforced Composite Material and 12 Measuring 0° Compression Strength of Carbon Fiber-Reinforced Composite Material. The results are shown in Table 1.

Examples 2 to 6, Comparative Examples 1 to 10

A cured epoxy resin, a prepreg, and a carbon fiber-reinforced composite material were produced in the same manner as in Example 1 except that the type and amount of epoxy resin and hardener were changed as shown in Tables 1 and 9, and the flexural modulus, rubbery state elastic modulus, 0° tensile strength, and 0° compression strength were measured. The results are shown in Tables 1 and 9. In Examples 1 to 6, a low rubbery state elastic modulus and a high flexural modulus were exhibited by using 4-APTP (average particle size: 3 μm) as the component [A1] or [A2]. In addition, the 0° tensile strength and the 0° compression strength were both high. In Comparative Examples 1 to 10 where 4,4'-diaminodiphenyl sulfone, 3,3'-diaminodiphenyl sulfone, or 4,4'-diaminobenzanilide was substituted for 1-N,4-N-bis(4-aminophenyl)phenylene-1,4-dicarboxyamide (average particle size: 3 μm), the flexural modulus was low, and the 0° tensile strength and the 0° compression strength were both low, as compared to Examples 1 to 6.

Examples 7 to 11, Comparative Examples 11 to 16

A cured epoxy resin, a prepreg, and a carbon fiber-reinforced composite material were produced in the same manner as in Example 1 except that the type and amount of epoxy resin and hardener were changed as shown in Tables 1, 2, and 10, and the flexural modulus, rubbery state elastic modulus, 0° tensile strength, and 0° compression strength were measured. The results are shown in Tables 1, 2, and 10. In Examples 7 to 11, a low rubbery state elastic modulus and a high flexural modulus were exhibited. With increasing amount of tetraglycidyldiaminodiphenylmethane, the flexural modulus and the rubbery state elastic modulus both tended to increase, and the 0° compression strength tended to improve. In Comparative Examples 11 to 16 where 4,4'-diaminodiphenyl sulfone, 3,3'-diaminodiphenyl sulfone, or 4,4'-diaminobenzanilide was substituted for 1-N,4-N-bis(4-aminophenyl)phenylene-1,4-dicarboxyamide (average particle size: 3 μm), the flexural modulus was low, and the 0° tensile strength and the 0° compression strength were both low, as compared to Examples 7 to 11.

Examples 12 to 15

A cured epoxy resin, a prepreg, and a carbon fiber-reinforced composite material were produced in the same manner as in Example 1 except that the type and amount of epoxy resin and hardener were changed as shown in Table 2, and the flexural modulus, rubbery state elastic modulus, 0° tensile strength, and 0° compression strength were measured. The results are shown in Table 2. In Examples 12 to 15, a low rubbery state elastic modulus and a high flexural modulus were exhibited, and the 0° tensile strength and the 0° compression strength were both high. As a result of keeping the equivalent ratio of all active hydrogens of amino groups in 1-N,4-N-bis(4-aminophenyl)phenylene-1,4-dicarboxyamide (average particle size: 3 μm) to all epoxy groups in the epoxy resin composition in the range of 0.7 to 1.3, the balance between the 0° tensile strength and the 0° compression strength tended to be excellent.

Examples 16, 17

A cured epoxy resin, a prepreg, and a carbon fiber-reinforced composite material were produced in the same manner as in Example 1 except that the type and amount of epoxy resin and hardener were changed as shown in Table 2, and the flexural modulus, rubbery state elastic modulus, 0° tensile strength, and 0° compression strength were measured. The results are shown in Table 2. In Example 16 and 17, a low rubbery state elastic modulus and a high flexural modulus were exhibited, and the 0° tensile strength and the 0° compression strength were both high. As a result of partially substituting 4,4'-diaminobenzanilide or 4,4'-diaminodiphenyl sulfone for 1-N,4-N-bis(4-aminophenyl)phenylene-1,4-dicarboxyamide (average particle size: 3 μm), the resin modulus tended to be low, and the 0° compression strength tended to be low, as compared to Example 1.

Examples 18 to 23

A cured epoxy resin, a prepreg, and a carbon fiber-reinforced composite material were produced in the same manner as in Example 1 except that the type and amount of epoxy resin and hardener were changed as shown in Tables 2 and 3, and the flexural modulus, rubbery state elastic modulus, 0° tensile strength, and 0° compression strength were measured. The results are shown in Tables 2 and 3. In Examples 18 to 23, a low rubbery state elastic modulus and a high flexural modulus were exhibited, and the 0° tensile strength and the 0° compression strength were both high.

Comparative Examples 17 to 20

A cured epoxy resin, a prepreg, and a carbon fiber-reinforced composite material were produced in the same manner as in Example 1 except that the type and amount of epoxy resin and hardener were changed as shown in Table 10, and the flexural modulus, rubbery state elastic modulus, 0° tensile strength, and 0° compression strength were measured. The results are shown in Table 10. In Comparative Examples 17 to 20 where the component [B] were not contained, the flexural modulus tended to be low, and the 0° tensile strength and the 0° compression strength both tended to be low, as compared to Examples 1, 2 and Examples 18, 19.

Examples 24 to 29

A cured epoxy resin, a prepreg, and a carbon fiber-reinforced composite material were produced in the same manner as in Example 1 except that the type and amount of epoxy resin and hardener were changed as shown in Table 3, and the flexural modulus, rubbery state elastic modulus, 0° tensile strength, and 0° compression strength were measured. The results are shown in Table 3. In Examples 24 to 29, a low rubbery state elastic modulus and a high flexural modulus were exhibited, and the 0° tensile strength and the 0° compression strength were both high. In Examples 24 to 29, as a result of changing the average particle size of 1-N,4-N-bis(4-aminophenyl)phenylene-1,4-dicarboxyamide from 3 μm to 18 μm, the flexural modulus tended to be low, and the 0° compression strength tended to be slightly low, as compared to Examples 1 to 6.

Examples 30 to 32

A cured epoxy resin, a prepreg, and a carbon fiber-reinforced composite material were produced in the same manner as in Example 1 except that the type and amount of epoxy resin and hardener were changed as shown in Tables 3 and 4, and the flexural modulus, rubbery state elastic modulus, 0° tensile strength, and 0° compression strength were measured. The results are shown in Tables 3 and 4. In Examples 30 to 32, a low rubbery state elastic modulus and a high flexural modulus were exhibited, and the 0° tensile strength and the 0° compression strength were both high. In Example 1 and Examples 30 to 32, as a result of increasing the amount of polyethersulfone, the 0° tensile strength tended to improve.

Examples 33 to 36

A cured epoxy resin, a prepreg, and a carbon fiber-reinforced composite material were produced in the same manner as in Example 1 except that the type and amount of epoxy resin and hardener were changed as shown in Table 4, and the flexural modulus, rubbery state elastic modulus, 0° tensile strength, and 0° compression strength were measured. The results are shown in Table 4. In Examples 33 to 36, a low rubbery state elastic modulus and a high flexural modulus were exhibited, and the 0° tensile strength and the 0° compression strength were both high.

Comparative Examples 21, 22

The same procedure as in Example 1 was repeated except that the type and amount of epoxy resin and hardener were changed as shown in Table 10 to produce a cured epoxy resin, but a cured epoxy resin could not be obtained because the solubility of 1-N,4-N-bis(4-aminophenyl)phenylene-1,4-dicarboxyamide (average particle size: 30 μm) in the epoxy resin was low and the curing reaction did not proceed sufficiently. Similarly, in producing a carbon fiber-reinforced composite material by the methods of (10) and (11) above after producing a prepreg by the method of (9) above, a carbon fiber-reinforced composite material could not be obtained because the solubility of 1-N,4-N-bis(4-aminophenyl)phenylene-1,4-dicarboxyamide (average particle size: 30 μm) in the epoxy resin was low and the curing reaction did not proceed sufficiently.

Example 37

Using a kneading machine, 60 parts by mass of tetraglycidyldiaminodiphenylmethane, 20 parts by mass of bisphenol A type epoxy resin, 20 parts by mass of bisphenol F type epoxy resin, and 15 parts by mass of polyethersulfone were kneaded at 160° C. for 2 hours, and after visual confirmation that polyethersulfone dissolved, the mixture was cooled to 70° C. and kneaded with 46 parts by mass of 1-N,4-N-bis(4-aminophenyl)phenylene-1,4-dicarboxyamide (average particle size: 30 μm) to prepare an epoxy resin composition. Table 5 shows the composition and proportion (in Table 5, numbers indicate parts by mass of components).

Using the epoxy resin composition prepared, the curing calorific value was measured by the method described in (4) Measuring Curing Calorific Value of Epoxy Resin Composition. Furthermore, from the epoxy resin composition prepared, a cured epoxy resin was produced by the method described in (5) Producing Cured Product of Epoxy Resin Composition. Using the cured epoxy resin produced, the carbon nuclear relaxation time $T_1^C$ and the rubbery state elastic modulus were measured by the methods described in (6) Measuring Carbon Nuclear Relaxation Time of Cured Epoxy Resin and (8) Measuring Rubbery State Elastic Modulus of Cured Epoxy Resin.

Furthermore, from the epoxy resin composition prepared, a prepreg was produced by the method described in (9) Producing Prepreg. Using the prepreg produced, the 0° tensile strength and the 0° compression strength were measured by the methods described in 11 Measuring 0° Tensile Strength of Carbon Fiber-Reinforced Composite Material and 12 Measuring 0° Compression Strength of Carbon Fiber-Reinforced Composite Material. The results are shown in Table 5.

Examples 38 to 40, Examples 44 to 48,
Comparative Examples 23 to 35

A cured epoxy resin, a prepreg, and a carbon fiber-reinforced composite material were produced in the same manner as in Example 37 except that the type and amount of epoxy resin and hardener were changed as shown in Tables 5, 6, 11, and 12, and the carbon nuclear relaxation time $T_1^C$, curing calorific value, rubbery state elastic modulus, 0° tensile strength, and 0° compression strength were measured. The results are shown in Tables 5, 6, 11, and 12. In Examples 37 to 40 and Examples 44 to 48, a long carbon nuclear relaxation time $T_1^C$, a low curing calorific value, and a low rubbery state elastic modulus were exhibited by using 1-N,4-N-bis(4-aminophenyl)phenylene-1,4-dicarboxyamide (average particle size: 3 μm) as the component [A1] or [A2]. In addition, the 0° tensile strength and the 0° compression strength were both high. In Comparative Examples 23 to 35 where 4,4'-diaminodiphenyl sulfone, 3,3'-diaminodiphenyl sulfone, or 4,4'-diaminobenzanilide was substituted for 1-N,4-N-bis(4-aminophenyl)phenylene-1,4-dicarboxyamide (average particle size: 3 μm), a short carbon nuclear relaxation time $T_1^C$, a high curing calorific value, and a high rubbery state elastic modulus were exhibited, and the 0° tensile strength and the 0° compression strength were both low, as compared to Examples 37 to 40 and Examples 44 to 48.

Examples 52 to 55, Examples 58 to 61

A cured epoxy resin, a prepreg, and a carbon fiber-reinforced composite material were produced in the same manner as in Example 37 except that the type and amount of epoxy resin and hardener were changed as shown in Tables 6 and 7, and the carbon nuclear relaxation time $T_1^C$, curing calorific value, rubbery state elastic modulus, 0° tensile strength, and 0° compression strength were measured. The results are shown in Tables 6 and 7. In Examples 52 to 55 and Examples 58 to 61, a long carbon nuclear relaxation time $T_1^C$, a low curing calorific value, and a low rubbery state elastic modulus were exhibited, and the 0° tensile strength and the 0° compression strength were both high. As a result of keeping the equivalent ratio of all active hydrogens of amino groups in 1-N,4-N-bis(4-aminophenyl)phenylene-1,4-dicarboxyamide (average particle size: 3 μm) to all epoxy groups in the epoxy resin composition in the range of 0.5 to 0.9, the balance between the 0° tensile strength and the 0° compression strength tended to be excellent.

Examples 56, 57, 62, 63

A cured epoxy resin, a prepreg, and a carbon fiber-reinforced composite material were produced in the same manner as in Example 37 except that the type and amount of epoxy resin and hardener were changed as shown in Tables 6 and 7, and the carbon nuclear relaxation time $T_1^C$, curing calorific value, rubbery state elastic modulus, 0° tensile strength, and 0° compression strength were measured. The results are shown in Tables 6 and 7. In Examples 56, 57, 62, and 63, a long carbon nuclear relaxation time $T_1^C$, a low curing calorific value, and a low rubbery state elastic modulus were exhibited, and the 0° tensile strength and the 0° compression strength were both high. As a result of partially substituting 4,4'-diaminobenzanilide or 4,4'-diaminodiphenyl sulfone for 1-N,4-N-bis(4-aminophenyl)phenylene-1,4-dicarboxyamide (average particle size: 3 μm), the carbon nuclear relaxation time $T_1^C$ tended to be short, and the 0° compression strength tended to be low, as compared to Example 37 and Example 44.

Examples 41, 49, 66, 73, 74

A cured epoxy resin, a prepreg, and a carbon fiber-reinforced composite material were produced in the same manner as in Example 37 except that the type and amount of epoxy resin and hardener were changed as shown in Tables 5 to 8, and the carbon nuclear relaxation time $T_1^C$, curing calorific value, rubbery state elastic modulus, 0° tensile strength, and 0° compression strength were measured. The results are shown in Tables 5 to 8. In Examples 41, 49, 66, 73, and 74, a long carbon nuclear relaxation time $T_1^C$, a low curing calorific value, and a low rubbery state elastic modulus were exhibited, and the 0° tensile strength and the 0° compression strength were both high.

Examples 42, 50

A cured epoxy resin, a prepreg, and a carbon fiber-reinforced composite material were produced in the same manner as in Example 37 except that the type and amount of epoxy resin and hardener were changed as shown in Tables 5 and 6, and the carbon nuclear relaxation time $T_1^C$, rubbery state elastic modulus, 0° tensile strength, and 0° compression strength were measured. The results are shown in Tables 5 and 6. In Example 42 and 50, by using 4-aminophenyl-4-aminobenzoate (average particle size: 3 μm) as the component [A3], a long carbon nuclear relaxation time $T_1^C$ and a low rubbery state elastic modulus were exhibited, and the 0° tensile strength and the 0° compression strength were both high.

Examples 43, 51

A cured epoxy resin, a prepreg, and a carbon fiber-reinforced composite material were produced in the same manner as in Example 37 except that the type and amount of epoxy resin and hardener were changed as shown in Tables 5 and 6, and the carbon nuclear relaxation time $T_1^C$, curing calorific value, rubbery state elastic modulus, 0° tensile strength, and 0° compression strength were measured. The results are shown in Tables 5 and 6. In Examples 43 and 51, a long carbon nuclear relaxation time $T_1^C$, a low curing calorific value, and a low rubbery state elastic modulus were exhibited, and the 0° tensile strength and the 0° compression strength were both high. In Examples 43 and 51, as a result of changing the average particle size of 1-N,4-N-bis(4-aminophenyl)phenylene-1,4-dicarboxyamide from 3 m to 18 μm, the carbon nuclear relaxation time $T_1^C$ tended to be short, and the 0° compression strength tended to be slightly low, as compared to Examples 37 and 44.

Examples 64, 65

A cured epoxy resin, a prepreg, and a carbon fiber-reinforced composite material were produced in the same manner as in Example 37 except that the type and amount of epoxy resin and hardener were changed as shown in Table 7, and the carbon nuclear relaxation time $T_1^C$, curing calorific value, rubbery state elastic modulus, 0° tensile strength, and 0° compression strength were measured. The results are shown in Table 7. In Examples 64 and 65, a long carbon nuclear relaxation time $T_1^C$, a low curing calorific value, and a low rubbery state elastic modulus were exhibited, and the 0° tensile strength and the 0° compression strength were both high. In Examples 64 and 65, with increasing amount of N,N,N',N'-tetraglycidyl-4,4'-diaminobenzanilide, the carbon nuclear relaxation time $T_1^C$ and the rubbery state elastic modulus both tended to increase, and the 0° compression strength tended to improve.

Examples 67 to 72

A cured epoxy resin, a prepreg, and a carbon fiber-reinforced composite material were produced in the same manner as in Example 37 except that the type and amount of epoxy resin and hardener were changed as shown in Table 8, and the carbon nuclear relaxation time $T_1^C$, curing calorific value, rubbery state elastic modulus, 0° tensile strength, and 0° compression strength were measured. The results are shown in Table 8. In Examples 67 to 72, a long carbon nuclear relaxation time $T_1^C$, a low curing calorific value, and a low rubbery state elastic modulus were exhibited, and the 0° tensile strength and the 0° compression strength were both high. In Example 37, Example 44, and Examples 67 to 72, as a result of increasing the amount of polyethersulfone, the 0° tensile strength tended to improve.

Comparative Examples 36 to 39

A cured epoxy resin, a prepreg, and a carbon fiber-reinforced composite material were produced in the same manner as in Example 37 except that the type and amount of epoxy resin and hardener were changed as shown in Table 12, and the carbon nuclear relaxation time $T_1^C$, curing calorific value, rubbery state elastic modulus, 0° tensile strength, and 0° compression strength were measured. The results are shown in Table 12. In Comparative Examples 36 to 38 where the component [A1] or [A2] and the component [C] were not contained, a high rubbery state elastic modulus and a high curing calorific value were exhibited, and the 0° tensile strength tended to be low, as compared to Example 37 and Example 44. In Comparative Example 39 where the component [B] were not contained, a short carbon nuclear relaxation time $T_1^C$ was exhibited, and the 0° compression strength tended to be low, as compared to Example 37 and Example 44.

TABLE 1

|  |  | Example 1 | Example 2 | Example 3 | Example 4 | Example 5 |
|---|---|---|---|---|---|---|
| Epoxy resin composition | Component [A] |  |  |  |  |  |
|  | 1-N,4-N-bis(4-aminophenyl)phenylene-1,4-dicarboxyamide (4-APTP) (Average particle size 3 μm) | 69 (1 eq) | 69 (1 eq) | 70 (1 eq) | 73 (1 eq) | 73 (1 eq) |
|  | 4-amino-N-[4-[(4-aminobonzoil)amino]phenyl]benzamide (4-APBA) (Average particle size 3 μm) |  |  |  |  |  |
|  | 4-aminophenyl-4-aminobenzoate (4-BAAB) (Average particle size 3 μm) |  |  |  |  |  |
|  | 1-N,4-N-bis(4-aminophenyl)phenylene-1,4-dicarboxyamide (4-APTP) (Average particle size 18 μm) |  |  |  |  |  |
|  | Component [B] |  |  |  |  |  |
|  | Tetraglycidyldiaminodiphenylmethane ("Araldite" (registered trademark) MY721) | 70 | 70 | 70 |  |  |
|  | Triglycidyl-m-aminophenol ("Araldite" (registered trademark) MY0600) |  |  |  | 70 |  |
|  | Triglycidyl-p-aminophenol ("Araldite" (registered trademark) MY0510) |  |  |  |  | 70 |
|  | N,N,N',N'-Tetraglycidyl-4,4'-diaminobenzanilide |  |  |  |  |  |
|  | [Other Epoxy resins] |  |  |  |  |  |
|  | Bisphenol A type epoxy ("jER" (registered trademark)) | 30 |  |  | 30 | 30 |
|  | Bisphenol F type epoxy ("EPICLON" (registered trademark) 830) |  | 30 |  |  |  |
|  | Component [C] |  |  |  |  |  |
|  | Diglycidyl aniline (GAN) |  |  |  |  |  |
|  | Diglycidyl-p-phenoxyaniline (TORAY EPOXY PG-01) |  |  | 30 |  |  |
|  | Component [D] |  |  |  |  |  |
|  | Polyethersulfone (VIRANTAGE VW-10700RFP) | 15 | 15 | 15 | 15 | 15 |
|  | [Other Hardners] |  |  |  |  |  |
|  | 4,4'-diaminodiphenyl sulfone (SEIKSCURE-S) |  |  |  |  |  |
|  | 3,3'-diaminodiphenyl sulfone (3,3'-DAS) |  |  |  |  |  |
|  | 4,4'-diaminobenzanilide (4,4'-DABAN) |  |  |  |  |  |
| Cured resin properties | Flexural Modulus (GPa) | 4.7 | 4.9 | 5.4 | 5.2 | 5.0 |
|  | Rubbery State Elastic Modulus (MPa) | 13.0 | 12.8 | 7.9 | 13.1 | 13.0 |
| Composite properties | 0° Tensile Strength (MPa) | 3251 | 3280 | 3634 | 3273 | 3270 |
|  | 0° Compression Strength (MPa) | 1830 | 1884 | 2020 | 1975 | 1913 |
|  |  | Example 6 | Example 7 | Example 8 | Example 9 | Example 10 |
| Epoxy resin composition | Component [A] |  |  |  |  |  |
|  | 1-N,4-N-bis(4-aminophenyl)phenylene-1,4-dicarboxyamide (4-APTP) (Average particle size 3 μm) | 59 (1 eq) | 58 (1 eq) | 63 (1 eq) | 74 (1 eq) | 77 (1 eq) |
|  | 4-amino-N-[4-[(4-aminobonzoil)amino]phenyl]benzamide (4-APBA) (Average particle size 3 μm) |  |  |  |  |  |
|  | 4-aminophenyl-4-aminobenzoate (4-BAAB) (Average particle size 3 μm) |  |  |  |  |  |
|  | 1-N,4-N-bis(4-aminophenyl)phenylene-1,4-dicarboxyamide (4-APTP) (Average particle size 18 μm) |  |  |  |  |  |
|  | Component [B] |  |  |  |  |  |
|  | Tetraglycidyldiaminodiphenylmethane ("Araldite" (registered trademark) MY721) |  |  | 30 | 50 | 90 | 100 |
|  | Triglycidyl-m-aminophenol ("Araldite" (registered trademark) MY0600) |  |  |  |  |  |
|  | Triglycidyl-p-aminophenol ("Araldite" (registered trademark) MY0510) |  |  |  |  |  |
|  | N,N,N',N'-Tetraglycidyl-4,4'-diaminobenzanilide |  | 70 |  |  |  |

TABLE 1-continued

|  |  |  |  |  |  |
|---|---|---|---|---|---|
| [Other Epoxy resins] | | | | | |
| Bisphenol A type epoxy ("jER" (registered trademark) | 30 | 70 | 50 | 10 | |
| Bisphenol F type epoxy ("EPICLON" (registered trademark) 830) | | | | | |
| Component [C] | | | | | |
| Diglycidyl aniline (GAN) | | | | | |
| Diglycidyl-p-phenoxyaniline (TORAY EPOXY PG-01) | | | | | |
| Component [D] | | | | | |
| Polyethersulfone (VIRANTAGE VW-10700RFP) | 15 | 15 | 15 | 15 | 15 |
| [Other Hardners] | | | | | |
| 4,4'-diaminodiphenyl sulfone (SEIKSCURE-S) | | | | | |
| 3,3'-diaminodiphenyl sulfone (3,3'-DAS) | | | | | |
| 4,4'-diaminobenzanilide (4,4'-DABAN) | | | | | |
| Cured resin properties — Flexural Modulus (GPa) | 5.7 | 4.3 | 4.5 | 4.9 | 5.0 |
| Cured resin properties — Rubbery State Elastic Modulus (MPa) | 13.3 | 10.2 | 11.8 | 20.0 | 23.9 |
| Composite properties — 0° Tensile Strength (MPa) | 3261 | 3195 | 3245 | 3035 | 2921 |
| Composite properties — 0° Compression Strength (MPa) | 2103 | 1689 | 1805 | 1880 | 1905 |

TABLE 2

| | | Example 11 | Example 12 | Example 13 | Example 14 | Example 15 |
|---|---|---|---|---|---|---|
| Epoxy resin composition | Component [A] | | | | | |
| | 1-N,4-N-bis(4-aminophenyl)phenylene-1,4-dicarboxyamide (4-APTP) (Average particie size 3 μm) | 82 (1 eq) | 41 (0.6 eq) | 48 (0.7 eq) | 89 (1.3 eq) | 96 (1.4 eq) |
| | 4-amino-N-[4-[(4-aminobonzoil)amino]phenyl]benzamide (4-APBA) (Average particle size 3 μm) | | | | | |
| | 4-aminophenyl-4-aminobenzoate (4-BAAB) (Average particie size 3 μm) | | | | | |
| | 1-N,4-N-bis(4-aminophenyl)phenylene-1,4-dicarboxyamide (4-APTP) (Average particle size 18 μm) | | | | | |
| | Component [B] | | | | | |
| | Tetraglycidyldiaminodiphenylmethane ("Araldite" (registered trademark) MY721) | | 70 | 70 | 70 | 70 |
| | Triglycidyl-m-aminophenol ("Araldite" (registered trademark) MY0600) | 100 | | | | |
| | Triglycidyl-p-aminophenol ("Araldite" (registered trademark) MY0510) | | | | | |
| | N,N,N',N'-Tetraglycidyl-4,4'-diaminobenzanilide | | | | | |
| | [Other Epoxy resins] | | | | | |
| | Bisphenol A type epoxy ("jER" (registered trademark) 825) | | 30 | 30 | 30 | 30 |
| | Bisphenol F type epoxy ("EPICLON" (registered trademark) 830) | | | | | |
| | Component [C] | | | | | |
| | Diglycidyl aniline (GAN) | | | | | |
| | Diglycidyl-p-phenoxyaniline (TORAY EPOXY PG-01) | | | | | |
| | Component [D] | | | | | |
| | Polyethersulfone (VIRANTAGE VW-10700RFP) | 15 | 15 | 15 | 15 | 15 |
| | [Other Hardners] | | | | | |
| | 4,4'-diaminodiphenyl sulfone (SEIKSCURE-S) | | | | | |
| | 3,3'-diaminodiphenyl sulfone (3,3'-DAS) | | | | | |
| | 4,4'-diaminobenzanilide (4,4'-DABAN) | | | | | |
| Cured resin properties | Flexural Modulus (GPa) | 5.6 | 4.8 | 4.8 | 4.7 | 4.6 |
| | Rubbery State Elastic Modulus (MPa) | 23.7 | 12.5 | 12.7 | 14.2 | 14.9 |
| Composite properties | 0° Tensile Strength (MPa) | 2952 | 2967 | 3052 | 3032 | 2975 |
| | 0° Compression Strength (MPa) | 2067 | 1890 | 1870 | 1844 | 1813 |

TABLE 2-continued

|  |  | Example 16 | Example 17 | Example 18 | Example 19 | Example 20 |
|---|---|---|---|---|---|---|
| Epoxy resin composition | Component [A] | | | | | |
|  | 1-N,4-N-bis(4-aminophenyl)phenylene-1,4-dicarboxyamide (4-APTP) (Average particle size 3 μm) | 48 (0.7 eq) | 48 (0.7 eq) | | | |
|  | 4-amino-N-[4-[(4-aminobonzoil)amino]phenyl]benzamide (4-APBA) (Average particle size 3 μm) | | | 69 (1 eq) | 69 (1 eq) | 70 (1 eq) |
|  | 4-aminophenyl-4-aminobenzoate (4-BAAB) (Average particle size 3 μm) | | | | | |
|  | 1-N,4-N-bis(4-aminophenyl)phenylene-1,4-dicarboxyamide (4-APTP) (Average particle size 18 μm) | | | | | |
|  | Component [B] | | | | | |
|  | Tetraglycidyldiaminodiphenylmethane ("Araldite" (registered trademark) MY721) | 70 | 70 | 70 | 70 | 70 |
|  | Triglycidyl-m-aminophenol ("Araldite" (registered trademark) MY0600) | | | | | |
|  | Triglycidyl-p-aminophenol ("Araldite" (registered trademark) MY0510) | | | | | |
|  | N,N,N',N'-Tetraglycidyl-4,4'-diaminobenzanilide | | | | | |
|  | [Other Epoxy resins] | | | | | |
|  | Bisphenol A type epoxy ("jER" (registered trademark) 825) | 30 | 30 | 30 | | |
|  | Bisphenol F type epoxy ("EPICLON" (registered trademark) 830) | | | | 30 | |
|  | Component [C] | | | | | |
|  | Diglycidyl aniline (GAN) | | | | | |
|  | Diglycidyl-p-phenoxyaniline (TORAY EPOXY PG-01) | | | | | 30 |
|  | Component [D] | | | | | |
|  | Polyethersulfone (VIRANTAGE VW-10700RFP) | 15 | 15 | 15 | 15 | 15 |
|  | [Other Hardners] | | | | | |
|  | 4,4'-diaminodiphenyl sulfone (SEIKSCURE-S) | | 15 (0.3 eq) | | | |
|  | 3,3'-diaminodiphenyl sulfone (3,3'-DAS) | | | | | |
|  | 4,4'-diaminobenzanilide (4,4'-DABAN) | 14 (0.3 eq) | | | | |
| Cured resin properties | Flexural Modulus (GPa) | 4.5 | 4.3 | 4.7 | 4.9 | 5.4 |
|  | Rubbery State Elastic Modulus (MPa) | 12.2 | 12.0 | 13.1 | 12.7 | 8.0 |
| Composite properties | 0° Tensile Strength (MPa) | 3295 | 3303 | 3242 | 3273 | 3625 |
|  | 0° Compression Strength (MPa) | 1795 | 1757 | 1843 | 1886 | 2021 |

TABLE 3

|  |  | Example 21 | Example 22 | Example 23 | Example 24 | Example 25 |
|---|---|---|---|---|---|---|
| Epoxy resin composition | Component [A] | | | | | |
|  | 1-N,4-N-bis(4-aminophenyl)phenylene-1,4-dicarboxyamide (4-APTP) (Average particle size 3 μm) | | | | | |
|  | 4-amino-N-[4-[(4-aminobonzoil)amino]phenyl]benzamide (4-APBA) (Average particle size 3 μm) | 73 (1 eq) | 73 (1 eq) | 59 (1 eq) | | |
|  | 4-aminophenyl-4-aminobenzoate (4-BAAB) (Average particle size 3 μm) | | | | | |
|  | 1-N,4-N-bis(4-aminophenyl)phenylene-1,4-dicarboxyamide (4-APTP) (Average particle size 18 μm) | | | | 69 (1 eq) | 69 (1 eq) |
|  | Component [B] | | | | | |
|  | Tetraglycidyldiaminodiphenylmethane ("Araldite" (registered trademark) MY721) | | | | 70 | 70 |
|  | Triglycidyl-m-aminophenol ("Araldite" (registered trademark) MY0600) | 70 | | | | |
|  | Triglycidyl-p-aminophenol ("Araldite" (registered trademark) MY0510) | | 70 | | | |
|  | N,N,N',N'-Tetraglycidyl-4,4'-diaminobenzanilide | | | 70 | | |
|  | [Other Epoxy resins] | | | | | |
|  | Bisphenol A type epoxy ("jER" (registered trademark) 825) | 30 | 30 | 30 | 30 | |
|  | Bisphenol F type epoxy ("EPICLON" (registered trademark) 830) | | | | | 30 |
|  | Component [C] | | | | | |
|  | Diglycidyl aniline (GAN) | | | | | |
|  | Diglycidyl-p-phenoxyaniline (TORAY EPOXY PG-01) | | | | | |

TABLE 3-continued

|  |  |  |  |  |  |  |
|---|---|---|---|---|---|---|
|  | Component [D] |  |  |  |  |  |
|  | Polyethersulfone (VIRATAGE VW-10100RFP) | 15 | 15 | 15 | 15 | 15 |
|  | [Other Hardners] |  |  |  |  |  |
|  | 4,4'-diaminodiphenyl sulfone (SEIKSCURE-S) |  |  |  |  |  |
|  | 3,3'-diaminodiphenyl sulfone (3,3'-DAS) |  |  |  |  |  |
|  | 4,4'-diaminobenzanilide (4,4'-DABAN) |  |  |  |  |  |
| Cured resin properties | Flexural Modulus (GPa) | 5.2 | 5.0 | 5.7 | 4.6 | 4.7 |
|  | Rubbery State Elastic Modulus (MPa) | 13.3 | 12.9 | 13.4 | 12.9 | 12.7 |
| Composite properties | 0° Tensile Strength (MPa) | 3245 | 3261 | 3258 | 3225 | 3251 |
|  | 0° Compression Strength (MPa) | 1972 | 1916 | 2121 | 1810 | 1845 |

|  |  | Example 26 | Example 27 | Example 28 | Example 29 | Example 30 |
|---|---|---|---|---|---|---|
| Epoxy resin composition | Component [A] |  |  |  |  |  |
|  | 1-N,4-N-bis(4-aminophenyl)phenylene-1,4-dicarboxyamide (4-APTP) (Average particle size 3 μm) |  |  |  |  | 69 (1 eq) |
|  | 4-amino-N-[4-[(4-aminobonzoil)amino]phenyl]benzamide (4-APBA) (Average particle size 3 μm) |  |  |  |  |  |
|  | 4-aminophenyl-4-aminobenzoate (4-BAAB) (Average particle size 3 μm) |  |  |  |  |  |
|  | 1-N,4-N-bis(4-aminophenyl)phenylene-1,4-dicarboxyamide (4-APTP) (Average particle size 18 μm) | 70 (1 eq) | 73 (1 eq) | 73 (1 eq) | 59 (1 eq) |  |
|  | Component [B] |  |  |  |  |  |
|  | Tetraglycidyldiaminodiphenylmethane ("Araldite" (registered trademark) MY721) | 70 |  |  |  | 70 |
|  | Triglycidyl-m-aminophenol ("Araldite" (registered trademark) MY0600) |  | 70 |  |  |  |
|  | Triglycidyl-p-aminophenol ("Araldite" (registered trademark) MY0510) |  |  | 70 |  |  |
|  | N,N,N',N'-Tetraglycidyl-4,4'-diaminobenzanilide |  |  |  | 70 |  |
|  | [Other Epoxy resins] |  |  |  |  |  |
|  | Bisphenol A type epoxy ("jER" (registered trademark) 825) |  | 30 | 30 | 30 | 30 |
|  | Bisphenol F type epoxy ("EPICLON" (registered trademark) 830) |  |  |  |  |  |
|  | Component [C] |  |  |  |  |  |
|  | Diglycidyl aniline (GAN) |  |  |  |  |  |
|  | Diglycidyl-p-phenoxyaniline (TORAY EPOXY PG-01) | 30 |  |  |  |  |
|  | Component [D] |  |  |  |  |  |
|  | Polyethersulfone (VIRATAGE VW-10100RFP) | 15 | 15 | 15 | 15 |  |
|  | [Other Hardners] |  |  |  |  |  |
|  | 4,4'-diaminodiphenyl sulfone (SEIKSCURE-S) |  |  |  |  |  |
|  | 3,3'-diaminodiphenyl sulfone (3,3'-DAS) |  |  |  |  |  |
|  | 4,4'-diaminobenzanilide (4,4'-DABAN) |  |  |  |  |  |
| Cured resin properties | Flexural Modulus (GPa) | 5.3 | 5.1 | 4.8 | 5.6 | 4.8 |
|  | Rubbery State Elastic Modulus (MPa) | 8.2 | 12.9 | 12.9 | 13.1 | 13.4 |
| Composite properties | 0° Tensile Strength (MPa) | 3610 | 3249 | 3245 | 3238 | 3051 |
|  | 0° Compression Strength (MPa) | 2003 | 1935 | 1860 | 2078 | 1865 |

TABLE 4

|  |  | Example 31 | Example 32 | Example 33 | Example 34 | Example 35 | Example 36 |
|---|---|---|---|---|---|---|---|
| Epoxy resin composition | Component [A] |  |  |  |  |  |  |
|  | 1-N,4-N-bis(4-aminophenyl)phenylene-1,4-dicarboxyamide (4-APTP) (Average particle size 3 μm) | 69 (1 eq) | 69 (1 eq) | 34 (0.5 eq) | 34 (0.5 eq) | 34 (0.5 eq) | 34 (0.5 eq) |
|  | 4-amino-N-[4-[(4-aminobonzoil)amino]phenyl]benzamide (4-APBA) (Average particle size 3 μm) |  |  | 34 (0.5 eq) | 34 (0.5 eq) | 34 (0.5 eq) | 34 (0.5 eq) |
|  | 4-aminophenyl-4-aminobenzoate (4-BAAB) (Average particle size 3 μm) |  |  |  |  |  |  |
|  | 1-N,4-N-bis(4-aminophenyl)phenylene-1,4-dicarboxyamide (4-APTP) (Average particle size 18 μm) |  |  |  |  |  |  |
|  | Component [B] |  |  |  |  |  |  |
|  | Tetraglycidyldiaminodiphenylmethane ("Araldite" (registered trademark) MY721) | 70 | 70 | 70 |  |  |  |

TABLE 4-continued

|  |  | Example 31 | Example 32 | Example 33 | Example 34 | Example 35 | Example 36 |
|---|---|---|---|---|---|---|---|
|  | Triglycidyl-m-aminophenol ("Araldite" (registered trademark) MY0600) |  |  |  | 70 |  |  |
|  | Triglycidyl-p-aminophenol ("Araldite" (registered trademark) MY0510) |  |  |  |  | 70 |  |
|  | N,N,N',N'-Tetraglycidyl-4,4'-diaminobenzanilide |  |  |  |  |  | 70 |
|  | [Other Epoxy resins] |  |  |  |  |  |  |
|  | Bisphenol A type epoxy ("jER" (registered trademark) 825) | 30 | 30 | 30 | 30 | 30 | 30 |
|  | Bisphenol F type epoxy ("EPICLON" (registered trademark) 830) |  |  |  |  |  |  |
|  | Component [C] |  |  |  |  |  |  |
|  | Diglycidyl aniline (GAN) |  |  |  |  |  |  |
|  | Diglycidyl-p-phenoxyaniline (TORAY EPOXY PG-01) |  |  |  |  |  |  |
|  | Component [D] |  |  |  |  |  |  |
|  | Polyethersulfone (VIRANTAGE VW-10700RFP) | 5 | 25 | 15 | 15 | 15 | 15 |
|  | [Other Hardners] |  |  |  |  |  |  |
|  | 4,4'-diaminodiphenyl sulfone (SEIKSCURE-S) |  |  |  |  |  |  |
|  | 3,3'-diaminodiphenyl sulfone (3,3'-DAS) |  |  |  |  |  |  |
|  | 4,4'-diaminobenzanilide (4,4'-DABAN) |  |  |  |  |  |  |
| Cured resin properties | Flexural Modulus (GPa) | 4.8 | 4.7 | 4.7 | 5.2 | 5.0 | 5.7 |
|  | Rubbery State Elastic Modulus (MPa) | 13.2 | 12.8 | 13.0 | 13.1 | 13.0 | 13.3 |
| Composite properties | 0° Tensile Strength (MPa) | 3133 | 3345 | 3255 | 3275 | 3268 | 3265 |
|  | 0° Compression Strength (MPa) | 1862 | 1839 | 1841 | 1968 | 1910 | 2120 |

TABLE 5

|  |  | Example 37 | Example 38 | Example 39 | Example 40 | Example 41 |
|---|---|---|---|---|---|---|
| Epoxy resin composition | Component [A] |  |  |  |  |  |
|  | 1-N,4-N-bis(4-aminophenyl)phenylene-1,4-dicarboxyamide (4-APTP) (Average particle size 3 μm) | 46 (0.7 eq) | 48 (0.7 eq) | 48 (0.7 eq) | 40 (0.7 eq) |  |
|  | 4-amino-N-[4-[(4-aminobonzoil)amino]phenyl]benzamide (4-APBA) (Average particle size 3 μm) |  |  |  |  | 46 (0.7 eq) |
|  | 4-aminophenyl-4-aminobenzoate (4-BAAB) (Average particle size 3 μm) |  |  |  |  |  |
|  | 1-N,4-N-bis(4-aminophenyl)phenylene-1,4-dicarboxyamide (4-APTP) (Average particle size 18 μm) |  |  |  |  |  |
|  | Component [B] |  |  |  |  |  |
|  | Tetraglycidyldiaminodiphenylmethane ("Araldite" (registered trademark) MY721) | 60 |  |  |  | 60 |
|  | Triglycidyl-m-aminophenol ("Araldite" (registered trademark)) |  | 60 |  |  |  |
|  | Triglycidyl-p-aminophenol ("Araldite" (registered trademark)) |  |  | 60 |  |  |
|  | N,N,N',N'-Tetraglycidyl-4,4'-diaminobenzanilide |  |  |  | 60 |  |
|  | [Other Epoxy resins] |  |  |  |  |  |
|  | Bisphenol A type epoxy ("jER" (registered trademark) 825) | 20 | 20 | 20 | 20 | 20 |
|  | Bisphenol F type epoxy ("EPICLON" (registered trademark) 830) | 20 | 20 | 20 | 20 | 20 |
|  | Component [C] |  |  |  |  |  |
|  | Diglycidyl aniline (GAN) |  |  |  |  |  |
|  | Diglycidyl-p-phenoxyaniline (TORAY EPOXY PG-01) |  |  |  |  |  |
|  | Component [D] |  |  |  |  |  |
|  | Polyethersulfone (VIRANTAGE VW-10700RFP) | 15 | 15 | 15 | 15 | 15 |
|  | [Other Hardners] |  |  |  |  |  |
|  | 4,4'-diaminodiphenyl sulfone (SEIKSCURE-S) |  |  |  |  |  |
|  | 3,3'-diaminodiphenyl sulfone (3,3'-DAS) |  |  |  |  |  |
|  | 4,4'-diaminobenzanilide (4,4'-DABAN) |  |  |  |  |  |
| Resin properties | Carbon nuclear relaxation times T1C (s) | 46 | 52 | 48 | 56 | 43 |
|  | Curing calorific value (J/g) | 361 | 405 | 398 | 357 | 339 |
|  | Rubbery State Elastic Modulus (MPa) | 12.2 | 12.3 | 12.2 | 12.5 | 12.3 |
| Composite properties | 0° Tensile Strength (MPa) | 3282 | 3279 | 3305 | 3356 | 3224 |
|  | 0° Compression Strength (MPa) | 1801 | 1937 | 1876 | 2063 | 1815 |

TABLE 5-continued

| | | Example 42 | Example 43 | Example 44 | Example 45 | Example 46 |
|---|---|---|---|---|---|---|
| Epoxy resin composition | Component [A] | | | | | |
| | 1-N,4-N-bis(4-aminophenyl)phenylene-1,4-dicarboxyamide (4-APTP) (Average particle size 3 μm) | | | 49 (0.7 eq) | 47 (0.7 eq) | 51 (0.7 eq) |
| | 4-amino-N-[4-[(4-aminobonzoil)amino]phenyl]benzamide (4-APBA) (Average particle size 3 μm) | | | | | |
| | 4-aminophenyl-4-aminobenzoate (4-BAAB) (Average particle size 3 μm) | 30 (0.7 eq) | | | | |
| | 1-N,4-N-bis(4-aminophenyl)phenylene-1,4-dicarboxyamide (4-APTP) (Average particle size 18 μm) | | 46 (0.7 eq) | | | |
| | Component [B] | | | | | |
| | Tetraglycidyldiaminodiphenylmethane ("Araldite" (registered trademark) MY721) | 60 | 60 | 60 | 60 | |
| | Triglycidyl-m-aminophenol ("Araldite" (registered trademark)) | | | | | |
| | Triglycidyl-p-aminophenol ("Araldite" (registered trademark)) | | | | | 60 |
| | N,N,N',N'-Tetraglycidyl-4,4'-diaminobenzanilide | | | | | |
| | [Other Epoxy resins] | | | | | |
| | Bisphenol A type epoxy ("jER" (registered trademark) 825) | 20 | 20 | | | |
| | Bisphenol F type epoxy ("EPICLON" (registered trademark) 830) | 20 | 20 | 20 | 20 | 20 |
| | Component [C] | | | | | |
| | Diglycidyl aniline (GAN) | | | 20 | | 20 |
| | Diglycidyl-p-phenoxyaniline (TORAY EPOXY PG-01) | | | | 20 | |
| | Component [D] | | | | | |
| | Polyethersulfone (VIRANTAGE VW-10700RFP) | 15 | 15 | 15 | 15 | 15 |
| | [Other Hardners] | | | | | |
| | 4,4'-diaminodiphenyl sulfone (SEIKSCURE-S) | | | | | |
| | 3,3'-diaminodiphenyl sulfone (3,3'-DAS) | | | | | |
| | 4,4'-diaminobenzanilide (4,4'-DABAN) | | | | | |
| Resin properties | Carbon nuclear relaxation times T1C (s) | 42 | 42 | 55 | 57 | 58 |
| | Curing calorific value (J/g) | — | 326 | 396 | 394 | 442 |
| | Rubbery State Elastic Modulus (MPa) | 16.2 | 12.0 | 8.0 | 8.1 | 8.2 |
| Composite properties | 0° Tensile Strength (MPa) | 3040 | 3207 | 3465 | 3623 | 3429 |
| | 0° Compression Strength (MPa) | 1772 | 1783 | 1962 | 2014 | 2057 |

TABLE 6

| | | Example 47 | Example 48 | Example 49 | Example 50 | Example 51 |
|---|---|---|---|---|---|---|
| Epoxy resin composition | Component [A] | | | | | |
| | 1-N,4-N-bis(4-aminophenyl)phenylene-1,4-dicarboxyamide (4-APTP) (Average particle size 3 μm) | 51 (0.7 eq) | 42 (0.7 eq) | | | |
| | 4-amino-N-[4-[(4-aminobonzoil)amino]phenyl]benzamide (4-APBA) (Average particle size 3 μm) | | | 49 (0.7 eq) | | |
| | 4-aminophenyl-4-aminobenzoate (4-BAAB) (Average particle size 3 μm) | | | | 33 (0.7 eq) | |
| | 1-N,4-N-bis(4-aminophenyl)phenylene-1,4-dicarboxyamide (4-APTP) (Average particle size 18 μm) | | | | | 49 (0.7 eq) |
| | Component [B] | | | | | |
| | Tetraglycidyldiaminodiphenylmethane ("Araldite" (registered trademark) MY721) | | | 60 | 60 | 60 |
| | Triglycidyl-m-aminophenol ("Araldite" (registered trademark) MY0600) | | | | | |
| | Triglycidyl-p-aminophenol ("Araldite" (registered trademark) MY0510) | 60 | | | | |
| | N,N,N',N'-Tetraglycidyl-4,4'-diaminobenzanilide | | 60 | | | |
| | [Other Epoxy resins] | | | | | |
| | Bisphenol A type epoxy ("jER" (registered trademark) 825) | | | | | |
| | Bisphenol F type epoxy ("EPICLON" (registered trademark) 830) | 20 | 20 | 20 | 20 | 20 |
| | Component [C] | | | | | |
| | Diglycidyl aniline (GAN) | 20 | 20 | 20 | 20 | 20 |
| | Diglycidyl-p-phenoxyaniline (TORAY EPOXY PG-01) | | | | | |
| | Component [D] | | | | | |
| | Polyethersulfone (VIRANTAGE VW-10700RFP) | 15 | 15 | 15 | 15 | 15 |

TABLE 6-continued

|  |  | | | | | |
|---|---|---|---|---|---|---|
| | [Other Hardners] | | | | | |
| | 4,4'-diaminodiphenyl sulfone (SEIKSCURE-S) | | | | | |
| | 3,3'-diaminodiphenyl sulfone (3,3'-DAS) | | | | | |
| | 4,4'-diaminobenzanilide (4,4'-DABAN) | | | | | |
| Resin properties | Carbon nuclear relaxation times T1C (s) | 56 | 68 | 45 | 44 | 44 |
| | Curing calorific value (J/g) | 438 | 390 | 364 | — | 353 |
| | Rubbery State Elastic Modulus (MPa) | 8.1 | 8.5 | 8.1 | 13.3 | 7.9 |
| Composite properties | 0° Tensile Strength (MPa) | 3443 | 3558 | 3324 | 3105 | 3341 |
| | 0° Compression Strength (MPa) | 1971 | 2125 | 1956 | 1899 | 1929 |

|  |  | Example 52 | Example 53 | Example 54 | Example 55 | Example 56 |
|---|---|---|---|---|---|---|
| Epoxy resin composition | Component [A] | | | | | |
| | 1-N,4-N-bis(4-aminophenyl)phenylene-1,4-dicarboxyamide (4-APTP) (Average particle size 3 μm) | 26 (0.4 eq) | 33 (0.5 eq) | 59 (0.9 eq) | 66 (1.0 eq) | 46 (0.7 eq) |
| | 4-amino-N-[4-[(4-aminobonzoil)amino]phenyl]benzamide (4-APBA) (Average particle size 3 μm) | | | | | |
| | 4-aminophenyl-4-aminobenzoate (4-BAAB) (Average particle size 3 μm) | | | | | |
| | 1-N,4-N-bis(4-aminophenyl)phenylene-1,4-dicarboxyamide (4-APTP) (Average particle size 18 μm) | | | | | |
| | Component [B] | | | | | |
| | Tetraglycidyldiaminodiphenylmethane ("Araldite" (registered trademark) MY721) | 60 | 60 | 60 | 60 | 60 |
| | Triglycidyl-m-aminophenol ("Araldite" (registered trademark) MY0600) | | | | | |
| | Triglycidyl-p-aminophenol ("Araldite" (registered trademark) MY0510) | | | | | |
| | N,N,N',N'-Tetraglycidyl-4,4'-diaminobenzanilide | | | | | |
| | [Other Epoxy resins] | | | | | |
| | Bisphenol A type epoxy ("jER" (registered trademark) 825) | 20 | 20 | 20 | 20 | 20 |
| | Bisphenol F type epoxy ("EPICLON" (registered trademark) 830) | 20 | 20 | 20 | 20 | 20 |
| | Component [C] | | | | | |
| | Diglycidyl aniline (GAN) | | | | | |
| | Diglycidyl-p-phenoxyaniline (TORAY EPOXY PG-01) | | | | | |
| | Component [D] | | | | | |
| | Polyethersulfone (VIRANTAGE VW-10700RFP) | 15 | 15 | 15 | 15 | 15 |
| | [Other Hardners] | | | | | |
| | 4,4'-diaminodiphenyl sulfone (SEIKSCURE-S) | | | | | |
| | 3,3'-diaminodiphenyl sulfone (3,3'-DAS) | | | | | |
| | 4,4'-diaminobenzanilide (4,4'-DABAN) | | | | | 13 (0.3 eq) |
| Resin properties | Carbon nuclear relaxation times T1C (s) | 51 | 51 | 47 | 45 | 44 |
| | Curing calorific value (J/g) | 344 | 358 | 369 | 371 | 381 |
| | Rubbery State Elastic Modulus (MPa) | 10.6 | 10.9 | 12.0 | 12.3 | 11.8 |
| Composite properties | 0° Tensile Strength (MPa) | 3098 | 3176 | 3043 | 2997 | 3053 |
| | 0° Compression Strength (MPa) | 1925 | 1902 | 1824 | 1798 | 1781 |

TABLE 7

|  |  | Example 57 | Example 58 | Example 59 | Example 60 | Example 61 |
|---|---|---|---|---|---|---|
| Epoxy resin composition | Component [A] | | | | | |
| | 1-N,4-N-bis(4-aminophenyl)phenylene-1,4-dicarboxyamide (4-APTP) (Average particle size 3 μm) | 46 (0.7 eq) | 28 (0.4 eq) | 35 (0.5 eq) | 63 (0.9 eq) | 70 (1.0 eq) |
| | 4-amino-N-[4-[(4-aminobonzoil)amino]phenyl]benzamide (4-APBA) (Average particle size 3 μm) | | | | | |
| | 4-aminophenyl-4-aminobenzoate (4-BAAB) (Average particle size 3 μm) | | | | | |
| | 1-N,4-N-bis(4-aminophenyl)phenylene-1,4-dicarboxyamide (4-APTP) (Average particle size 18 μm) | | | | | |

TABLE 7-continued

| | | | | | | |
|---|---|---|---|---|---|---|
| | Component [B] | | | | | |
| | Tetraglycidyldiaminodiphenylmethane ("Araldite" (registered trademark) MY721) | 60 | 60 | 60 | 60 | 60 |
| | Triglycidyl-m-aminophenol ("Araldite" (registered trademark) MY0600) | | | | | |
| | Triglycidyl-p-aminophenol ("Araldite" (registered trademark) MY0510) | | | | | |
| | N,N,N',N'-Tetraglycidyl-4,4'-diaminobenzanilide | | | | | |
| | [Other Epoxy resins] | | | | | |
| | Bisphenol A type epoxy ("jER" (registered trademark) 825) | 20 | | | | |
| | Bisphenol F type epoxy ("EPICLON" (registered trademark) 830) | 20 | 20 | 20 | 20 | 20 |
| | Component [C] | | | | | |
| | Diglycidyl aniline (GAN) | | 20 | 20 | 20 | 20 |
| | Diglycidyl-p-phenoxyaniline (TORAY EPOXY PG-01) | | | | | |
| | Component [D] | | | | | |
| | Polyethersulfone (VIRANTAGE VW-10700RFP) | 15 | 15 | 15 | 15 | 15 |
| | Component [E] | | | | | |
| | semi-IPN nylon particle A | | | | | |
| | [Other Hardners] | | | | | |
| | 4,4'-diaminodiphenyl sulfone (SEIKSCURE-S) | 14 (0.3 eq) | | | | |
| | 3,3'-diaminodiphenyl sulfone (3,3'-DAS) | | | | | |
| | 4,4'-diaminobenzanilide (4,4'-DABAN) | | | | | |
| Resin properties | Carbon nuclear relaxation times T1C (s) | 43 | 57 | 56 | 54 | 52 |
| | Curing calorific value (J/g) | 377 | 375 | 387 | 399 | 404 |
| | Rubbery State Elastic Modulus (MPa) | 11.6 | 6.8 | 7.1 | 8.2 | 8.7 |
| Composite properties | 0° Tensile Strength (MPa) | 3074 | 3215 | 3402 | 3346 | 3249 |
| | 0° Compression Strength (MPa) | 1774 | 2074 | 2056 | 1965 | 1917 |

| | | Example 62 | Example 63 | Example 64 | Example 65 | Example 66 |
|---|---|---|---|---|---|---|
| Epoxy resin composition | Component [A] | | | | | |
| | 1-N,4-N-bis(4-aminophenyl)phenylene-1,4-dicarboxyamide (4-APTP) (Average particle size 3 μm) | 49 (0.7 eq) | 49 (0.7 eq) | 55 (0.9 eq) | 53 (0.9 eq) | |
| | 4-amino-N-[4-[(4-aminobonzoil)amino]phenyl]benzamide (4-APBA) (Average particle size 3 μm) | | | | | 42 (0.7 eq) |
| | 4-aminophenyl-4-aminobenzoate (4-BAAB) (Average particle size 3 μm) | | | | | |
| | 1-N,4-N-bis(4-aminophenyl)phenylene-1,4-dicarboxyamide (4-APTP) (Average particle size 18 μm) | | | | | |
| | Component [B] | | | | | |
| | Tetraglycidyldiaminodiphenylmethane ("Araldite" (registered trademark) MY721) | 60 | 60 | | | |
| | Triglycidyl-m-aminophenol ("Araldite" (registered trademark) MY0600) | | | | | |
| | Triglycidyl-p-aminophenol ("Araldite" (registered trademark) MY0510) | | | | | |
| | N,N,N',N'-Tetraglycidyl-4,4'-diaminobenzanilide | | | 100 | 80 | 60 |
| | [Other Epoxy resins] | | | | | |
| | Bisphenol A type epoxy ("jER" (registered trademark) 825) | | | | | |
| | Bisphenol F type epoxy ("EPICLON" (registered trademark) 830) | 20 | 20 | | 20 | 20 |
| | Component [C] | | | | | |
| | Diglycidyl aniline (GAN) | 20 | 20 | | | 20 |
| | Diglycidyl-p-phenoxyaniline (TORAY EPOXY PG-01) | | | | | |
| | Component [D] | | | | | |
| | Polyethersulfone (VIRANTAGE VW-10700RFP) | 15 | 15 | 15 | 15 | 15 |
| | Component [E] | | | | | |
| | semi-IPN nylon particle A | | | | | |
| | [Other Hardners] | | | | | |
| | 4,4'-diaminodiphenyl sulfone (SEIKSCURE-S) | | 15 (0.3 eq) | | | |
| | 3,3'-diaminodiphenyl sulfone (3,3'-DAS) | | | | | |
| | 4,4'-diaminobenzanilide (4,4'-DABAN) | 14 (0.3 eq) | | | | |

TABLE 7-continued

| | | | | | | |
|---|---|---|---|---|---|---|
| Resin properties | Carbon nuclear relaxation times T1C (s) | 51 | 49 | 50 | 47 | 59 |
| | Curing calorific value (J/g) | 426 | 428 | 320 | 345 | 381 |
| | Rubbery State Elastic Modulus (MPa) | 7.8 | 7.6 | 23.8 | 16.7 | 8.4 |
| Composite properties | 0° Tensile Strength (MPa) | 3232 | 3243 | 2910 | 3023 | 3435 |
| | 0° Compression Strength (MPa) | 1905 | 1893 | 1899 | 1860 | 2121 |

TABLE 8

| | | Example 67 | Example 68 | Example 69 | Example 70 |
|---|---|---|---|---|---|
| Epoxy resin composition | Component [A] | | | | |
| | 1-N,4-N-bis(4-aminophenyl)phenylene-1,4-dicarboxyamide (4-APTP) (Average particle size 3 μm) | 46 (0.7 eq) | 46 (0.7 eq) | 46 (0.7 eq) | 49 (0.7 eq) |
| | 4-amino-N-[4-[(4-aminobonzoil)amino]phenyl]benzamide (4-APBA) (Average particle size 3 μm) | | | | |
| | 4-aminophenyl-4-aminobenzoate (4-BAAB) (Average particle size 3 μm) | | | | |
| | 1-N,4-N-bis(4-aminophenyl)phenylene-1,4-dicarboxyamide (4-APTP) (Average particle size 18 μm) | | | | |
| | Component [B] | | | | |
| | Tetraglycidyldiaminodiphenylmethane ("Araldite" (registered trademark) MY721) | 60 | 60 | 60 | 60 |
| | Triglycidyl-m-aminophenol ("Araldite" (Registered trademark) MY0600) | | | | |
| | Triglycidyl-p-aminophenol("Araldite" (Registered trademark) MY0510) | | | | |
| | N,N,N'N'-Tetraglycidyl-4,4'-diaminobenzanilide | | | | |
| | [Other Epoxy resins] | | | | |
| | Bisphenol A type epoxy ("jER" (Registered trademark) 825) | 20 | 20 | 20 | |
| | Bisphenol F type epoxy ("EPICLON" (Registered trademark) 830) | 20 | 20 | 20 | 20 |
| | Component [C] | | | | |
| | Diglycidyl aniline (GAN) | | | | 20 |
| | Diglycidyl-p-phenoxyaniline (TORAY EPOXY PG-01) | | | | |
| | Component [D] | | | | |
| | Polyethersulfone (VIRANTAGE VW-10100RFP) | | 5 | 40 | |
| | Component [E] | | | | |
| | semi-IPN nylon particle A | | | | |
| | [Other Hardners] | | | | |
| | 4,4'-diaminodiphenyl sulfone (SEIKSCURE-S) | | | | |
| | 3,3'-diaminodiphenyl sulfone (3,3'-DAS) | | | | |
| | 4,4'-diaminobenzanilide (4,4'-DABAN) | | | | |
| Resin properties | Carbon nuclear relaxation times T1C (s) | 44 | 44 | 42 | 56 |
| | Curing calorific value (J/g) | 408 | 396 | 343 | 439 |
| | Rubbery State Elastic Modulus (MPa) | 12.6 | 12.3 | 11.9 | 8.5 |
| Composite properties | 0° Tensile Strength (MPa) | 3194 | 3248 | 3312 | 3381 |
| | 0° Compression Strength (MPa) | 1802 | 1796 | 1775 | 1968 |

| | | Example 71 | Example 72 | Example 73 | Example 74 |
|---|---|---|---|---|---|
| Epoxy resin composition | Component [A] | | | | |
| | 1-N,4-N-bis(4-aminophenyl)phenylene-1,4-dicarboxyamide (4-APTP) (Average particle size 3 μm) | 49 (0.7 eq) | 49 (0.7 eq) | 46 (0.7 eq) | 49 (0.7 eq) |
| | 4-amino-N-[4-[(4-aminobonzoil)amino]phenyl]benzamide (4-APBA) (Average particle size 3 μm) | | | | |
| | 4-aminophenyl-4-aminobenzoate (4-BAAB) (Average particle size 3 μm) | | | | |
| | 1-N,4-N-bis(4-aminophenyl)phenylene-1,4-dicarboxyamide (4-APTP) (Average particle size 18 μm) | | | | |
| | Component [B] | | | | |
| | Tetraglycidyldiaminodiphenylmethane ("Araldite" (registered trademark) MY721) | 60 | 60 | 60 | 60 |
| | Triglycidyl-m-aminophenol ("Araldite" (Registered trademark) MY0600) | | | | |
| | Triglycidyl-p-aminophenol("Araldite" (Registered trademark) MY0510) | | | | |
| | N,N,N'N'-Tetraglycidyl-4,4'-diaminobenzanilide | | | | |
| | [Other Epoxy resins] | | | | |
| | Bisphenol A type epoxy ("jER" (Registered trademark) 825) | | | 20 | |
| | Bisphenol F type epoxy ("EPICLON" (Registered trademark) 830) | 20 | 20 | 20 | 20 |
| | Component [C] | | | | |
| | Diglycidyl aniline (GAN) | 20 | 20 | | 20 |
| | Diglycidyl-p-phenoxyaniline (TORAY EPOXY PG-01) | | | | |

TABLE 8-continued

|  |  |  |  |  |  |
|---|---|---|---|---|---|
|  | Component [D] |  |  |  |  |
|  | Polyethersulfone (VIRANTAGE VW-10100RFP) | 5 | 40 | 15 | 15 |
|  | Component [E] |  |  |  |  |
|  | semi-IPN nylon particle A |  |  | 10 | 10 |
|  | [Other Hardners] |  |  |  |  |
|  | 4,4'-diaminodiphenyl sulfone (SEIKSCURE-S) |  |  |  |  |
|  | 3,3'-diaminodiphenyl sulfone (3,3'-DAS) |  |  |  |  |
|  | 4,4'-diaminobenzanilide (4,4'-DABAN) |  |  |  |  |
| Resin properties | Carbon nuclear relaxation times T1C (s) | 55 | 52 | 45 | 54 |
|  | Curing calorific value (J/g) | 417 | 382 | 331 | 367 |
|  | Rubbery State Elastic Modulus (MPa) | 8.3 | 7.9 | 12.0 | 7.9 |
| Composite properties | 0° Tensile Strength (MPa) | 3406 | 3467 | 3298 | 3492 |
|  | 0° Compression Strength (MPa) | 1958 | 1932 | 1793 | 1947 |

TABLE 9

|  |  | Comparative Example 1 | Comparative Example 2 | Comparative Example 3 | Comparative Example 4 | Comparative Example 5 |
|---|---|---|---|---|---|---|
| Epoxy resin composition | Component [A] |  |  |  |  |  |
|  | 1-N,4-N-bis(4-aminophenyl)phenylene-1,4-dicarboxyamide (4-APTP) (Average particle size 3 μm) |  |  |  |  |  |
|  | 4-amino-N-[4-[(4-aminobonzoil)amino]phenyl]benzamide (4-APBA) (Average particle size 3 μm) |  |  |  |  |  |
|  | 4-aminophenyl-4-aminobenzoate (4-BAAB) (Average particle size 3 μm) |  |  |  |  |  |
|  | 1-N,4-N-bis(4-aminophenyl)phenylene-1,4-dicarboxyamide (4-APTP) (Average particle size 18 μm) |  |  |  |  |  |
|  | Component [B] |  |  |  |  |  |
|  | Tetraglycidyldiaminodiphenylmethane ("Araldite" (registered trademark) MY721) | 70 | 70 | 70 |  |  |
|  | Triglycidyl-m-aminophenol ("Araldite" (registered trademark) MY0600) |  |  |  | 70 |  |
|  | Triglycidyl-p-aminophenol ("Araldite" (registered trademark) MY0510) |  |  |  |  | 70 |
|  | N,N,N',N'-Tetraglycidyl-4,4'-diaminobenzanilide |  |  |  |  |  |
|  | [Other Epoxy resins] |  |  |  |  |  |
|  | Bisphenol A type epoxy ("jER" (registered trademark) 825) | 30 |  |  | 30 | 30 |
|  | Bisphenol F type epoxy ("EPICLON" (registered trademark) 830) |  | 30 |  |  |  |
|  | Component [C] |  |  |  |  |  |
|  | Diglycidyl aniline (GAN) |  |  |  |  |  |
|  | Diglycidyl-p-phenoxyaniline (TORAY EPOXY PG-01) |  |  | 30 |  |  |
|  | Component [D] |  |  |  |  |  |
|  | Polyethersulfone (VIRANTAGE VW-10700RFP) | 15 | 15 | 15 | 15 | 15 |
|  | [Other Hardners] |  |  |  |  |  |
|  | 4,4'-diaminodiphenyl sulfone (SEIKSCURE-S) | 49 (1 eq) | 49 (1 eq) | 50 (1 eq) | 52 (1 eq) | 52 (1 eq) |
|  | 3,3'-diaminodiphenyl sulfone (3,3'-DAS) |  |  |  |  |  |
|  | 4,4'-diaminobenzanilide (4,4'-DABAN) |  |  |  |  |  |
| Cured resin properties | Flexural Modulus (GPa) | 3.2 | 3.4 | 3.8 | 3.7 | 3.5 |
|  | Rubbery State Elastic Modulus (MPa) | 15.3 | 15.1 | 10.2 | 15.5 | 15.3 |
| Composite properties | 0° Tensile Strength (MPa) | 2955 | 2972 | 3230 | 2943 | 2972 |
|  | 0° Compression Strength (MPa) | 1405 | 1469 | 1585 | 1561 | 1501 |

|  |  | Comparative Example 6 | Comparative Example 7 | Comparative Example 8 | Comparative Example 9 | Comparative Example 10 |
|---|---|---|---|---|---|---|
| Epoxy resin composition | Component [A] |  |  |  |  |  |
|  | 1-N,4-N-bis(4-aminophenyl)phenylene-1,4-dicarboxyamide (4-APTP) (Average particle size 3 μm) |  |  |  |  |  |
|  | 4-amino-N-[4-[(4-aminobonzoil)amino]phenyl]benzamide (4-APBA) (Average particle size 3 μm) |  |  |  |  |  |
|  | 4-aminophenyl-4-aminobenzoate (4-BAAB) (Average particle size 3 μm) |  |  |  |  |  |
|  | 1-N,4-N-bis(4-aminophenyl)phenylene-1,4-dicarboxyamide (4-APTP) (Average particle size 18 μm) |  |  |  |  |  |

TABLE 9-continued

|  |  |  |  |  |  |  |
|---|---|---|---|---|---|---|
|  | Component [B] |  |  |  |  |  |
|  | Tetraglycidyldiaminodiphenylmethane ("Araldite" (registered trademark) MY721) |  | 70 |  | 70 |  |
|  | Triglycidyl-m-aminophenol ("Araldite" (registered trademark) MY0600) |  |  | 70 |  | 70 |
|  | Triglycidyl-p-aminophenol ("Araldite" (registered trademark) MY0510) |  |  |  |  |  |
|  | N,N,N',N'-Tetraglycidyl-4,4'-diaminobenzanilide | 70 |  |  |  |  |
|  | [Other Epoxy resins] |  |  |  |  |  |
|  | Bisphenol A type epoxy ("jER" (registered trademark) 825) | 30 | 30 | 30 | 30 | 30 |
|  | Bisphenol F type epoxy ("EPICLON" (registered trademark) 830) |  |  |  |  |  |
|  | Component [C] |  |  |  |  |  |
|  | Diglycidyl aniline (GAN) |  |  |  |  |  |
|  | Diglycidyl-p-phenoxyaniline (TORAY EPOXY PG-01) |  |  |  |  |  |
|  | Component [D] |  |  |  |  |  |
|  | Polyethersulfone (VIRANTAGE VW-10700RFP) | 15 | 15 | 15 | 15 | 15 |
|  | [Other Hardners] |  |  |  |  |  |
|  | 4,4'-diaminodiphenyl sulfone (SEIKSCURE-S) | 52 (1 eq) |  |  |  |  |
|  | 3,3'-diaminodiphenyl sulfone (3,3'-DAS) |  | 49 (1 eq) | 52 (1 eq) |  |  |
|  | 4,4'-diaminobenzanilide (4,4'-DABAN) |  |  |  | 45 (1 eq) | 47 (1 eq) |
| Cured resin properties | Flexural Modulus (GPa) | 4.6 | 3.5 | 4.0 | 3.6 | 4.1 |
|  | Rubbery State Elastic Modulus (MPa) | 15.6 | 15.8 | 15.8 | 16.1 | 15.9 |
| Composite properties | 0° Tensile Strength (MPa) | 2965 | 2946 | 2950 | 2943 | 2947 |
|  | 0° Compression Strength (MPa) | 1845 | 1495 | 1637 | 1522 | 1670 |

TABLE 10

|  |  | Comparative Example 11 | Comparative Example 12 | Comparative Example 13 | Comparative Example 14 | Comparative Example 15 | Comparative Example 16 |
|---|---|---|---|---|---|---|---|
| Epoxy resin composition | Component [A] |  |  |  |  |  |  |
|  | 1-N,4-N-bis(4-aminophenyl)phenylene-1,4-dicarboxamide (4-APTP) (Average particle size 3 μm) |  |  |  |  |  |  |
|  | 4-amino-N-[4-[(4-aminobonzoil)amino]phenyl]benzamide (4-APBA) (Average particle size 3 μm) |  |  |  |  |  |  |
|  | 4-aminophenyl-4-aminobenzoate (4-BAAB) (Average particle size 3 μm) |  |  |  |  |  |  |
|  | 1-N,4-N-bis(4-aminophenyl)phenylene-1,4-dicarboxamide (4-APTP) (Average particle size 18 μm) |  |  |  |  |  |  |
|  | Component [B] |  |  |  |  |  |  |
|  | Tetraglycidyldiaminodiphenylmethane ("Araldite" (registered trademark) MY721) | 30 | 50 | 90 | 100 |  |  |
|  | Triglycidyl-m-aminophenol ("Araldite" (registered trademark) MY0600) |  |  |  |  | 100 | 100 |
|  | Triglycidyl-p-aminophenol ("Araldite" (registered trademark) MY0510) |  |  |  |  |  |  |
|  | N,N,N',N'-Tetraglycidyl-4,4'-diaminobenzanilide |  |  |  |  |  |  |
|  | [Other Epoxy resins] |  |  |  |  |  |  |
|  | Bisphenol A type epoxy ("jER" (registered trademark) 825) | 70 | 50 | 10 |  |  |  |
|  | Bisphenol F type epoxy ("EPICLON" (registered trademark) 830) |  |  |  |  |  |  |
|  | Component [C] |  |  |  |  |  |  |
|  | Diglycidyl aniline (GAN) |  |  |  |  |  |  |
|  | Diglycidyl-p-phenoxyaniline (TORAY EPOXY PG-01) |  |  |  |  |  |  |
|  | Component [D] |  |  |  |  |  |  |
|  | Polyethersulfone (VIRANTAGE VW-10700RFP) | 15 | 15 | 15 | 15 | 15 | 15 |

TABLE 10-continued

|  |  |  |  |  |  |  |  |
|---|---|---|---|---|---|---|---|
|  | [Other Hardners] |  |  |  |  |  |  |
|  | 4,4'-diaminodiphenyl sulfone (SEIKSCURE-S) | 41 (1 eq) | 45 (1 eq) | 53 (1 eq) | 55 (1 eq) | 59 (1 eq) |  |
|  | 3,3'-diaminodiphenyl sulfone (3,3'-DAS) |  |  |  |  |  |  |
|  | 4,4'-diaminobenzanilide (4,4'-DABAN) |  |  |  |  |  | 54 (1 eq) |
|  | 1-N,4-N-(4-aminophenyl)phenylene-1,4-dicarboxyamide (4-APTP) (Average particle size 30 μm) |  |  |  |  |  |  |
| Cured resin properties | Flexural Modulus (GPa) | 2.8 | 3.0 | 3.4 | 3.5 | 4.2 | 4.7 |
|  | Rubbery State Elastic Modulus (MPa) | 12.2 | 13.8 | 22.0 | 25.9 | 24.5 | 24.3 |
| Composite properties | 0° Tensile Strength (MPa) | 2889 | 2945 | 2735 | 2695 | 2689 | 2712 |
|  | 0° Compression Strength (MPa) | 1291 | 1355 | 1462 | 1495 | 1703 | 1825 |

|  |  | Comparative Example 17 | Comparative Example 18 | Comparative Example 19 | Comparative Example 20 | Comparative Example 21 | Comparative Example 22 |
|---|---|---|---|---|---|---|---|
| Epoxy resin composition | Component [A] |  |  |  |  |  |  |
|  | 1-N,4-N-bis(4-aminophenyl)phenylene-1,4-dicarboxyamide (4-APTP) (Average particle size 3 μm) | 50 (1 eq) | 50 (1 eq) |  |  |  |  |
|  | 4-amino-N-[4-[(4-aminobonzoil)amino]phenyl]benzamide (4-APBA) (Average particle size 3 μm) |  |  | 50 (1 eq) | 50 (1 eq) |  |  |
|  | 4-aminophenyl-4-aminobenzoate (4-BAAB) (Average particle size 3 μm) |  |  |  |  |  |  |
|  | 1-N,4-N-bis(4-aminophenyl)phenylene-1,4-dicarboxyamide (4-APTP) (Average particle size 18 μm) |  |  |  |  |  |  |
|  | Component [B] |  |  |  |  |  |  |
|  | Tetraglycidyldiaminodiphenylmethane ("Araldite" (registered trademark) MY721) |  |  |  |  | 70 |  |
|  | Triglycidyl-m-aminophenol ("Araldite" (registered trademark) MY0600) |  |  |  |  |  | 70 |
|  | Triglycidyl-p-aminophenol ("Araldite" (registered trademark) MY0510) |  |  |  |  |  |  |
|  | N,N,N',N'-Tetraglycidyl-4,4'-diaminobenzanilide |  |  |  |  |  |  |
|  | [Other Epoxy resins] |  |  |  |  |  |  |
|  | Bisphenol A type epoxy ("jER" (registered trademark) 825) | 100 |  | 100 |  | 30 | 30 |
|  | Bisphenol F type epoxy ("EPICLON" (registered trademark) 830) |  | 100 |  | 100 |  |  |
|  | Component [C] |  |  |  |  |  |  |
|  | Diglycidyl aniline (GAN) |  |  |  |  |  |  |
|  | Diglycidyl-p-phenoxyaniline (TORAY EPOXY PG-01) |  |  |  |  |  |  |
|  | Component [D] |  |  |  |  |  |  |
|  | Polyethersulfone (VIRANTAGE VW-10700RFP) | 15 | 15 | 15 | 15 | 15 | 15 |
|  | [Other Hardners] |  |  |  |  |  |  |
|  | 4,4'-diaminodiphenyl sulfone (SEIKSCURE-S) |  |  |  |  |  |  |
|  | 3,3'-diaminodiphenyl sulfone (3,3'-DAS) |  |  |  |  |  |  |
|  | 4,4'-diaminobenzanilide (4,4'-DABAN) |  |  |  |  |  |  |
|  | 1-N,4-N-(4-aminophenyl)phenylene-1,4-dicarboxyamide (4-APTP) (Average particle size 30 μm) |  |  |  |  | 69 (1 eq) | 72 (1 eq) |
| Cured resin properties | Flexural Modulus (GPa) | 4.0 | 4.2 | 4.0 | 42 | impossible to mold | Impossible to mold |
|  | Rubbery State Elastic Modulus (MPa) | 8.2 | 8.0 | 8.3 | 8.0 | mold | mold |
| Composite properties | 0° Tensile Strength (MPa) | 3151 | 3173 | 3143 | 3165 | Impossible to mold | Impossible to mold |
|  | 0° Compression Strength (MPa) | 1637 | 1702 | 1645 | 1698 | mold | mold |

TABLE 11

| | Comparative Example 23 | Comparative Example 24 | Comparative Example 25 | Comparative Example 26 | Comparative Example 27 |
|---|---|---|---|---|---|
| Epoxy resin composition Component [A] | | | | | |
| 1-N,4-N-bis(4-aminophenyl)phenylene-1,4-dicarboxyamide (4-APTP) (Average particle size 3 μm) | | | | | |
| 4-amino-N-[4-[(4-aminobonzoil)amino]phenyl]benzamide (4-APBA) (Average particle size 3 μm) | | | | | |
| 4-aminophenyl-4-aminobenzoate (4-BAAB) (Average particle size 3 μm) | | | | | |
| 1-N,4-N-bis(4-aminophenyl)phenylene-1,4-dicarboxyamide (4-APTP) (Average particle size 18 μm) | | | | | |
| Component [B] | | | | | |
| Tetraglycidyldiaminodiphenylmethane ("Araldite" (registered trademark) MY721) | 60 | | | | 60 |
| Triglycidyl-m-aminophenol ("Araldite" (registered trademark) MY0600) | | 60 | | | |
| Triglycidyl-p-aminophenol ("Araldite" (registered trademark) MY0510) | | | 60 | | |
| N,N,N',N'-Tetraglycidyl-4,4'-diaminobenzanilide | | | | 60 | |
| [Other Epoxy resins] | | | | | |
| Bisphenol A type epoxy ("jER" (registered trademark) 825) | 20 | 20 | 20 | 20 | 20 |
| Bisphenol A type epoxy ("jER" (registered trademark) 828) | | | | | |
| Bisphenol F type epoxy ("EPICLON" (registered trademark) 830) | 20 | 20 | 20 | 20 | 20 |
| Component [C] | | | | | |
| Diglycidyl aniline (GAN) | | | | | |
| Diglycidyl-p-phenoxyaniline (TORAY EPOXY PG-01) | | | | | |
| Component [D] | | | | | |
| Polyethersulfone (VIRANTAGE VW-10700PFP) | 15 | 15 | 15 | 15 | 15 |
| [Other Hardners] | | | | | |
| 4,4'-diaminodiphenyl sulfone (SEIKSCURE-S) | 33 (0.7 eq) | 35 (0.7 eq) | 35 (0.7 eq) | 28 (0.7 eq) | |
| 3,3'-diaminodiphenyl sulfone (3,3'-DAS) | | | | | 33 (0.7 eq) |
| 4,4'-diaminobenzanilide (4,4'-DABAN) | | | | | |
| Resin properties Carbon nuclear relaxation times T1C (s) | 33 | 38 | 36 | 40 | 37 |
| Curing calorific value (J/g) | 499 | 542 | 538 | 476 | 505 |
| Rubbery State Elastic Modulus (MPa) | 15.1 | 15.3 | 15.1 | 15.4 | 15.6 |
| Composite properties 0° Tensile Strength (MPa) | 2558 | 2734 | 2565 | 2753 | 2650 |
| 0° Compression Strength (MPa) | 1438 | 1580 | 1531 | 1624 | 1525 |

| | Comparative Example 28 | Comparative Example 29 | Comparative Example 30 | Comparative Example 31 | Comparative Example 32 |
|---|---|---|---|---|---|
| Epoxy resin composition Component [A] | | | | | |
| 1-N,4-N-bis(4-aminophenyl)phenylene-1,4-dicarboxyamide (4-APTP) (Average particle size 3 μm) | | | | | |
| 4-amino-N-[4-[(4-aminobonzoil)amino]phenyl]benzamide (4-APBA) (Average particle size 3 μm) | | | | | |
| 4-aminophenyl-4-aminobenzoate (4-BAAB) (Average particle size 3 μm) | | | | | |
| 1-N,4-N-bis(4-aminophenyl)phenylene-1,4-dicarboxyamide (4-APTP) (Average particle size 18 μm) | | | | | |
| Component [B] | | | | | |
| Tetraglycidyldiaminodiphenylmethane ("Araldite" (registered trademark) MY721) | 60 | 60 | 60 | | |
| Triglycidyl-m-aminophenol ("Araldite" (registered trademark) MY0600) | | | | 60 | |
| Triglycidyl-p-aminophenol ("Araldite" (registered trademark) MY0510) | | | | | 60 |
| N,N,N',N'-Tetraglycidyl-4,4'-diaminobenzanilide | | | | | |
| [Other Epoxy resins] | | | | | |
| Bisphenol A type epoxy ("jER" (registered trademark) 825) | 20 | | | | |
| Bisphenol A type epoxy ("jER" (registered trademark) 828) | | | | | |
| Bisphenol F type epoxy ("EPICLON" (registered trademark) 830) | 20 | 20 | 20 | 20 | 20 |
| Component [C] | | | | | |
| Diglycidyl aniline (GAN) | | 20 | | 20 | 20 |
| Diglycidyl-p-phenoxyaniline (TORAY EPOXY PG-01) | | | 20 | | |

TABLE 11-continued

|  | Component [D] |  |  |  |  |  |
|---|---|---|---|---|---|---|
|  | Polyethersulfone (VIRANTAGE VW-10700PFP) | 15 | 15 | 15 | 15 | 15 |
|  | [Other Hardners] |  |  |  |  |  |
|  | 4,4'-diaminodiphenyl sulfone (SEIKSCURE-S) |  | 35 (0.7 eq) | 34 (0.7 eq) | 37 (0.7 eq) | 37 (0.7 eq) |
|  | 3,3'-diaminodiphenyl sulfone (3,3'-DAS) |  |  |  |  |  |
|  | 4,4'-diaminobenzanilide (4,4'-DABAN) | 30 (0.7 eq) |  |  |  |  |
| Resin properties | Carbon nuclear relaxation times T1C (s) | 32 | 37 | 39 | 41 | 40 |
|  | Curing calorific value (J/g) | 497 | 530 | 526 | 569 | 561 |
|  | Rubbery State Elastic Modulus (MPa) | 15.9 | 9.6 | 9.7 | 9.7 | 9.9 |
| Composite properties | 0° Tensile Strength (MPa) | 2492 | 2902 | 3193 | 3021 | 3037 |
|  | 0° Compression Strength (MPa) | 1563 | 1559 | 1599 | 1698 | 1622 |

TABLE 12

|  |  | Comparative Example 33 | Comparative Example 34 | Comparative Example 35 | Comparative Example 36 |
|---|---|---|---|---|---|
| Epoxy resin composition | Component [A] |  |  |  |  |
|  | 1-N,4-N-bis(4-aminophenyl)phenylene-1,4-dicarboxyamide (4-APTP) (Average particle size 3 μm) |  |  |  |  |
|  | 4-amino-N-[4-[(4-aminobonzoil)amino]phenyl]benzamide (4-APBA) (Average particle size 3 μm) |  |  |  |  |
|  | 4-aminophenyl-4-aminobenzoate (4-BAAB) (Average particle size 3 μm) |  |  |  |  |
|  | 1-N,4-N-bis(4-aminophenyl)phenylene-1,4-dicarboxyamide (4-APTP) (Average particle size 18 μm) |  |  |  |  |
|  | Component [B] |  |  |  |  |
|  | Tetraglycidyldiaminodiphenylmethane ("Araldite" (registered trademark) MY721) |  | 60 | 60 |  |
|  | Triglycidyl-m-aminophenol ("Araldite" (registered trademark) MY0600) |  |  |  |  |
|  | Triglycidyl-p-aminophenol ("Araldite" (registered trademark) MY0510) |  |  |  | 100 |
|  | N,N,N',N'-Tetraglycidyl-4,4'-diaminobenzanilide | 60 |  |  |  |
|  | [Other Epoxy resins] |  |  |  |  |
|  | Bisphenol A type epoxy ("jER" (registered trademark) 825) |  |  |  |  |
|  | Bisphenol A type epoxy ("jER" (registered trademark) 828) |  |  |  |  |
|  | Bisphenol F type epoxy ("EPICLON" (registered trademark) 830) | 20 | 20 | 20 |  |
|  | Component [C] |  |  |  |  |
|  | Diglycidyl aniline (GAN) | 20 | 20 | 20 |  |
|  | Diglycidyl-p-phenoxyaniline (TORAY EPOXY PG-01) |  |  |  |  |
|  | Component [D] |  |  |  |  |
|  | Polyethersulfone (VIRANTAGE VW-10700RFP) | 15 | 15 | 15 | 15 |
|  | [Other Hardners] |  |  |  |  |
|  | 4,4'-diaminodiphenyl sulfone (SEIKSCURE-S) | 30 (0.7 eq) |  |  |  |
|  | 3,3'-diaminodiphenyl sulfone (3,3'-DAS) |  | 35 (0.7 eq) |  |  |
|  | 4,4'-diaminobenzanilide (4,4'-DABAN) |  |  | 32 (0.7 eq) | 54 (1 eq) |
| Resin properties | Carbon nuclear relaxation times T1C (s) | 42 | 39 | 32 | 43 |
|  | Curing calorific value (J/g) | 513 | 534 | 530 | 562 |
|  | Rubbery State Elastic Modulus (MPa) | 10.3 | 10.2 | 10.4 | 24.0 |
| Composite properties | 0° Tensile Strength (MPa) | 3130 | 2916 | 2758 | 2638 |
|  | 0° Compression Strength (MPa) | 1743 | 1601 | 1576 | 1767 |

|  |  | Comparative Example 37 | Comparative Example 38 | Comparative Example 39 |
|---|---|---|---|---|
| Epoxy resin composition | Component [A] |  |  |  |
|  | 1-N,4-N-bis(4-aminophenyl)phenylene-1,4-dicarboxyamide (4-APTP) (Average particle size 3 μm) |  |  | 46 (1 eq) |
|  | 4-amino-N-[4-[(4-aminobonzoil)amino]phenyl]benzamide (4-APBA) (Average particle size 3 μm) |  |  |  |
|  | 4-aminophenyl-4-aminobenzoate (4-BAAB) (Average particle size 3 μm) |  |  |  |
|  | 1-N,4-N-bis(4-aminophenyl)phenylene-1,4-dicarboxyamide (4-APTP) (Average particle size 18 μm) |  |  |  |

TABLE 12-continued

| Component [B] | | | |
|---|---|---|---|
| Tetraglycidyldiaminodiphenylmethane ("Araldite" (registered trademark) MY721) | | | |
| Triglycidyl-m-aminophenol ("Araldite" (registered trademark) MY0600) | | | |
| Triglycidyl-p-aminophenol ("Araldite" (registered trademark) MY0510) | 100 | 100 | |
| N,N,N',N'-Tetraglycidyl-4,4'-diaminobenzanilide | | | |
| [Other Epoxy resins] | | | |
| Bisphenol A type epoxy ("jER" (registered trademark) 825) | | | |
| Bisphenol A type epoxy ("jER" (registered trademark) 828) | | | 100 |
| Bisphenol F type epoxy ("EPICLON" (registered trademark) 830) | | | |
| Component [C] | | | |
| Diglycidyl aniline (GAN) | | | |
| Diglycidyl-p-phenoxyaniline (TORAY EPOXY PG-01) | | | |
| Component [D] | | | |
| Polyethersulfone (VIRANTAGE VW-10700RFP) | 15 | 15 | 15 |
| [Other Hardners] | | | |
| 4,4'-diaminodiphenyl sulfone (SEIKSCURE-S) | | | |
| 3,3'-diaminodiphenyl sulfone (3,3'-DAS) | | | |
| 4,4'-diaminobenzanilide (4,4'-DABAN) | 45 (0.85 eq) | 40 (0.75 eq) | |
| Resin properties — Carbon nuclear relaxation times T1C (s) | 45 | 46 | 39 |
| Curing calorific value (J/g) | 613 | 654 | 289 |
| Rubbery State Elastic Modulus (MPa) | 23.8 | 23.3 | 8.1 |
| Composite properties — 0° Tensile Strength (MPa) | 2670 | 2712 | 2902 |
| 0° Compression Strength (MPa) | 1798 | 1826 | 1598 |

INDUSTRIAL APPLICABILITY

The carbon fiber-reinforced composite material obtained by using the epoxy resin composition of the present invention has a high tensile strength and a high compression strength and, therefore, is suitable for use particularly as a structural material. For example, in aerospace applications, the carbon fiber-reinforced composite material is suitable for use, for example, in primary structural materials for aircraft, such as main wings, tail wings, and floor beams; secondary structural materials such as flaps, ailerons, cowls, fairings, and interior materials; and rocket motor cases and structural materials for artificial satellites. In general industrial applications, the carbon fiber-reinforced composite material is suitable for use, for example, in structural materials, drive shafts, leaf springs, windmill blades, pressurized vessels, and flywheels in vehicles such as automobiles, ships, and railroad cars; papermaking rollers; and materials for civil engineering and construction such as roofing materials, cables, reinforcing bars, and repairing and reinforcing materials. In sports applications, the carbon fiber-reinforced composite material is suitable for use, for example, in golf shafts, fishing rods, rackets for tennis, badminton, squash, and the like, sticks for hockey and the like, and ski poles.

The invention claimed is:

1. An epoxy resin composition comprising
 [A1] hardener particles having an average particle size of less than 20 μm and represented by Formula (1)

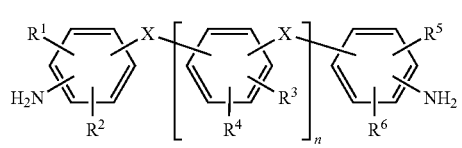

(1)

wherein X represents —NHC(=O)—; n represents 1; and $R^1$ to $R^6$ each represent a hydrogen atom, wherein X may be in either direction; and
an epoxy resin component comprising at least 40% by weight of [B]; and a balance of [C] and/or a bisphenol-type epoxy resin;
 [B] a tetraglycidyl aromatic epoxy resin represented by Formula (8)

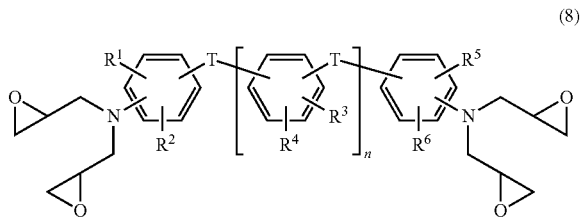

(8)

wherein T is —NHC(=O)—; n represents 0 to 5; and $R^1$ to $R^6$ each represent at least one selected from the group consisting of a hydrogen atom, an aliphatic hydrocarbon group having 1 to 4 carbon atoms, an alicyclic hydrocarbon group having 4 or less carbon atoms, and a halogen atom, wherein T may be in either direction; and
 [C] an epoxy resin having at least one ring structure having a 4- or more membered ring and one or two amine type glycidyl groups or ether type glycidyl groups directly connected to the ring structure;
wherein the equivalent ratio of all active hydrogens of amino groups in the component [A1] to all epoxy groups in the epoxy resin composition is 0.4 to 1.0, and the equivalent ratio of all active hydrogens of amino groups in the epoxy resin composition to all epoxy groups in the epoxy resin composition does not exceed 1.0;

wherein the epoxy resin composition has a curing calorific value of less than 450 J/g, as determined by differential scanning calorimetry (DSC) at a temperature ramp rate of 5° C./min; and wherein a cured product of the epoxy resin composition has a carbon nuclear relaxation time $T_1^C$ corresponding to a benzene ring carbon atom in the main backbone of Formula (1) assigned to 130 ppm in a solid-state $^{13}$C-NMR spectrum of 42 seconds or longer.

2. The epoxy resin composition according to claim 1, wherein the carbon nuclear relaxation time $T_1^C$ corresponding to a benzene ring carbon atom in the main backbone of Formula (1) assigned to 130 ppm in a solid-state $^{13}$C-NMR spectrum is 48 seconds or longer.

3. The epoxy resin composition according to claim 1, wherein the component [A1] is a hardener having a structure represented by Formula (2) or Formula (3):

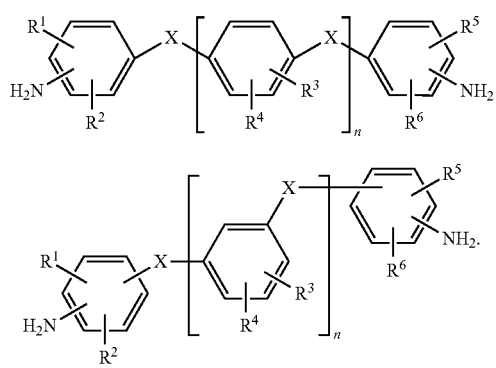

4. The epoxy resin composition according to claim 1, wherein the component [C] comprises an epoxy resin having a structure represented by Formula (9):

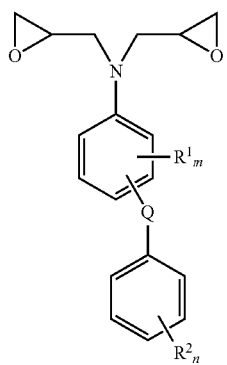

wherein $R^1$ and $R^2$ each represent at least one selected from the group consisting of an aliphatic hydrocarbon group having 1 to 4 carbon atoms, an alicyclic hydrocarbon group having 3 to 6 carbon atoms, an aromatic hydrocarbon group having 6 to 10 carbon atoms, a halogen atom, an acyl group, a trifluoromethyl group, and a nitro group;

n is an integer of 0 to 4;

m is an integer of 0 to 5;

when a plurality of $R^1$ and a plurality of $R^2$ are present, the plurality of $R^1$ and the plurality of $R^2$ each may be the same or different; and Q represents any one selected from —O—, —S—, —CO—, —C(=O)O—, —SO$_2$—, and —NHC(=O)—, wherein when Q is —C(=O)O— or —NHC(=O)—, Q may be in either direction.

5. The epoxy resin composition according to claim 1, wherein the amount of the component [B] is 40 to 90% by mass, and the amount of the component [C] is 10 to 60% by mass, the percentages being based on the total amount of epoxy resin in the epoxy resin composition.

6. The epoxy resin composition according to claim 1, further comprising diaminodiphenyl sulfone as a hardener.

7. The epoxy resin composition according to claim 1, wherein a cured epoxy resin obtained by curing at 180° C. for 2 hours has a rubbery state elastic modulus of 15 MPa or less.

8. The epoxy resin composition according to claim 1, wherein a cured epoxy resin obtained by curing at 180° C. for 2 hours has a flexural modulus of 4.5 GPa or more.

9. The epoxy resin composition according to claim 1, wherein a cured epoxy resin obtained by curing at 180° C. for 2 hours has a rubbery state elastic modulus of 15 MPa or less and a flexural modulus of 4.5 GPa or more.

10. The epoxy resin composition according to claim 1, further comprising a thermoplastic resin [D] soluble in the epoxy resin composition.

11. The epoxy resin composition according to claim 10, comprising the component [D] in an amount of 1 to 40 parts by mass based on 100 parts by mass of the total amount of epoxy resin.

12. The epoxy resin composition according to claim 1, further comprising a thermoplastic resin particle [E].

13. The epoxy resin composition according to claim 1, having the curing calorific value of less than 400 J/g.

14. A prepreg obtained by impregnating carbon fibers with the epoxy resin composition according to claim 1.

15. A carbon fiber-reinforced composite material obtained by curing the prepreg according to claim 14.

16. A carbon fiber-reinforced composite material, comprising:
a cured epoxy resin obtained by curing the epoxy resin composition according to claim 1; and
a carbon fiber.

* * * * *